United States Patent
Deng et al.

(10) Patent No.: US 11,844,113 B2
(45) Date of Patent: Dec. 12, 2023

(54) INITIAL ACCESS IN HIGH FREQUENCY WIRELESS SYSTEMS

(71) Applicant: INTERDIGITAL PATENT HOLDINGS, INC., Wilmington, DE (US)

(72) Inventors: Tao Deng, Roslyn, NY (US); Philip J. Pietraski, Jericho, NY (US); Ravikumar V. Pragada, Warrington, PA (US); Yugeswar Deenoo, Chalfont, PA (US); Janet A. Stern-Berkowitz, Little Neck, NY (US); Moon-il Lee, Melville, NY (US); Mihaela C. Beluri, Jericho, NY (US); Kyle Jung-Lin Pan, Saint James, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 17/857,486

(22) Filed: Jul. 5, 2022

(65) Prior Publication Data

US 2022/0338270 A1    Oct. 20, 2022

Related U.S. Application Data

(63) Continuation of application No. 16/582,305, filed on Sep. 25, 2019, now Pat. No. 11,382,136, which is a
(Continued)

(51) Int. Cl.
*H04W 4/00* (2018.01)
*H04W 74/08* (2009.01)
(Continued)

(52) U.S. Cl.
CPC ...... *H04W 74/0833* (2013.01); *H04B 7/0617* (2013.01); *H04B 7/0626* (2013.01);
(Continued)

(58) Field of Classification Search
CPC ..... H04W 72/23; H04W 24/08; H04W 24/10; H04W 72/046; H04W 74/006; H04L 27/2607; H04L 5/0048
See application file for complete search history.

(56) References Cited

U.S. PATENT DOCUMENTS 8,111,656 B2    2/2012    Che et al.
8,825,095 B2    9/2014    Tong et al.
(Continued)

FOREIGN PATENT DOCUMENTS

CN    101924610    12/2010
CN    103905346    7/2014
(Continued)

OTHER PUBLICATIONS

Han, "Research on DRX Algorithm based on LTE/LTE-Advanced System," China Master's Thesis Full-Text Database (CMFD) (Electronic Periodical) Information Science and Technology Section (Apr. 21, 2014).
(Continued)

*Primary Examiner* — Abdelnabi O Musa
(74) *Attorney, Agent, or Firm* — Volpe Koenig

(57) ABSTRACT

Methods, devices and systems are provided for performing a random access (RA) procedure. A wireless transmit/receive unit (WTRU) may be configured to receive RA resource sets, where each of the RA resource sets is associated with a node-B directional beam, select an RA resource set from among the RA resource sets, and initiate an RA procedure based on the selected RA resource set. The RA procedure may include selecting multiple preambles which
(Continued)

include a preamble for each resource of a plurality of resources corresponding to the selected RA resource set. The WTRU may be configured to sequentially transmit the selected multiple preambles in sequential RA transmissions, and may be configured to receive, from a node-B, in response to the RA transmissions, at least one RA response (RAR), where each of the received at least one RAR corresponds to one of the transmitted multiple preambles.

16 Claims, 27 Drawing Sheets

Related U.S. Application Data continuation of application No. 15/528,029, filed as application No. PCT/US2015/062700 on Nov. 25, 2015, now abandoned.

(60) Provisional application No. 62/218,376, filed on Sep. 14, 2015, provisional application No. 62/084,938, filed on Nov. 26, 2014.

(51) Int. Cl.
| | |
|---|---|
| H04B 7/06 | (2006.01) |
| H04W 72/044 | (2023.01) |
| H04W 74/00 | (2009.01) |
| H04W 72/23 | (2023.01) |
| H04L 5/00 | (2006.01) |
| H04L 27/26 | (2006.01) |
| H04W 24/08 | (2009.01) |
| H04W 24/10 | (2009.01) |
| H04W 72/0446 | (2023.01) |
| H04W 72/0453 | (2023.01) |
| H04W 52/14 | (2009.01) |
| H04W 80/02 | (2009.01) |

(52) U.S. Cl.
CPC ........ *H04L 5/0048* (2013.01); *H04L 27/2607* (2013.01); *H04W 24/08* (2013.01); *H04W 24/10* (2013.01); *H04W 72/046* (2013.01); *H04W 72/0446* (2013.01); *H04W 72/0453* (2013.01); *H04W 72/23* (2023.01); *H04W 74/006* (2013.01); *H04W 52/146* (2013.01); *H04W 80/02* (2013.01)

(56) References Cited

U.S. PATENT DOCUMENTS

| | | | |
|---|---|---|---|
| 9,642,126 | B2 | 5/2017 | Park et al. |
| 9,647,805 | B2 | 5/2017 | Gerlach et al. |
| 9,730,138 | B2 | 8/2017 | Wang et al. |
| 2005/0202859 | A1 | 9/2005 | Johnson et al. |
| 2009/0170514 | A1* | 7/2009 | Yokoyama ............ H04W 74/08 455/450 |
| 2012/0008510 | A1 | 1/2012 | Cai et al. |
| 2012/0026913 | A1 | 2/2012 | Reznik et al. |
| 2012/0040684 | A1 | 2/2012 | Gao et al. |
| 2012/0300714 | A1 | 11/2012 | Ng et al. |
| 2013/0039345 | A1 | 2/2013 | Kim et al. |
| 2013/0121185 | A1 | 5/2013 | Li et al. |
| 2013/0155847 | A1 | 6/2013 | Li et al. |
| 2013/0196678 | A1 | 8/2013 | Liu et al. |
| 2013/0272220 | A1* | 10/2013 | Li ...................... H04W 74/006 370/329 |
| 2013/0286960 | A1 | 10/2013 | Li et al. |
| 2013/0301542 | A1 | 11/2013 | Krishnamurthy et al. |
| 2013/0342846 | A1 | 12/2013 | Campagne et al. |
| 2014/0092855 | A1 | 4/2014 | Ahn et al. |
| 2014/0112254 | A1 | 4/2014 | Lindoff et al. |
| 2014/0112269 | A1 | 4/2014 | Yu et al. |
| 2014/0153427 | A1 | 6/2014 | Seo et al. |
| 2014/0177607 | A1* | 6/2014 | Li ........................ H04B 7/0695 370/336 |
| 2014/0293898 | A1 | 10/2014 | Tseng et al. |
| 2015/0382205 | A1* | 12/2015 | Lee ..................... H04B 7/0626 370/329 |
| 2016/0013858 | A1 | 1/2016 | Jalali et al. |
| 2017/0034812 | A1 | 2/2017 | Deng et al. |
| 2017/0280481 | A1 | 9/2017 | Stern-Berkowitz et al. |
| 2017/0359734 | A1* | 12/2017 | Lee ..................... H04B 7/0417 |
| 2019/0081688 | A1* | 3/2019 | Deenoo ................. H04L 5/005 |
| 2019/0104549 | A1* | 4/2019 | Deng ................. H04L 27/2607 |
| 2019/0364439 | A1* | 11/2019 | Lee ..................... H04L 5/0048 |
| 2021/0306870 | A1* | 9/2021 | Lee ....................... H04B 7/061 |
| 2022/0278885 | A1* | 9/2022 | Deng ................. H04W 56/001 |
| 2022/0338270 | A1* | 10/2022 | Deng ..................... H04W 24/08 |

FOREIGN PATENT DOCUMENTS

| | | |
|---|---|---|
| WO | 10/033989 | 3/2010 |
| WO | 10/054378 | 5/2010 |
| WO | 14/116928 | 7/2014 |
| WO | 14/172306 | 10/2014 |

OTHER PUBLICATIONS

Raaf et al., "Vision for Beyond 4G Broadband Radio Systems," IEEE 22nd International Symposium on Personal Indoor and Mobile Radio Communications (Sep. 2011).

Rappaport et al., "Millimeter Wave Mobile Communications for 5G Cellular: It Will Work!," IEEE Access, vol. 1, pp. 335-349 (May 2013).

Salkintzis et al., "The Evolution of Wireless LANs and PANs," IEEE Wireless Communications, vol. 10, Issue 6 (Dec. 2003).

Third Generation Partnership Project, "Technical Specification Group Radio Access Network; Evolved Universal Terrestrial Radio Access (E-UTRA); Physical Channels and Modulation (Release 11)," 3GPP TS 36.211 V11.0.0 (Sep. 2012).

Third Generation Partnership Project, "Technical Specification Group Radio Access Network; Evolved Universal Terrestrial Radio Access (E-UTRA); Physical channels and modulation (Release 12)," 3GPP TS 36.211 V12.3.0 (Sep. 2014).

Third Generation Partnership Project, "Technical Specification Group Radio Access Network; Evolved Universal Terrestrial Radio Access (E-UTRA); Physical channels and modulation (Release 12)," 3GPP TS 36.211 V12.7.0 (Sep. 2015).

Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.0.0 (Jun. 2012).

Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.3.0 (Sep. 2014).

Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.7.0 (Sep. 2015).

Third Generation Partnership Project, "Technical Specification Group Radio Access Network; Evolved Universal Terrestrial Radio Access (E-UTRA); Physical layer procedures (Release 11)," 3GPP TS 36.213 V11.0.0 (Sep. 2012).

Third Generation Partnership Project, "Technical Specification Group Radio Access Network; Evolved Universal Terrestrial Radio Access (E-UTRA); Physical layer procedures (Release 12)," 3GPP TS 36.213 V12.3.0 (Sep. 2014).

Third Generation Partnership Project, "Technical Specification Group Radio Access Network; Evolved Universal Terrestrial Radio Access (E-UTRA); Physical layer procedures (Release 12)," 3GPP TS 36.213 V12.7.0 (Sep. 2015).

Third Generation Partnership Project, "Technical Specification Group Radio Access Network; Evolved Universal Terrestrial Radio Access

(56) References Cited

OTHER PUBLICATIONS (E-UTRA); Medium Access Control (MAC) protocol specification (Release 11)," 3GPP TS 36.321 V11.0.0 (Sep. 2012).
Third Generation Partnership Project, "Technical Specification Group Radio Access Network; Evolved Universal Terrestrial Radio Access (E-UTRA); Further advancements for E-UTRA physical layer aspects (Release 9)," 3GPP TR 36.814 V9.0.0 (Mar. 2010).
Third Generation Partnership Project, "Technical Specification Group Radio Access Network; Evolved Universal Terrestrial Radio Access (E-UTRA); Radio Frequency (RF) system scenarios (Release 11)," 3GPP TR 36.942 V11.0.0 (Sep. 2012).
Third Generation Partnership Project, "Technical Specification Group Radio Access Network; Evolved Universal Terrestrial Radio Access (E-UTRA); Radio Frequency (RF) system scenarios (Release 12)," 3GPP TR 36.942 V12.0.0 (Sep. 2014).
Third Generation Partnership Project, "Technical Specification Group Radio Access Network; Small cell enhancements for E-UTRA and E-UTRAN—Physical layer aspects (Release 12)," 3GPP TR 36.872 V12.0.0 (Sep. 2013).
Third Generation Partnership Project, "Technical Specification Group Radio Access Network; Small cell enhancements for E-UTRA and E-UTRAN—Physical layer aspects (Release 12)," 3GPP TR 36.872 V12.1.0 (Dec. 2013).
Third Generation Partnership Project, "Technical Specification Group Radio Access Network; Evolved Universal Terrestrial Radio Access (E-UTRA); Requirements for support of radio resource management (Release 12)," 3GPP TS 36.133 V12.5.0 (Sep. 2014).
Third Generation Partnership Project, "Technical Specification Group Radio Access Network; Evolved Universal Terrestrial Radio Access (E-UTRA); Requirements for support of radio resource management (Release 12)," 3GPP TS 36.133 V12.9.0 (Sep. 2015).
Third Generation Partnership Project, "Technical Specification Group Radio Access Network; Evolved Universal Terrestrial Radio Access (E-UTRA); Requirements for support of radio resource management (Release 13)," 3GPP TS 36.133 V13.1.0 (Sep. 2015).
Third Generation Partnership Project, "Technical Specification Group Radio Access Network; Evolved Universal Terrestrial Radio Access (E-UTRA); TDD Home eNode B (HeNB) Radio Frequency (RF) requirements analysis (Release 10)," 3GPP TR 36.922 V10.0.0 (Apr. 2011).

* cited by examiner

| E | T | RABFI | RAPID |

FIG. 24

| R | Timing Advanced Command ||
|---|---|---|
| Timing Advanced Command || UL Grant |
| UL Grant |||
| UL Grant |||
| C-RNTI/Temporary C-RNTI |||
| C-RNTI/Temporary C-RNTI |||

FIG. 25

INITIAL ACCESS IN HIGH FREQUENCY WIRELESS SYSTEMS

CROSS REFERENCE TO RELATED APPLICATIONS

This application is a continuation of U.S. patent application Ser. No. 16/582,305 filed Sep. 25, 2019, which issued as U.S. Pat. No. 11,382,136 on Jul. 5, 2022, which is a continuation of U.S. patent application Ser. No. 15/528,029 filed May 18, 2017, which is a U.S. National Stage, under 35 U.S.C. § 371, of International Application No. PCT/US2015/062700 filed Nov. 25, 2015, which claims the benefit of U.S. Provisional Application No. 62/084,938, filed Nov. 26, 2014, and U.S. provisional application No. 62/218,376, filed Sep. 14, 2015, the contents of which are hereby incorporated by reference herein.

BACKGROUND

In order to meet the high data rate required for the next generation of cellular communication systems, above-6 GHz frequencies, e.g., at centimeter wave (cmW) and millimeter wave (mmW) frequencies, have been explored. The large bandwidth available at these frequencies may provide enormous capacity improvements for user-specific data transmissions. One challenge of using these above-6 GHz frequencies may be characteristics related to their propagation which may be unfavorable for wireless communication, especially in an outdoor environment. For example, higher frequency transmissions may experience higher free space path loss. Rainfall and atmospheric gasses, e.g., oxygen, may add further attenuation and foliage may cause attenuation and depolarization. The narrow beam pattern which may be used to counter these losses may pose challenges for an evolved node B (eNB), for example, in delivering cell-specific or broadcast information. As a result, initial mmW access link system design may focus on specific cellular system procedures that enable add-on mmW data transmissions, for example, at least downlink transmissions to an existing network such as a small cell Long-Term Evolution (LTE) network.

SUMMARY

Methods and systems for enabling multi-angle of arrival (AoA) receptions for an incoming transmission at multiple angular directions to mitigate against radio link interruptions are described. One or more random access (RA) resource sets may be provided by a small cell millimeter wave (mmW) evolved node B (eNB) (SCmB) via signaling. An RA resource set may be selected based on an SCmB downlink (DL) measurement or a DL transmit beam by an mWTRU. Methods and systems are further provided for an mWTRU to perform an RA procedure using a selected RA resource set. An mWTRU may select or use multiple RA resource sets, wherein each RA resource set in the multiple RA resource sets is associated with an SCmB UL receive beam.

For example, a transmit/receive unit (WTRU) may include a receiver configured to receive a plurality of random access (RA) resource sets, where each of the plurality of RA resource sets is associated with a node-B directional beam of a plurality of node-B directional beams, and each of the plurality of RA resource sets includes a plurality of resources. The WTRU may include at least one processor configured to select an RA resource set from among the plurality of RA resource sets, and the at least one processor may be configured to initiate an RA procedure based on the selected RA resource set, where the RA procedure includes determining the plurality of resources corresponding to the selected RA resource set, and selecting multiple preambles including a preamble for each resource of the plurality of resources corresponding to the selected RA resource set. The WTRU may include a transmitter configured to sequentially transmit the selected multiple preambles to a node-B in sequential RA transmissions using the plurality of resources corresponding to the selected RA resource set. In addition, the receiver and the processor may be further configured to monitor for a plurality of random access responses (RARs) corresponding to the sequential RA transmissions such that monitoring for a first RAR at least partially overlaps with monitoring for a second RAR, and receive, from the node-B, in response to the sequential RA transmissions, at least one RAR, where each of the received at least one RAR corresponds to one of the transmitted multiple preambles.

According to another example, a method for use by a wireless transmit/receive unit may include receiving, by the WTRU, a plurality of random access (RA) resource sets, where each of the plurality of RA resource sets is associated with a node-B directional beam of a plurality of node-B directional beams, and each of the plurality of RA resource sets includes a plurality of resources; selecting, by the WTRU, an RA resource set from among the plurality of RA resource sets based on the plurality of node-B directional beams; initiating, by the WTRU, an RA procedure based on the selected RA resource set, where the RA procedure includes determining the plurality of resources corresponding to the selected RA resource set, and selecting multiple preambles that include a preamble for each resource of the plurality of resources corresponding to the selected RA resource set; transmitting, by the WTRU, the selected multiple preambles to a node-B in sequential RA transmissions using the plurality of resources corresponding to the selected RA resource set; monitoring for a plurality of random access responses (RARs) corresponding to the sequential RA transmissions such that monitoring for a first RAR at least partially overlaps with monitoring for a second RAR; and receiving, by the mWTRU, from the node-B in response to the sequential RA transmissions, at least one random access response (RAR), where each of the received at least one RAR corresponds to one of the transmitted multiple preambles.

According to another example, an mWTRU may include a receiver configured to receive a plurality of random access (RA) resource sets, where each of the plurality of RA resource sets is associated with a node-B directional beam, and each of the plurality of RA resource sets includes a plurality of resources. The WTRU may include at least one processor configured to select an RA resource set from among the plurality of RA resource sets, and initiate an RA procedure based on the selected RA resource set, where the RA procedure includes determining the plurality of resources corresponding to the selected RA resource set, and selecting multiple preambles that include a preamble for each resource of the plurality of resources corresponding to the selected RA resource. The WTRU may include a transmitter configured to transmit the selected multiple preambles to a node-B in parallel RA transmissions using the plurality of resources corresponding to the selected RA resource set. In addition, the receiver and the processor may be further configured to monitor for a plurality of random access responses (RARs) corresponding to the parallel RA transmissions such that monitoring for a first RAR at least partially overlaps with monitoring for a second RAR, and to receive, from the node-B, in response to the parallel RA transmissions, at least one random access response (RAR), where each of the received at least one RAR corresponds to one of the transmitted multiple preambles.

BRIEF DESCRIPTION OF THE DRAWINGS

A more detailed understanding may be had from the following description, given by way of example in conjunction with the accompanying drawings wherein:

FIG. 24 is an example random access beamforming index (RABFI)/random access preamble identifier (RAPID) mmW MAC subheader;

FIG. 25 is an example mmW MAC RAR;

DETAILED DESCRIPTION

Figure 1A:
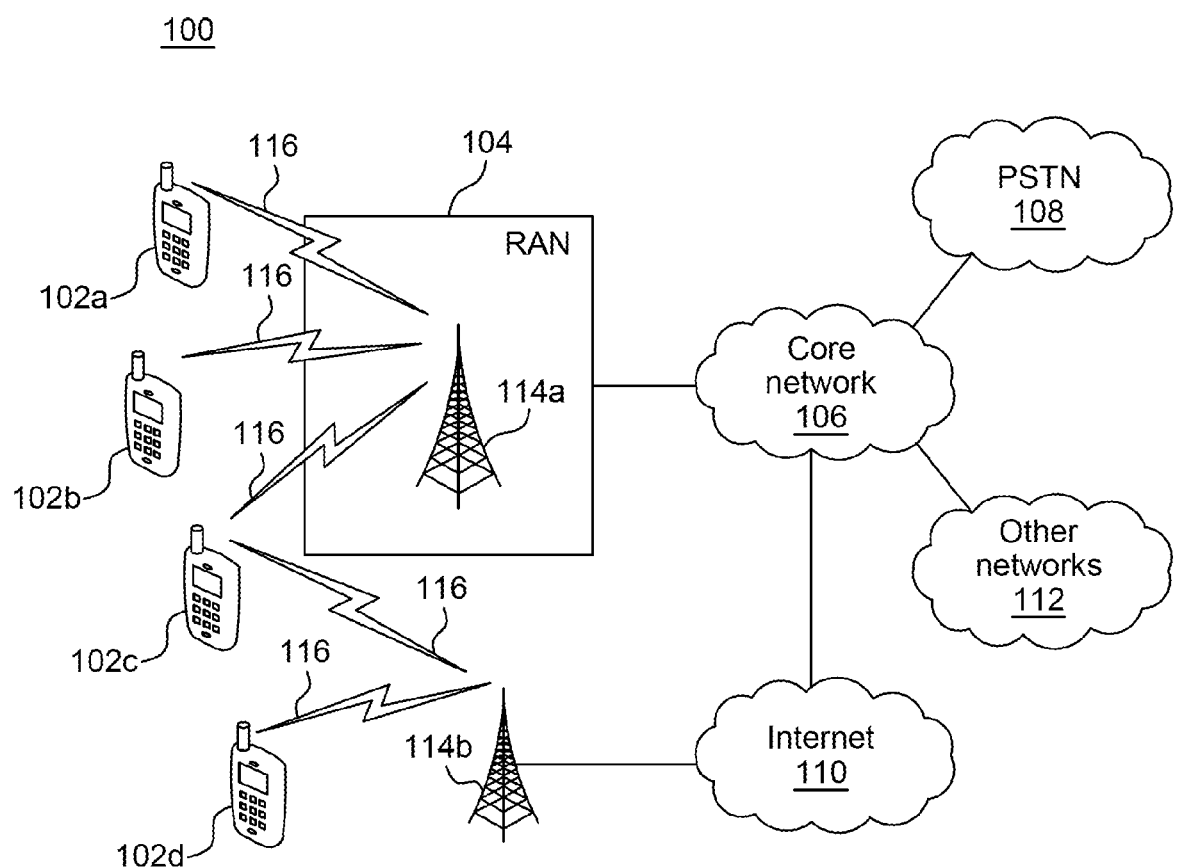
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, for example, one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
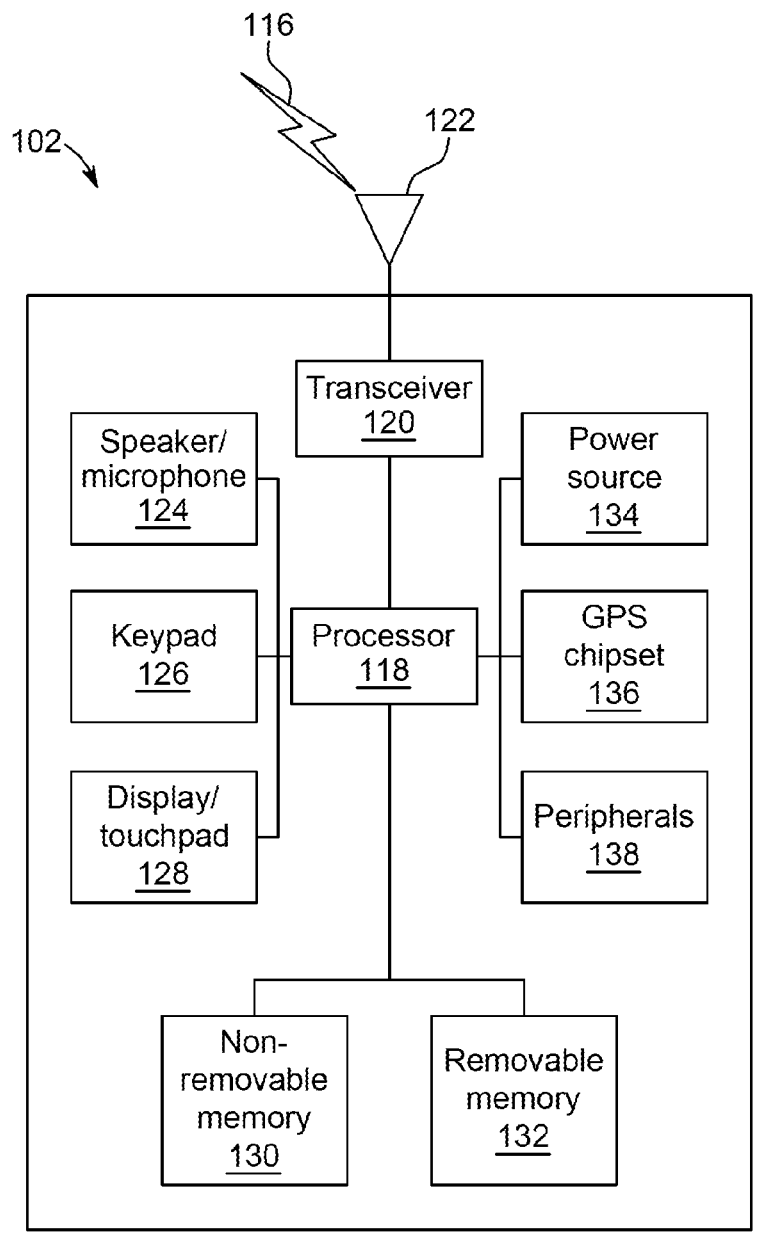
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
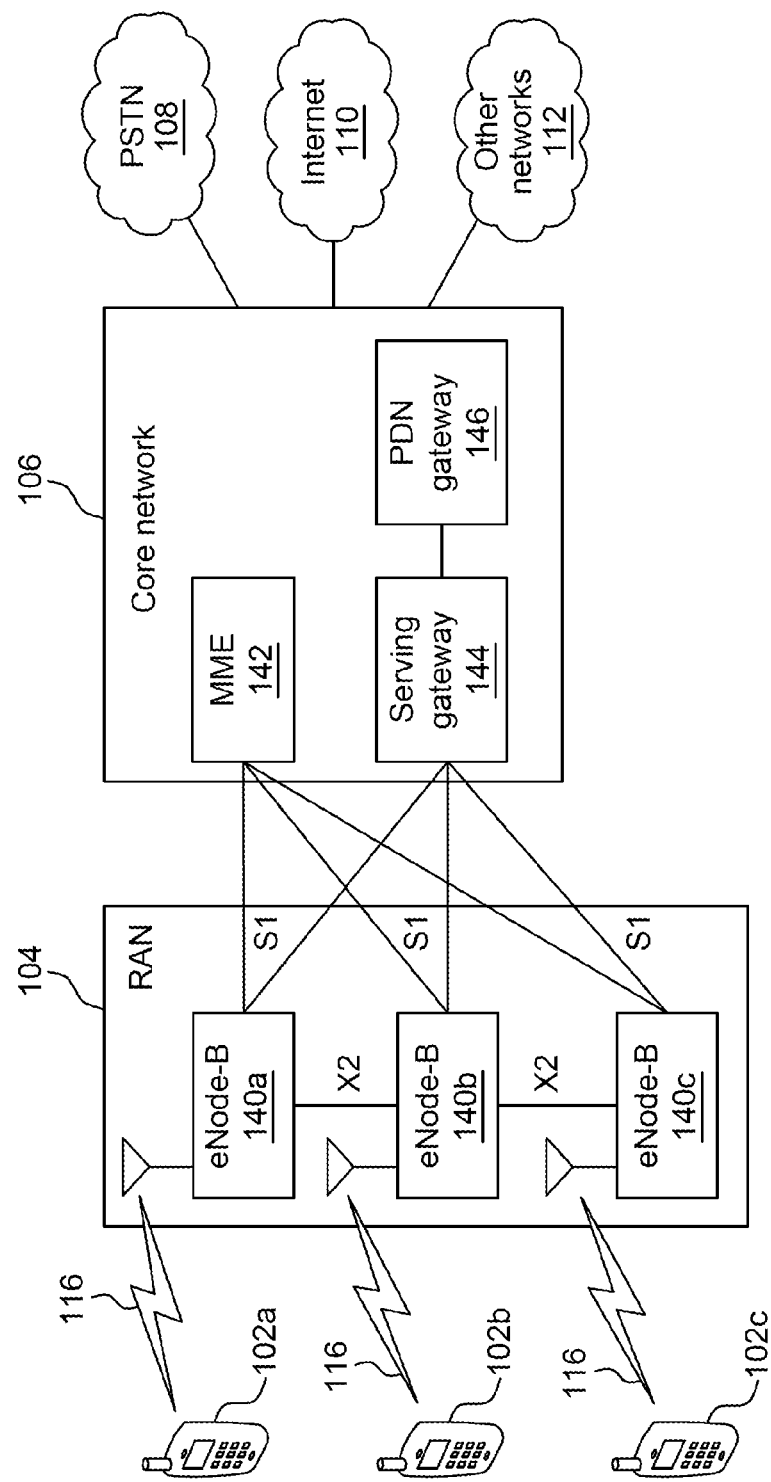
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Hereinafter, as used in the specification and the figures, the terms millimeter wave (mmW) wireless transmit receive unit (WTRU) (mWTRU), WTRU, user equipment (UE) and mmW UE (mUE) may be used interchangeably and denote a WTRU or UE that is capable of operation in a small cell millimeter wave (mmW) environment. The mWTRU may include at least one processor (e.g., processor 118 illustrated in FIG. 1B) which may perform one or more of the processes and/or other functionalities disclosed herein that enables the mWTRU to operate in a wireless environment. Furthermore, the processor may be operatively coupled to at least one other processor, a receiver, a transmitter, a transceiver or any combination thereof to perform one or more of the processes and/or functionalities disclosed herein, and may perform those processes and/or functionalities in conjunction with or in cooperation with those mWTRU components (i.e., the at least one other processor, receiver, transmitter, transceiver or any combination thereof). A process, functionality, reception, transmission and the like performed by an mWTRU processor, or any of the aforementioned mWTRU components and combinations thereof, may generally be referred to as being performed by the mWTRU throughout out the disclosure without detracting from the concepts disclosed herein.

The small cell millimeter wave (mmW) evolved node B (eNB) (SCmB) deployment may be based on the Third Generation Partnership Program (3GPP) Release 12 small cell deployment. The mmW operation may be performed by two network nodes, a small cell mmW eNB (SCmB), a mmW WTRU (mWTRU), and any combination thereof. The SCmB may include at least one processor which may perform one or more of the processes and/or other functionalities disclosed herein that enables the SCmB to operate in a wireless environment. Furthermore, the processor may be operatively coupled to at least one other processor, a receiver, a transmitter, a transceiver or any combination thereof to perform one or more of the processes and/or functionalities disclosed herein, and may perform those processes and/or functionalities in conjunction with or in cooperation with those SCmB components (i.e., the at least one other processor, receiver, transmitter, transceiver or any combination thereof). A process, functionality, reception, transmission and the like performed by an SCmB processor, or any of the aforementioned SCmB components and combinations thereof, may generally be referred to as being performed by the SCmB throughout out the disclosure without detracting from the concepts disclosed herein.

The SCmB may generally be a Long Term Evolution (LTE) small cell eNB capable of operating an mmW air interface in parallel with an LTE air interface in the downlink channel. The SCmB may be equipped with advanced antenna configurations and beamforming techniques. The SCmB may simultaneously transmit LTE downlink channels in wide beam patterns and mmW channels in narrow beam patterns. In order to support mmW WTRUs without mmW uplink transmission, the SCmB may support new features and procedures in the LTE uplink channel.

The mmW WTRU may be a WTRU capable of operating an LTE and mmW air interface in parallel. The mWTRU may have two sets of antennas. The accompanied respective RF chains may operate in the LTE band and the mmW frequency band. There may also be two independent baseband processing functions. The two baseband processing functions may share certain hardware (HW) blocks if the mmW air interface bears similarity with the LTE system.

Add-on mmW channels may be an extension of the LTE carrier aggregation scheme with a new carrier type in the mmW frequency band that may apply a different air interface. More importantly, the mmW channels may lend themselves to opportunistic use for high-throughput and/or low-latency traffic data applications.

Control signaling including system information updates, paging, radio resource control (RRC) and non-access stratus (NAS) signaling (for example, signaling radio bearers) and multicast traffic may be carried in LTE channels. In addition, certain mmW Layer 1 (L1) control signaling may be carried in the LTE channels.

Due to the high propagation loss, especially in non-line-of-sight (NLOS) at the mmW frequency band, one or both of a SCmB and an mWTRU may employ narrow beamforming, for example, to ensure sufficient link budget for high-throughput and low-latency data transmissions.

Transmit and receive narrow beam paring may be used in certain scenarios. For example, at 28 GHz and 38 GHz in urban areas using a steerable 10°-beamwidth and 24.5-dBi horn antenna at both the transmitter and receiver, a consistent coverage with a cell-radius of up to 200 meters may be demonstrated.

It will be appreciated that certain processes are described herein and that the exemplary steps to carry out those processes may be described in an exemplary order. It will be further appreciated that is some instances the exemplary steps and ordering of steps are not intended to be limiting. In particular, it will be appreciated that in some processes, certain steps may be rearranged in procedural order, some steps may be omitted, and some steps may be arranged or combined with other processes without departing from the concepts disclosed herein.

Figure 2:
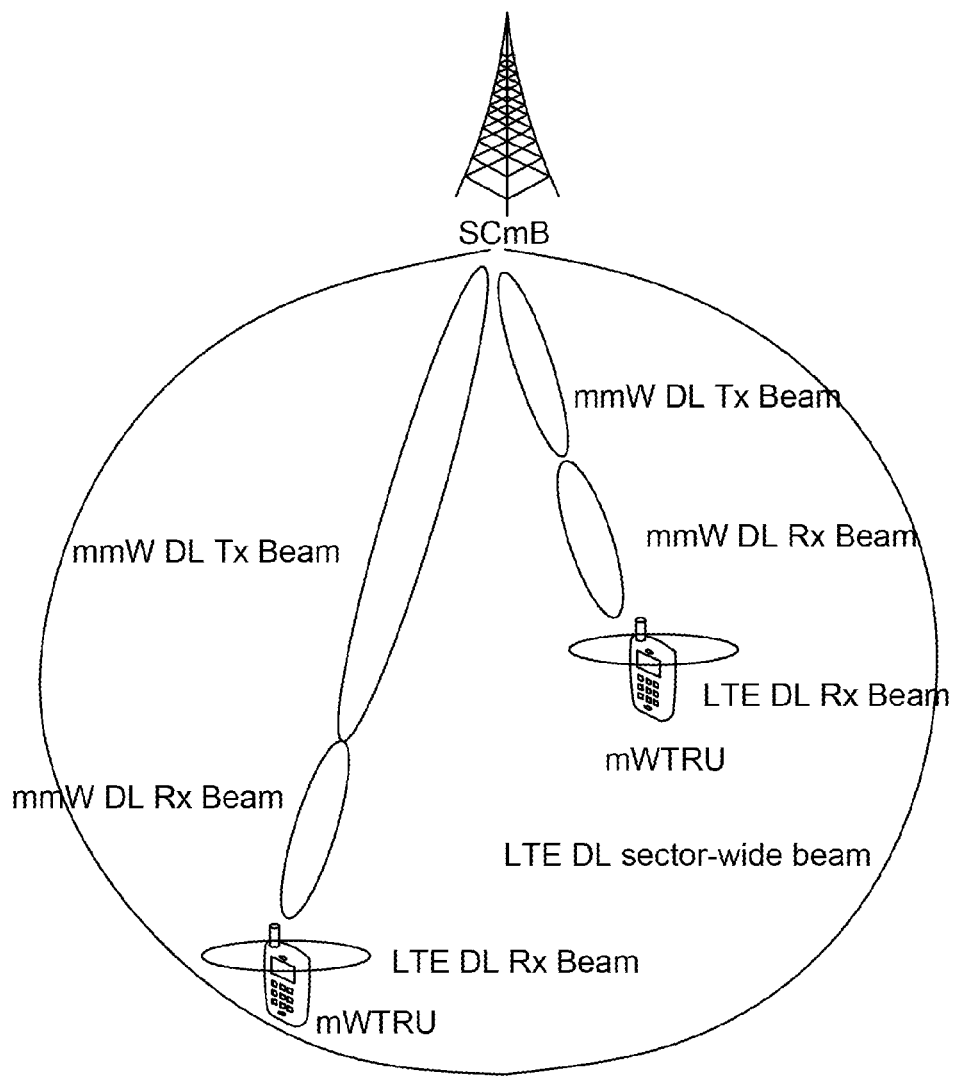
FIG. 2 is a diagram of an example SCmB deployment.

FIG. 2 is a diagram of an example SCmB deployment. In addition to using narrow beams by the SCmB and the mWTRUs in downlink transmissions and receptions, the SCmB and the mWTRUs, may also apply broad beam patterns for the traditional LTE operations, which may include cell search, random access, and cell selection/reselection, and the like. FIG. 2 shows narrow mmW DL transmit (Tx) beams transmitted by the SCmB and mmW DL receive (Rx) beams formed by the mWTRUs. A beam may be considered narrow when the beam has a half-power-bandwidth substantially equal to or below 10 degrees in certain applications and substantially equal to or below 15 degrees in other applications. However, it will be appreciated that a narrow beam is not limited thereto, and a narrow beam may have a half-power-bandwidth greater than 15 degrees in some applications. FIG. 2 also shows a broad LTE DL sector-wide beam transmitted by the SCmB and LTE DL Rx beams formed by the mWTRUs.

A transmit or receive beam, either in the downlink or uplink direction, that are used for directional signal transmission or reception may be referred to as directional beams, narrow beams or narrow directional beams. The directional beams may be formed, for example, by different beam forming techniques at a transmitting or receiving end (e.g., at a WTRU or node-B).

Figure 6:
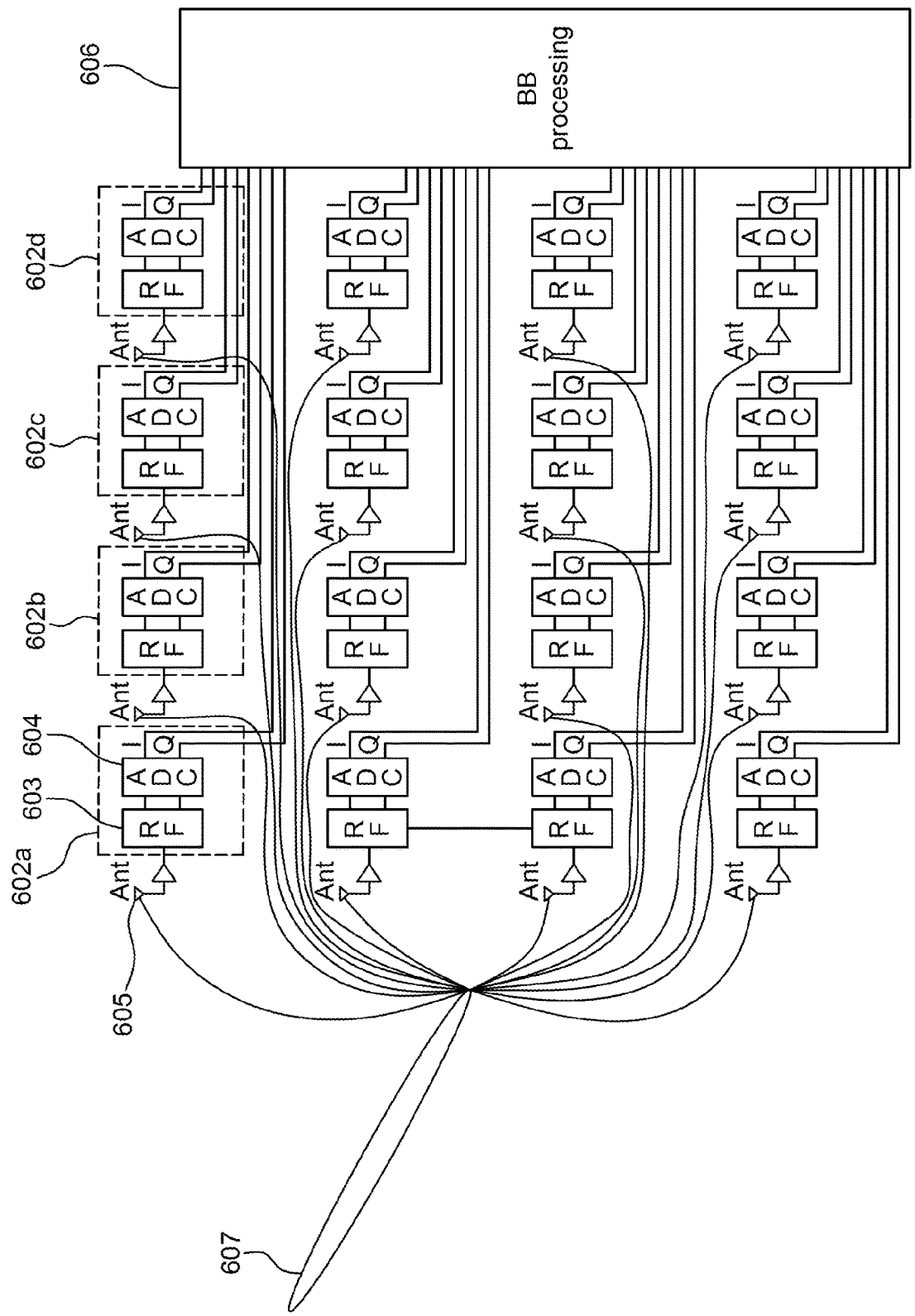
FIG. 6 is a diagram of an example mWTRU utilizing a fully digitized beamforming approach.
Figure 7:
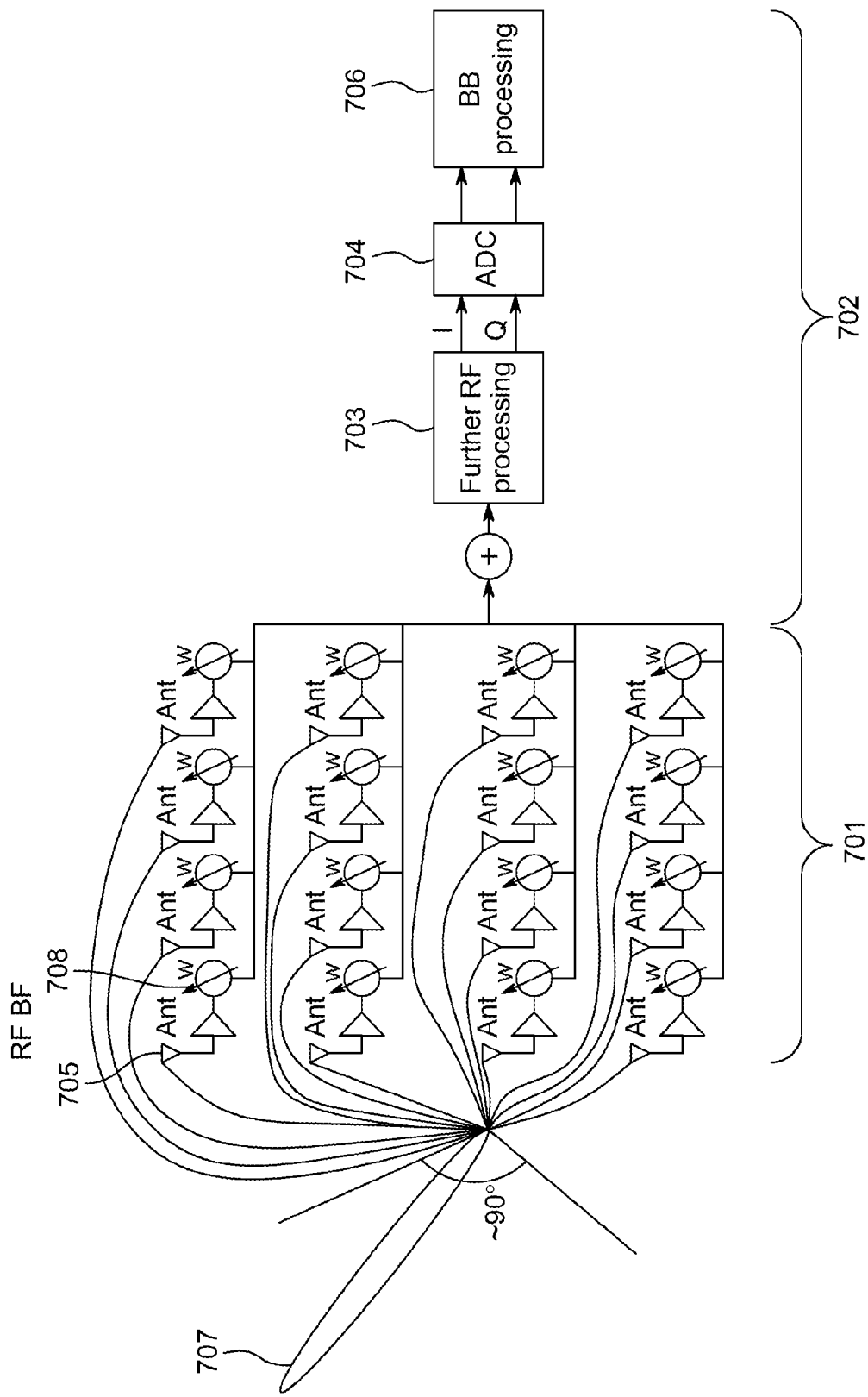
FIG. 7 is a diagram of an example mWTRU utilizing analogue beamforming with one phase antenna array and one RF chain.

For example, a directional transmit or receive beam is formed by a WTRU applying specific weight to each antenna elements of the antenna solution, be it a digital antenna array implementation as shown in FIG. 6, in which the weight is comprised of both amplitude and phase, or an analogue phase antenna array implementation as shown in FIG. 7, which comprises a phase-only weight. The weights are selected by an algorithm or function within the WTRU to form an antenna pattern, i.e., a transmit beam or a receive beam, with the main lobe of the beam (the maximum gain of the antenna pattern) pointed to a direction in both azimuth and elevation plan (3D direction) that is intended by the algorithm and function. A receive beam sweep is performed by applying a set of weights, sequentially, one at a time, and each time the applied weight is changed an antenna pattern is generated whose main lobe will be placed at a new direction. The covered direction of each beam over time will constitute a sweep coverage which can be the sum of the antenna pattern coverage. For example, consider if an antenna array is configured to form a 15-degree receive beam in azimuth plane and to provide a 90 degree coverage. In such a case, there will be six weights and each weight will move the main lobe of the beam by 15 degrees. If each antenna pattern is maintained for one TTI, this beam sweep of 90 degree coverage will take 6 TTIs. In contrast, an omnidirectional antenna is a class of antenna which radiates radio wave power uniformly in all directions in one plane, with the radiated power decreasing with elevation angle above or below the plane, dropping to zero on the antenna's axis.

Figure 3:
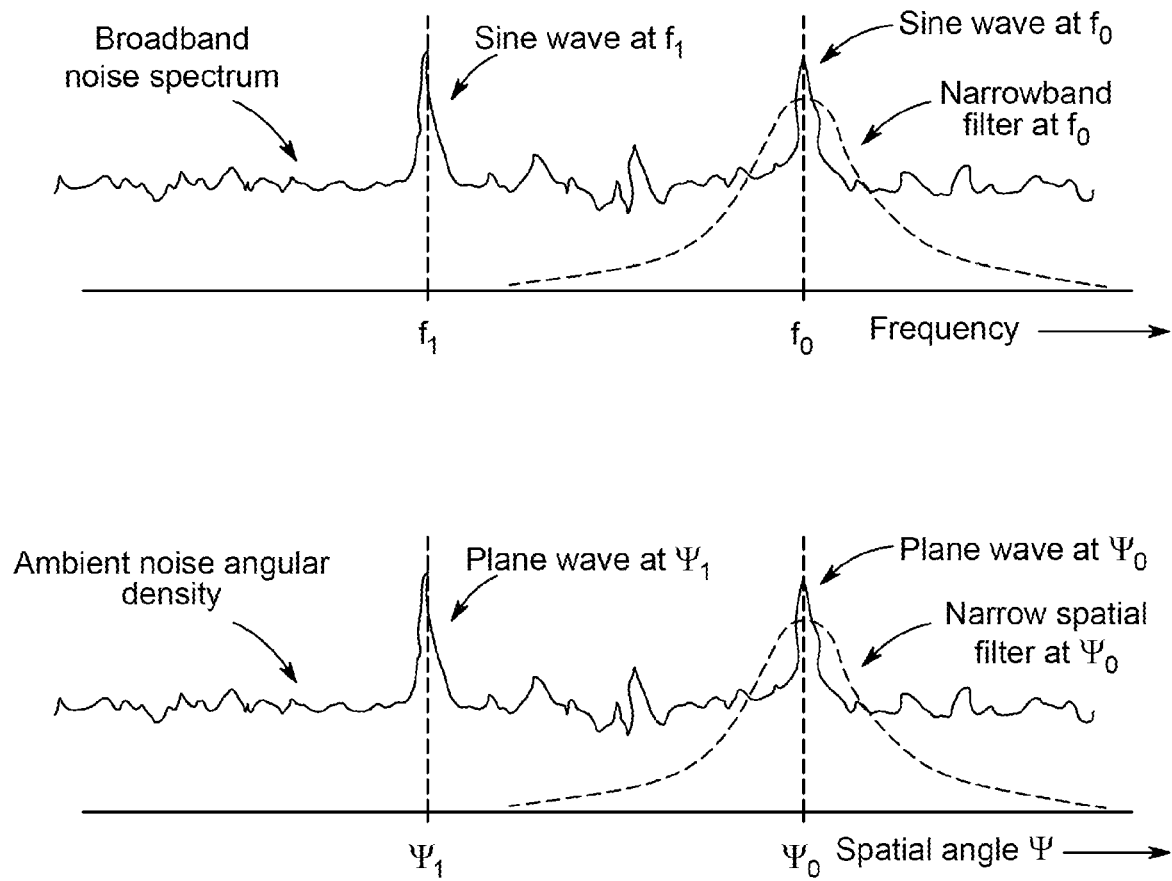
FIG. 3 is a comparison of frequency and spatial filtering.

The mWTRU receive beam forming may be regarded as a narrow spatial filtering as shown in FIG. 3. FIG. 3 illustrates a comparison of frequency and spatial filtering. FIG. 3 demonstrates the effect of a spatial or angular filtering (bottom), compared with frequency domain filtering (top).

Similar to frequency filtering to remove unwanted frequency components, spatial filtering may allow an mWTRU to detect a channel impulse response at a distinct angular direction captured by the narrow receive beam. This may result in a flat effective channel by excluding angular incoming paths outside of its beamwidth. A Release 12 LTE WTRU may be assumed to have an omni-directional receive beam pattern and consequently may perceive a superimposed channel impulse response over the entire angular domain. Therefore, an aligned mmW transmit beam and mmW receive beam pair (i.e., mmW or narrow transmit and receive beam pair) may provide an additional degree of freedom in the angular domain compared with the current LTE system. Accordingly, the mmW downlink system design for the SCmB deployment is focused on integrating the directivity of a narrow transmit and receive beam pair into cellular system procedures including L1 control signaling, mmW data scheduling, narrow beam paring, beam measurement, mmW L1 control information feedback, and the like.

mmW system parameters and assumptions will now be described. It should be noted that many design parameters may be changed. These parameters and assumptions are not intended to be limiting but serve to illustrate possible sets of parameters of an example mmW system.

The carrier frequency may be 28 GHz, and may be intended for a system numerology in an example. Alternatively, the design may be extended to other mmW frequencies such as 38 GHz, 60 GHz, 72 GHz, and the like. The system bandwidth may be variable up to 1 GHz with aggregation to higher bandwidths. The estimated root mean square (RMS) delay spread may be 100-200 ns with a narrow beam pattern. The latency may be 1 ms. The waveform may be an orthogonal frequency division multiplex (OFDM)-based waveform or a broad-band-single-carrier-based waveform. The connectivity may be LTE small cell eNB with mmW add-on channels with two separate antennas and RF chains connected to two different antennas. The minimum downlink data rate may be 30 Mbit/s for at least 95% of the mWTRUs. Mobility may be an optimized data connection at 3 km/h and may maintain a connection at 30 km/h. The coverage may meet the data rate and mobility requirements with less than a 100-m cell radius.

Waveform selection will now be described. Waveforms for the mmW air interface may include broad-band Cyclic Prefixed Single Carrier (CP-SC), OFDM, single carrier (SC)-OFDM, multi-carrier (MC)-code division multiple access (CDMA), generalized OFDM, FBMC, and others may be used for the air interface of a system such as an above-6 GHz system (e.g., cmW or mmW). A frame structure for the system may depend on the applied waveform. A transmission time interval (TTI) length such as 100 μs may be used, for example, to achieve low latency. A system bandwidth such as one in the range of 50 MHz to 2 GHz may be used, for example, to achieve high data rates.

The OFDM frame structure will now be described. A mmW frame structure of an OFDM-based waveform may offer flexibility, coordinating between the LTE and mmW channels, and may enable common functional block sharing in an mWTRU.

A mmW sampling frequency may be selected as an integer multiple of the LTE minimum sampling frequency of 1.92 MHz, which may lead to an mmW OFDM sub-carrier spacing $\Delta f$ being an integer multiple of the LTE sub-carrier spacing of 15 kHz, i.e. $\Delta f=15*K$ kHz. The selection of the integer multiple K and the resulting $\Delta f$ may take account for the sensitivity to the doppler shift, different types of frequency errors and the ability to remove channel time dispersion. The orthogonality between sub-carriers may deteriorate, and inter-sub-carrier interference (ISI) may increase when the doppler shift increases in proportion to the sub-carrier spacing. For example, the maximum doppler shift at 30 km/h and 28 GHz is 778 Hz. The latest 28-GHz channel time dispersion measurement in a dense urban area, e.g., Poly NYU, indicates that the RMS delay spread $\sigma$ is between 100 ns and 200 ns up to a 200-m cell radius. The 90% coherence bandwidth may be estimated at $1/50\sigma$ of 100 kHz and the 50% coherence bandwidth at $1/5\sigma$ of 1 MHz.

A sub-carrier spacing $\Delta f$ between 100 kHz and 1 MHz may thus be reasonable. A sub-carrier spacing of 300 kHz (K=20) may be robust against the doppler shift and other types of frequency errors, and may considerably reduce the implementation complexity. The corresponding symbol length $(1/\Delta f)$ may be 3.33 μs.

A cyclic prefix (CP) length may normally be required to span over the entire length of the channel time dispersion in order to eliminate inter-symbol-interference. On the other hand, as a CP does not carry useful data, a long CP may cause excessive system overhead. One example of CP length for a $T_{symbol}$ of 3.33 μs may be selected at $1/14$ of $T_{symbol}$, 0.24 μs and the corresponding CP overhead may be 7% as calculated by $TCP/(TCP+T_{symbol})$.

In order to achieve low latency, the transmission time interval (TTI) length of the mmW transmission may be reduced significantly compared to the 1-ms TTI length of the LTE system. It may be beneficial to have an mmW sub-frame length of 1 ms to align with the LTE 1-ms sub-frame timing. The mmW sub-frame may contain multiple mmW TTIs whose length is tied to other parameters such as sub-carrier spacing, symbol length, CP length, FFT size, and the like.

An example with a conservative CP length (e.g., 4× channel delay spread) is shown below in TABLE 1, which is outlines, in one example, mmW downlink OFDM numerology. It should be noted the CP length selection may be based on the assumption that the delay spread over all potential mmW frequency bands is lower than 200 ns.

TABLE 1 mmW DOWNLINK OFDM NUMEROLOGY
OFDM NUMEROLOGY PARAMETERS

| | | | | |
|---|---|---|---|---|
| System bandwidth (MHz) | 125 | 250 | 500 | 1000 |
| Sampling rate (MHz) | 153.6 | 307.2 | 614.4 | 1228.8 |
| Sub-carrier spacing (kHz) | 300 | 300 | 300 | 300 |
| Number of sub-carrier per RB | 12 | 12 | 12 | 12 |
| RB bandwidth (MHz) | 3.6 | 3.6 | 3.6 | 3.6 |
| Number of assignable RBs | 32 | 64 | 128 | 256 |
| Number of occupied sub-carriers | 384 | 768 | 1536 | 3072 |
| Occupied bandwidth (MHz) | 115.2 | 230.4 | 460.8 | 921.6 |
| IDFT(Tx)/DFT (Rx) size | 512 | 1024 | 2048 | 4096 |
| OFDM symbol duration (μs) | 3.333 | 3.333 | 3.333 | 3.333 |
| CP length (ratio to symbol length) | 1/4 | 1/4 | 1/4 | 1/4 |
| CP length (μs) | 0.833 | 0.833 | 0.833 | 0.833 |
| Number of symbols per slot | 24 | 24 | 24 | 24 |
| Slot duration (TTI) (μs) | 100 | 100 | 100 | 100 |
| Sub-frame duration (ms) | 1 | 1 | 1 | 1 |
| Number of slots per sub-frame | 10 | 10 | 10 | 10 |
| Frame duration (ms) | 10 | 10 | 10 | 10 |
| Number of sub-frames per frame | 10 | 10 | 10 | 10 |
| Number of symbols per TTI per RB | 288 | 288 | 288 | 288 |
| Number of symbols per TTI using all RBs | 9216 | 18432 | 36864 | 73728 |
| Signaling overhead | 20% | 20% | 20% | 20% |
| Data rate using uncoded 64QAM (Mbps) | 442.368 | 884.736 | 1769.472 | 3538.944 |
| Spectral efficiency | 3.538944 | 3.538944 | 3.538944 | 3.538944 |

Figure 4:
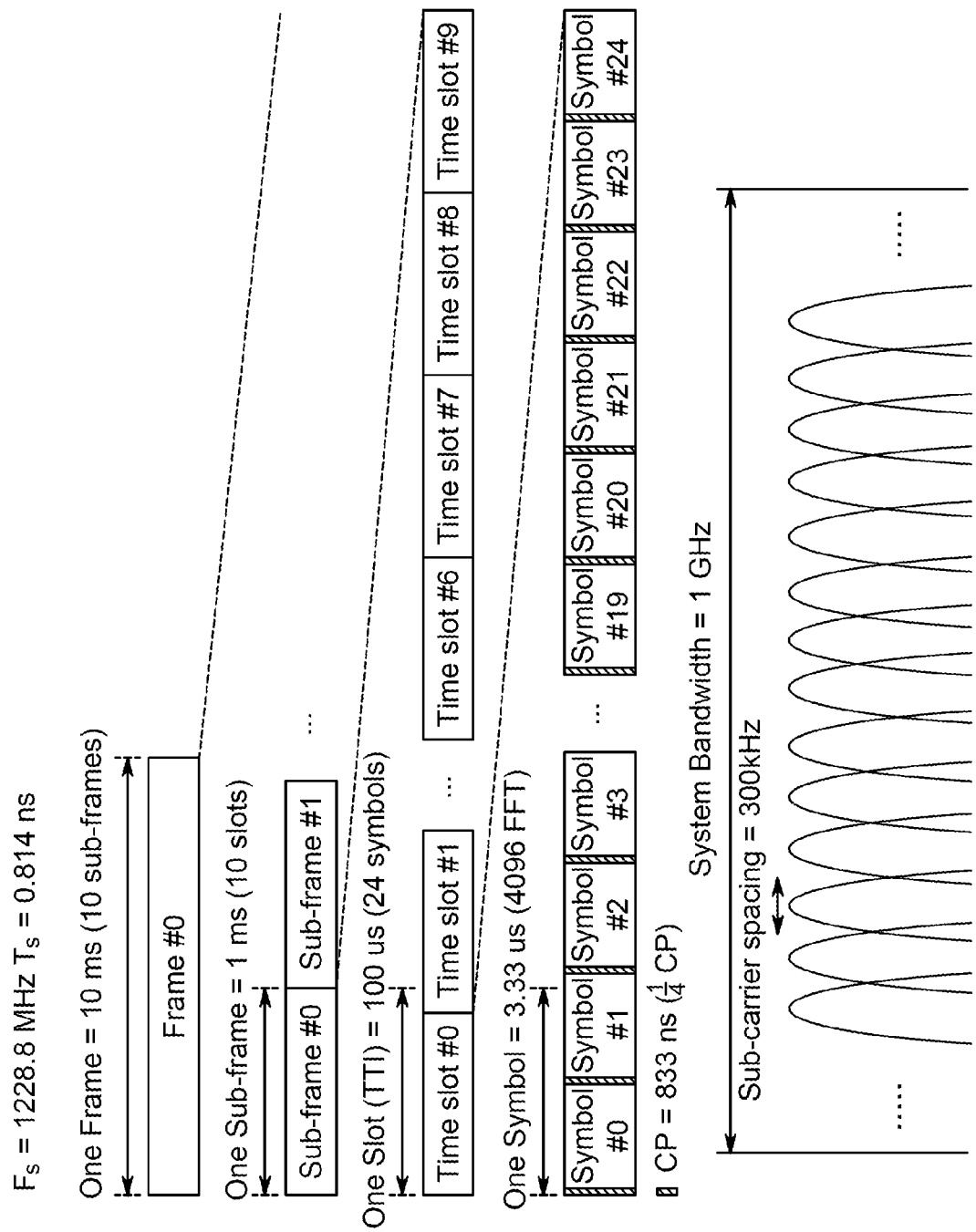
FIG. 4 is a diagram of an example OFDM frame structure.

FIG. 4 depicts an example OFDM-based frame structure. In the example, the system bandwidth is 1 GHz and a sub-carrier spacing of 300 kHz with a corresponding symbol length of 3.33 μs is used. An example cyclic prefix (CP) length of ¼ of $T_{symbol}$ which equals 0.833 μs is used. According to FIG. 4, each frame may include one or more sub-frames, each sub-frame may include one or more time slots, and each time slot may include one or more symbols with CPs disposed therebetween. It should be noted that the following frame structure discussion and examples assume an OFDM-based mmW waveform, which may be readily incorporated into the OFDM-based LTE small cell network. However, this is not intended to be limiting and is for explanation purposes only. For example, the system procedure designs proposed in the subsequent sections are not bound by this specific frame structure and may be applied to other waveform candidates.

mmW physical channels will now be described. The SCmB deployment may employ new mmW physical layer channels and reference signals as described below in addition to the existing LTE physical channels.

A beam-specific reference signal (BSRS) is a unique sequence transmitted per transmit beam that may be used for beam acquisition, timing/frequency synchronization, channel estimation for the physical downlink directional control channel (PDDCCH), beam tracking and measurement, and the like. It may implicitly carry beam identity information including a BSRS sequence index. It should be noted that there may be different types of BSRSs. The BSRS resource allocation may be pre-defined.

An adaptive antenna reference signal (AARS) is a unique sequence scheduled and transmitted dynamically for beam pair measurement specific for one antenna port. The beam identity information may be embedded in the sequence index of the AARS implicitly or carried in a small payload in the MRS.

The PDDCCH may carry all data related control information for an mWTRU to identify, demodulate and decode an associated physical downlink directional data channel (PDDDCH) correctly. The PDDCCH may be carried in an mmW narrow beam or broad beam, and may apply different multiple access mechanisms.

For example, there may be a common PDDCCH transmitted in the downlink mmW broad beam covering a sector or cell and a dedicated PDDCCH only transmitted in a narrow transmit/receive beam pair when mWTRU-specific data transmissions are on-going. The dedicated PDDCCH may carry scheduling information for an associated PDDDCH on a per-TTI basis and may not carry beam specific information. A common PDDCCH may include cell-specific information including sector/segment identity or beam identity. In addition, an mWTRU may read the common PDDCCH to determine if it is scheduled for narrow beam pairing procedure in order to begin narrow beam data transmission subsequently.

A PDDDCH may carry payload information received in the form of a media access control (MAC) protocol data unit (PDU) from the mmW MAC layer. The complete resource allocation of this channel may be determined by the downlink scheduling information carried on the PDDCCH. The PDDDCH intended for an mWTRU may be transmitted in a narrow transmission beam and received in a properly paired narrow receive beam, i.e., a narrow beam pair. Due to this spatial isolation, PDDDCHs for different WTRUs in different beam pairs may reuse time, frequency or code resources. Multiple PDDDCHs may also operate in one beam pair using multiple access in the time, frequency or code domain. In addition, a common PDDDCH may be used to carry data in broad mmW antenna patterns associated with the common PDDCCH.

Demodulation reference signals (DMRS) are symbols embedded in the transmission for channel estimation for PDDDCH. They are placed in both the time and frequency domain according to pre-defined patterns to ensure correct interpolation and reconstruction of the channel.

Figure 5:
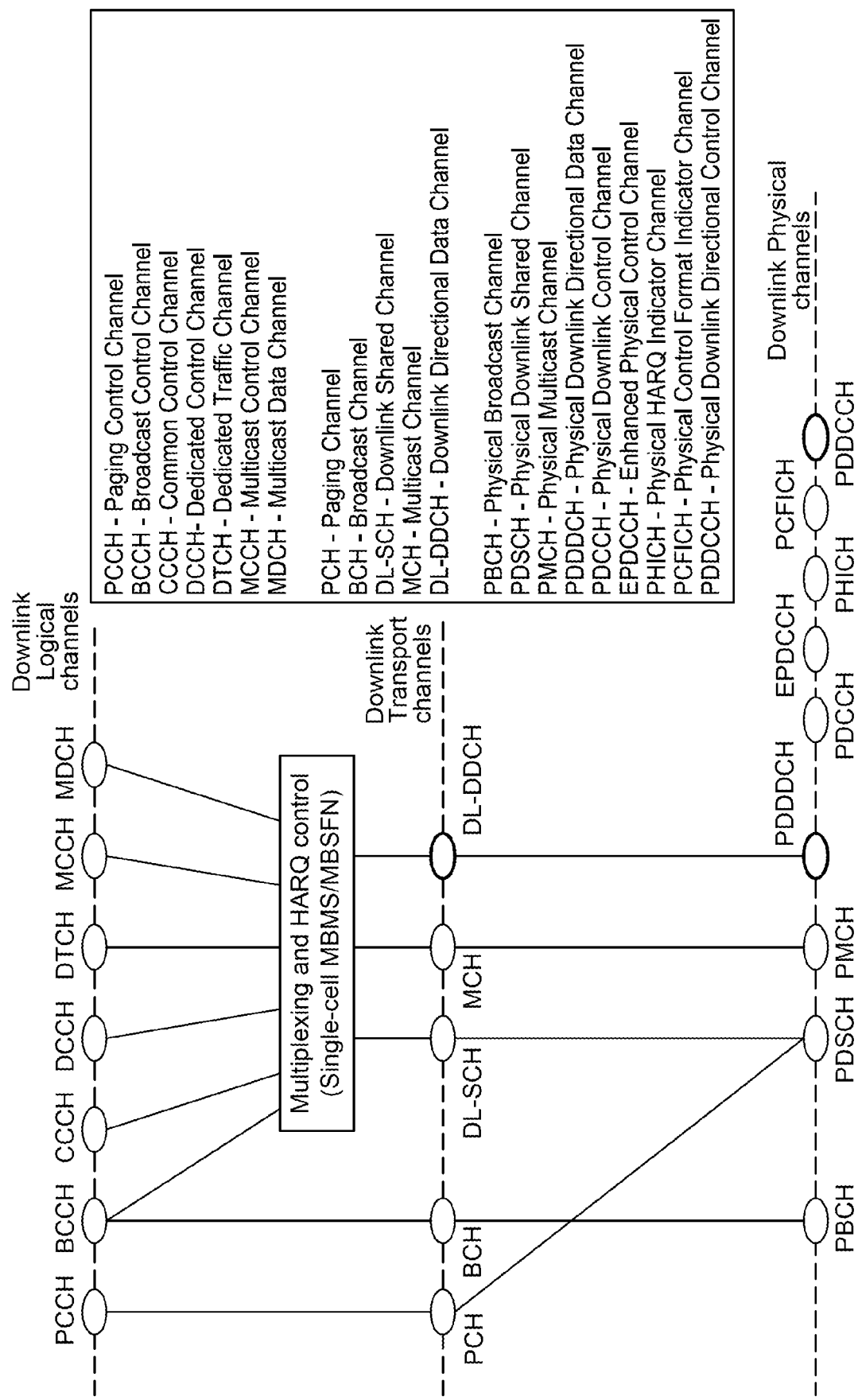
FIG. 5 is a diagram of a mmW downlink logical, transport and physical channel mapping.

All channels and reference signals in a narrow beam pair may be beamformed identically and may be considered to be transmitted via one physical antenna port. Given the directivity of the transmission of these channels, carrying broadcast or multicast information may not be an optimal application. The SCmB deployment with mmW downlink data transmission may adopt a channel mapping as illustrated in FIG. 5. FIG. 5 is a diagram of an mmW downlink logical, transport and physical channel mapping.

mWTRU beamforming will now be described. An mWTRU may use a phase antenna array to achieve the beamforming gain necessary to compensate for the high path loss at mmW frequencies, at which the short wavelength may allow a compact form factor of the device design. While an element spacing of 0.5λ is typically used in theoretical performance analysis, in practice, a larger spacing such as 0.7λ may be applied. The phase antenna may apply different beamforming algorithms.

FIG. 6 is a diagram of an example mWTRU utilizing a fully digitized beamforming approach. A fully digitized beamforming approach may have a dedicated radio frequency (RF) chain 602 (e.g., 602a, 602b, 602c and 602d), including an RF processor 603 and an analog-to-digital converter (ADC) 604 for each antenna element 605. Each RF chain 602 is operatively coupled to a broadband (BB) processor 606. The signal 607 processed by each antenna element 605 may be controlled independently in phase and amplitude to optimize the channel capacity. The configuration, as shown in FIG. 6, has the same number of RF chains 602, RF processors 603 and ADCs 604 as that of antenna elements 605, although, this is not required. While offering very high performance, this mWTRU antenna configuration may impose a very high cost and complexity in implementation and cause high energy consumption in operation. Thus, fully digitized beamforming may not be initially adopted and may become feasible in the future with advanced technology.

FIG. 7 is a diagram of an example mWTRU utilizing analogue beamforming with one phase antenna array (PAA) 701 and one RF chain 702. The RF chain may include an RF processor 703 and an ADC 704 coupled to a BB processor 706. Analogue beamforming, as shown in FIG. 7, may apply only one RF chain for a PAA. Each antenna element 705 configured to received signal 707 may be connected to a phase shifter 708 that may be used to set the weight W for beam forming and steering. Thus, the required number of RF chains may be significantly reduced. This may reduce the energy consumption as well.

It should be noted that in this case, only the phase of the signal at each antenna element is adjusted in beamforming. The phase shifting and combining may be implemented in different stages including RF (as shown in FIG. 7), broadband (BB) analogue, and local oscillator (LO). Each solution may be evaluated in terms of signal loss, phase error, power consumption, and the like.

The mWTRU analogue beamforming algorithms may include fixed codebook-based beamforming, continuous phase shifting beamforming, and the like. In fixed codebook-based beamforming, a grid of beams may comprise of a set of fixed beams. Each beam may be formed by the mWTRU applying a beamforming weight vector v chosen from a pre-defined codebook $v \in \{v_1, v_2, v_3 \ldots v_N\}$ where N denotes the number of fixed beams. Each vector may include pre-calibrated phase shifts for all phase shifters and, thus, may represent a unique analogue beam direction, i.e., "beam". The number of beams may depend on the half-power-beam-width (HPBW) of the beamforming and desired coverage.

Continuous phase shifting beamforming may be used to calculate the desired weight of each phase shifter based on the estimated short-term channel information and may be converted using a high resolution digital-to-analogue converter (DAC) in order to be applied to the phase shifter. It may provide continuous and adaptive beamforming to track the channel conditions. The algorithm may perform well in scenarios with increased multipath, high angular spread and low WTRU mobility.

An mWTRU may combine both the digitized and analogue beamforming by employing a hybrid approach including analogue beamforming performed over the phase array antenna elements each associated with a phase shifter and all connected to one RF chain and digital precoding applied on the baseband signal of each RF chain when there is more than one RF chain. Multiple-input multiple-output (MIMO) schemes may be implemented using digital precoding.

The basic system parameters of hybrid beamforming, for example, digitized and analogue beamforming are: number of data stream, $N_{DATA}$, number of RF chains (TRX), $N_{TRX}$; number of antenna ports, $N_{AP}$; number of antenna elements, $N_{AE}$; and the number of phase antenna arrays, $N_{PAA}$.

Figure 8:
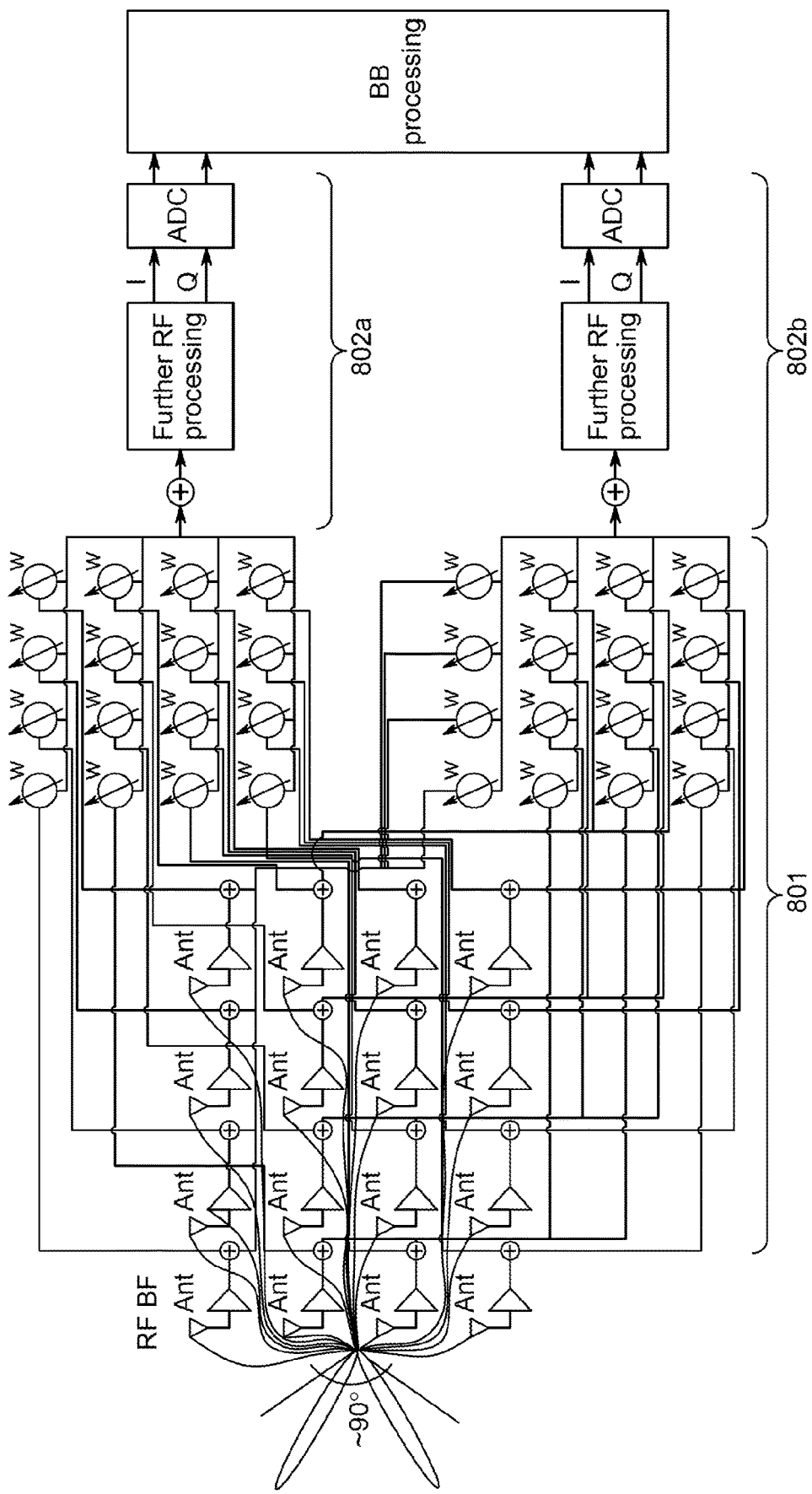
FIG. 8 a diagram of an example mWTRU utilizing analog beamforming with one PAA and two RF chains.

For $N_{PAA} \leq N_{AP} \leq N_{TRX} < N_{AE}$, one PAA may be comprised of multiple antenna elements, e.g., a PAA of size 4×4 has 16 antenna elements. An antenna port may be defined such that the channel over which a symbol on the antenna port is conveyed may be inferred from the channel over which another symbol on the same antenna port is conveyed. There may be one resource grid per antenna port. The LTE R12 antenna port configurations may be used. Cell-specific reference signals may support a configuration of one, two, or four antenna ports and may be transmitted on antenna ports p=0, p∈{0, 1} and p∈{0, 1, 2, 3}, respectively. Multicast-broadcast single-frequency network (MBSFN) reference signals may be transmitted on antenna port p=4. WTRU-specific reference signals associated with physical downlink shard channel (PDSCH) may be transmitted on antenna port(s) p=5, p=7, p=8, or one or several of p∈{7, 8, 9, 10, 11, 12, 13, 14}. Demodulation reference signals associated with enhanced physical downlink control channel (EPDCCH) may be transmitted on one or several of p∈{107, 108, 109, 110}. Positioning reference signals may be transmitted on antenna port p=6. CSI reference signals may support a configuration of one, two, four or eight antenna ports and may be transmitted on antenna ports p=15, p∈{15, 16}, p∈{15, 16, 17, 18}, and p∈{15, 16, 17, 18, 19, 20, 21, 22}, respectively. Each antenna port may carry beamformed reference signals uniquely associated with each respective antenna port. The reference signals may be used to identify the antenna port. When the number of TRX signals equal the number of antenna elements, for example, one RF chain per antenna element, the antenna configuration becomes the fully digitized solution as shown in FIG. 6. One PAA may be connected to one RF chain, as shown in FIG. 7, or multiple RF chains depending on the system requirement and configuration. For example, in FIG. 8, which is a diagram of an example mWTRU utilizing analog beamforming with one PAA 801 and two RF chains 802a and 802b, one PM of size 4×4 is connected to two RF chains and each RF chain has a set of 16 phase shifters. The PAA may form two narrow beam patterns within a +45° and −45° coverage in the azimuth plane. In this configuration, $N_{PAA} < N_{AP} = N_{TRX} < N_{AE}$.

Figure 9:
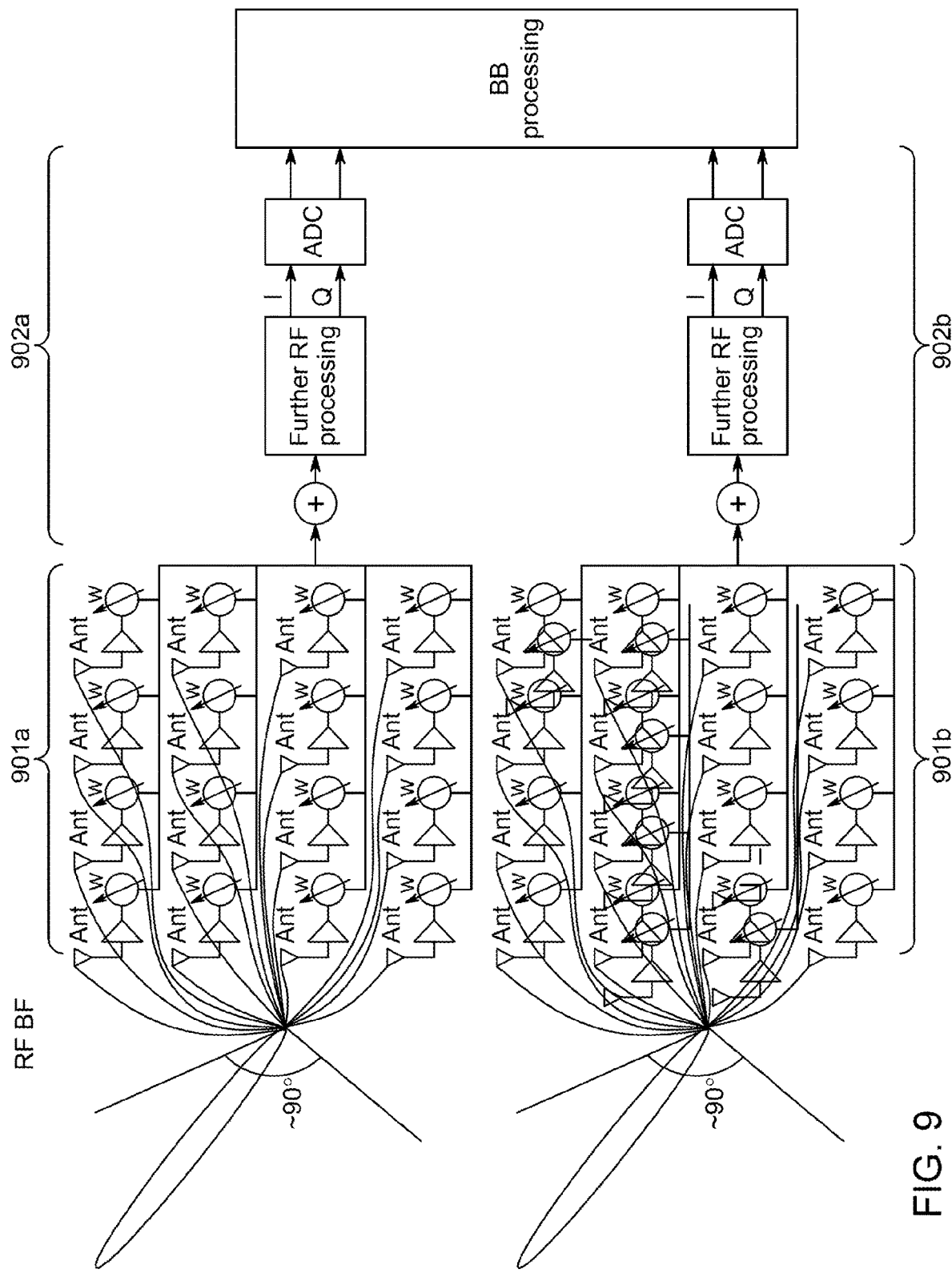
FIG. 9 is a diagram of an example mWTRU utilizing analog beamforming with two PAAs and two RF chains.

FIG. 9 is a diagram of an example mWTRU utilizing analog beamforming with two PAAs 901a and 901b and two RF chains 902a and 902b. In the example shown in FIG. 9, there are two PAAs and each PAA has a dedicated RF chain, for example, $N_{PAA} = N_{AP} = N_{TRX} < N_{AE}$. This configuration may allow spatial independence between the two simultaneous beams by placing the PAAs at different orientations e.g. in the azimuth plane. An aligned PAA arrangement may provide an aggregated larger coverage compared to the configuration in FIG. 8. Both configurations with two RF chains may apply MIMO with two data streams.

Figure 10:
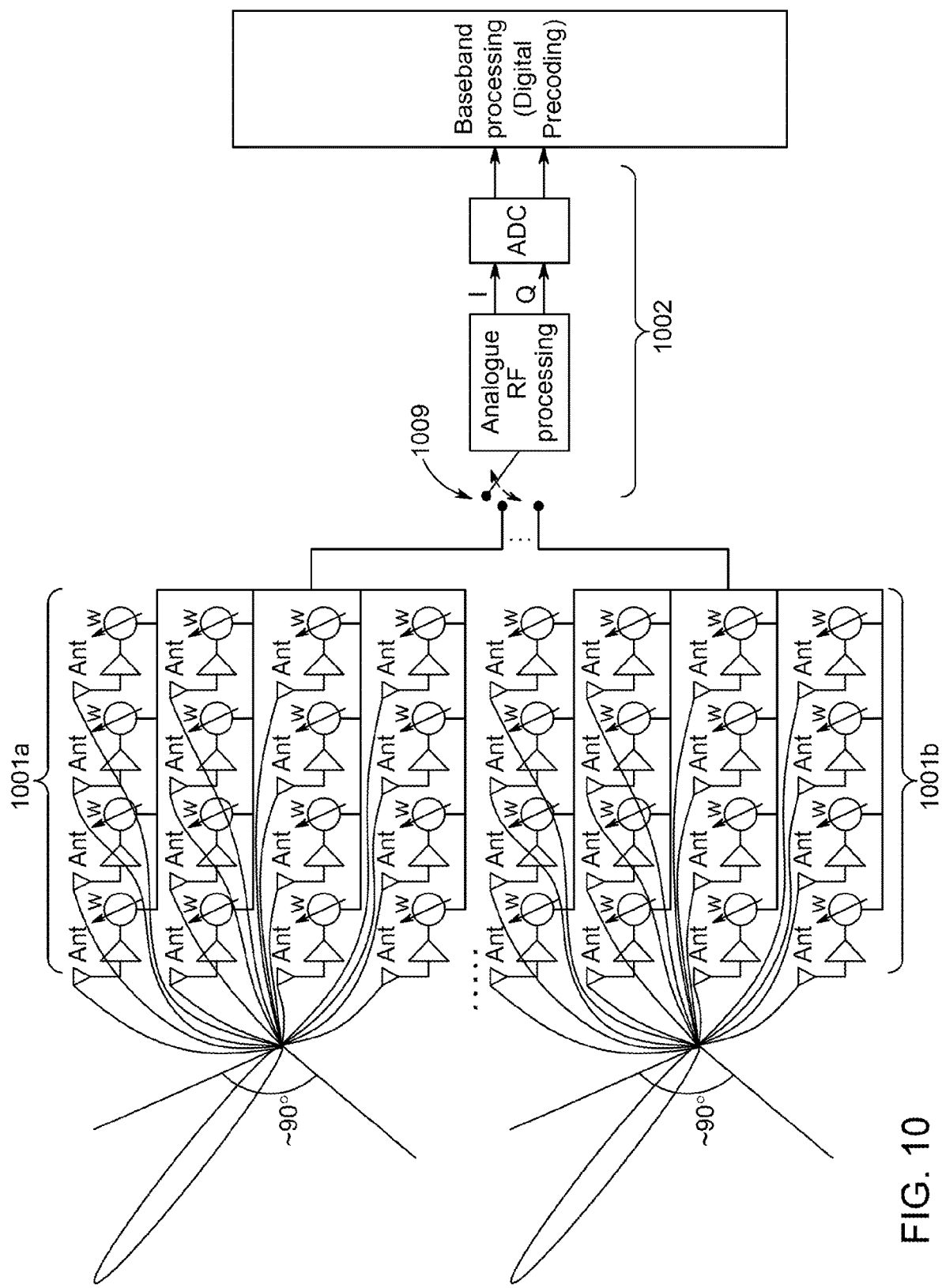
FIG. 10 is a diagram of an example mWTRU utilizing analogue beamforming with two PAAs and one RF chain.

For $N_{AE} > N_{PAA} > N_{AP} = N_{TRX}$, multiple PAAs 1001a and 1001b may be connected to a single RF chain 1002 by using a switch 1009 as depicted in FIG. 10. FIG. 10 is a diagram of an example mWTRU utilizing analogue beamforming with two PAAs 1001a, 1001b and one RF chain 1002. Each PAA 1001a, 1001b may form a narrow beam pattern covering from +45° to −45° in the azimuth plane. They may be oriented separately so a single-beam may also provide a good coverage by using a narrow beam at a different direction at different time instances.

Figure 11A:
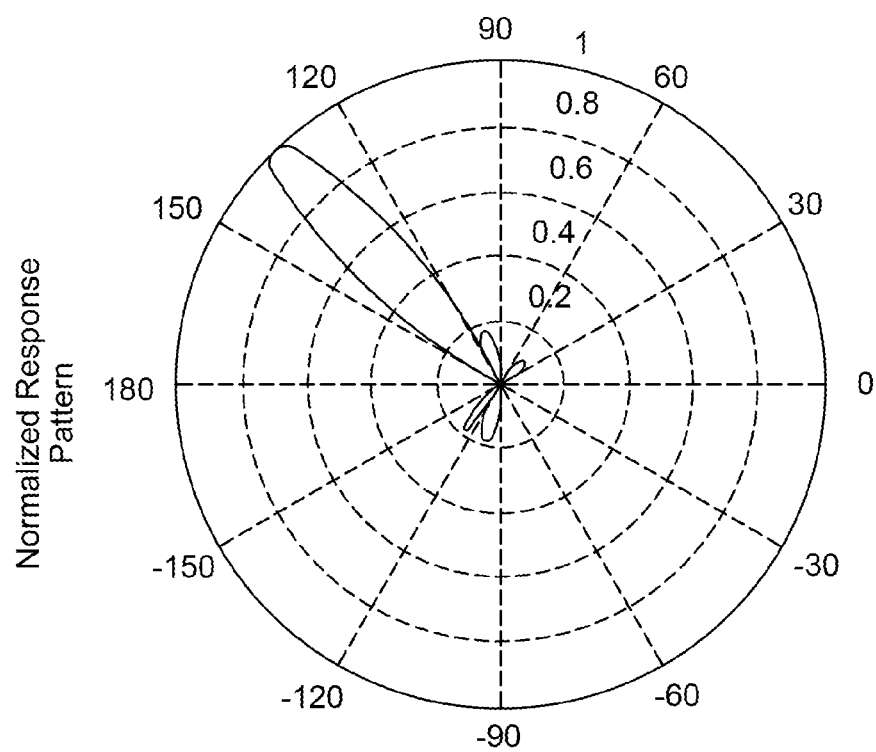
FIG. 11A is an example illustration of a 2D narrow beam pattern.
Figure 11B:
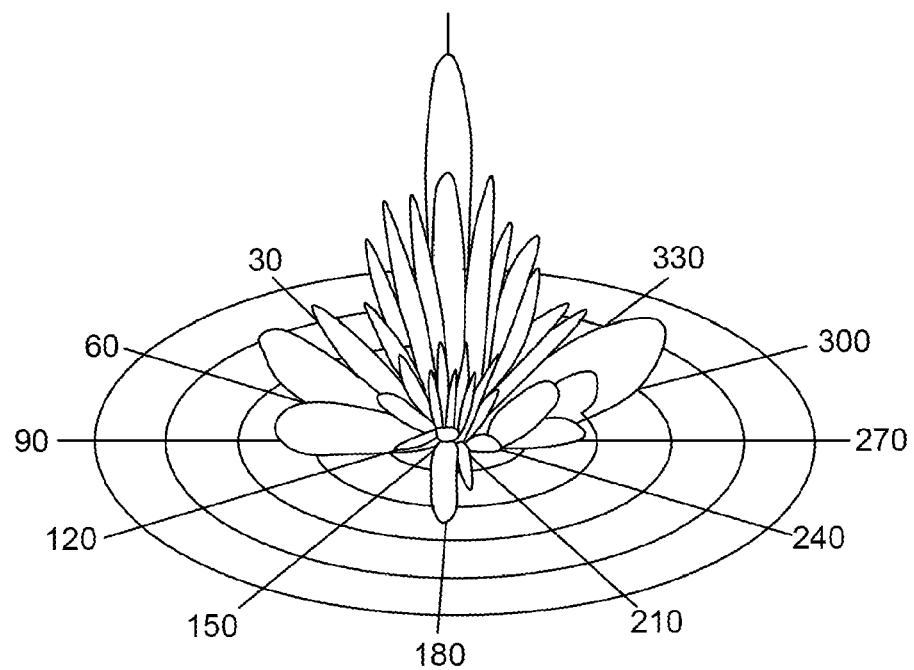
FIG. 11B is an example illustration of a 3D narrow beam pattern.

For $N_{DATA} \leq N_{TRX} \leq N_{AE}$, when $N_{DATA} = N_{TRX} = 1$, an mWTRU may have a single-beam configuration and may operate one beam at a time. The mWTRU beamforming may form the narrow beam pattern such as the one shown in FIGS. 11A and 11B for a 16×16 PAA at the strongest angular direction, e.g., a LOS path obtained from beam measurement. FIG. 11A is an example illustration of a 2D narrow beam pattern. FIG. 11B is an example illustration of a 3D narrow beam pattern.

Figure 12:
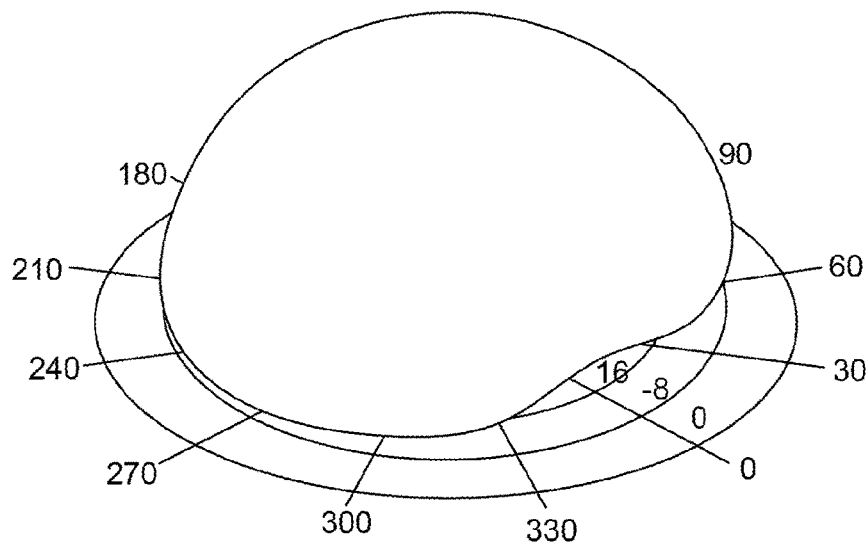
FIG. 12 is an example illustration of a 3D broadside broad beam pattern.

The mWTRU may form a broad beam pattern, e.g., a wide main lobe such as the one shown in FIG. 12 to cover a range of continuous angular directions including both strong and weak ones in-between. FIG. 12 is an example illustration of a 3D broadside broad beam pattern. It should be noted that the antenna gain may be reduced considerably with a broad beam pattern and the link budget may worsen.

When $N_{DATA} = 1 < N_{TRX}$, for example when $N_{TRX} = 2$, an mWTRU may have two simultaneous beam patterns and the beam patterns may be different and also may be used for different applications. For example, the mWTRU may place two narrow beam patterns at different angular incoming directions to receive one data stream. For example coherent beam combining may be used to utilize the spatial diversity and mitigate the blockage effect and/or weak line-of-sight (LOS) conditions. The mWTRU may form one narrow beam and one broad beam for different applications. For example, the narrow beam may be used for data transmission and the broad beam for control signaling.

When $1 < N_{DATA} = N_{TRX}$, e.g., the transmission may apply MIMO to increase the capacity, for example in high signal to noise ratio (SNR) channel conditions. The mWTRU may place two narrow beam patterns at different angular incoming directions to receive two data streams in parallel.

The SCmB beam forming schemes may also include fixed beam, adaptive beam forming, e.g., codebook-based and non-codebook-based, and classical beam forming, e.g., direction-of-arrival (DoA) estimation. Each scheme may require different procedures and may work well in certain scenarios. For example the DoA estimation may require smaller angular spread and an mWTRU may need to transmit an LTE uplink reference signal to ensure DoA accuracy. The fixed beam system may require beam cycling and switch procedures.

It should be noted that the mWTRU antenna configuration and beamforming discussed below are based on a single-beam mWTRU antenna configuration with analogue beamforming as illustrated in FIG. 7. This is not intended to be limiting, and is only intended to serve as an example for illustrative purposes.

Due to the high path loss at mmW frequencies, an mmW data transmission may apply both transmit and receive beamforming. The resulting narrow beam pair may be considered as spatial filtering and may limit the mWTRU to receiving only the incoming angular paths captured within the narrow beam pair. For a single-beam mWTRU, this may significantly increase the susceptibility to blocking caused by WTRU device orientation, moving objects in the surrounding environment or entering shadowing of a building, vegetation, street furniture, and the like.

Periodical downlink reference signal transmission has been applied to support network functions including cell discovery, channel state measurement and broadcast data transmission. The same static mechanism may result in excessive signaling overhead when using narrow antenna pattern sweeping in which in each sweep direction the transmission is repeated. Moreover, the concentration of energy within a narrow antenna pattern may lead to energy waste when no users are located within the downlink antenna pattern coverage at each sweep direction. The efficiency of the traditional pre-defined downlink reference signal transmission may be sub-optimal due to the inherent nature of the narrow antenna pattern transmission.

In a system which may use beamforming in the DL and/or in the UL, initial or other access may be performed using Physical Random Access Channel (PRACH) and/or a random access procedure. Mechanisms are described herein to enable PRACH transmission and/or performance of a random access procedure in a beamformed system, for example, to improve NLOS coverage in the UL and/or to enable the receiving node to select an UL beam (e.g., a preferred or best UL beam).

Terms used herein will now be described. A beam may be one of the lobes, e.g., main/side/grating lobes of a transmit radiation pattern and a receive gain pattern of an antenna array. A beam may also denote a spatial direction that may be represented with a set beamforming weights. A beam may be identified or associated with a reference signal, an antenna port, a beam identity (ID), a scrambling sequence number and may be transmitted and/or received at a specific time and/or frequency and/or code and/or spatial resources. A beam may be formed digitally, in an analogue manner or both (hybrid beamforming). The analogue beamforming may be based on fixed code-book or continuous phase shifting.

A data channel beam may be used to transmit data channel, data channel beam, PDSCH, mPDSCH, mmW PDSCH, mmW data channel, directional PDSCH, beamformed data channel, spatial data channel, data channel slice or high frequency data channel. A data channel beam may be identified or associated with a reference signal, an antenna port, a beam identity (ID), a scrambling sequence number and may be transmitted and/or received at a specific time and/or frequency and/or code and/or spatial resources.

A control channel beam may be used to transmit control channel, control channel beam, PDCCH, mPDCCH, mmW PDCCH, mmW control channel, directional PDCCH, beamformed control channel, spatial control channel, control channel slice or high frequency control channel. A control channel beam may be identified or associated with a reference signal, an antenna port, a beam identity (ID), a scrambling sequence number and may be transmitted and/or received at a specific time and/or frequency and/or code and/or spatial resources. Control channel beam duration may be a number of OFDM symbols in a TTI occupied by one control channel beam. Control region may be the number of OFDM symbols in a TTI occupied by all the control channel beams transmitted in the TTI.

A measurement beam may be used to transmit a signal or channel for beam measurement including beam reference signal, beam measurement reference signal, common reference signal (CRS), channel state information-reference signal (CSI-RS), channel state information-interference measurement (CSI-IM), etc. A measurement beam may be identified or associated with a reference signal, an antenna port, a beam identity (ID), a scrambling sequence number and may be transmitted and/or received at a specific time and/or frequency and/or code and/or spatial resources.

In some embodiments described herein, mB, SCmB, eNB, cell, small cell, Pcell, Scell may be used interchangeably. In some embodiments, operate may be used interchangeably with transmit and/or receive. In some embodiments, component carrier, mmW carrier may be used interchangeably with serving cell.

In some embodiments, UE may be substituted for eNB and/or vice versa and still be consistent with concepts disclosed herein. In some embodiments, UL may be substituted for DL and/or vice versa and still be consistent with concepts disclosed herein.

In some embodiments, a channel may refer to a frequency band which may have a center or carrier frequency and a bandwidth. Spectrum may include one or more channels which may or may not overlap. Channel, frequency channel, wireless channel, and mmW channel may be used interchangeably. Accessing a channel may be the same as using the channel (e.g., transmitting and/or receiving on or using).

In some embodiments, a channel may refer to an mmW channel or signal such as an uplink or downlink physical channel or signal. Downlink channels and signals may include one or more of mmW synchronization signal, mmW broadcast channel, mmW cell reference signal, mmW beam reference signal, mmW beam control channel, mmW beam data channel, mmW hybrid Automatic Repeat reQuest (ARQ or HARQ) indicator channel, mmW demodulation reference signal, Primary Synchronization Signal (PSS), Secondary Synchronization Signal (SSS), DeModulation Reference Signal (DMRS), CRS, CSI-RS, Physical Broadcast Channel (PBCH), Physical Downlink Control Channel (PDCCH), Physical Hybrid ARQ Indicator Channel (PHICH), Enhanced Physical Downlink Control Channel EPDCCH and Physical Downlink Shared Channel (PDSCH). Uplink channels and signals may include one or more of mmW PRACH, mmW control channel, mmW data channel, mmW beam reference signal, mmW demodulation reference signal, PRACH, Physical Uplink Control Channel (PUCCH), Sounding Reference Signal (SRS), DMRS and Physical Uplink Shared Channel (PUSCH). Channel and mmW channel may be used interchangeably. Channels and signals may be used interchangeably. PRACH and preamble may be used interchangeably.

In some embodiments, data/control may mean data and/or control signals and/or channels. Control may include synchronization, and control data may include synchronization data. The data/control may be mmW data/control. Data/control and data/control channels and/or signals may be used interchangeably. Channels and signals may be used interchangeably. The terms control channel, control channel beam, PDCCH, mPDCCH, mmW PDCCH, mmW control channel, directional PDCCH, beamformed control channel, spatial control channel, control channel slice, high frequency control channel may be used interchangeably. The terms data channel, data channel beam, PDSCH, mPDSCH, mmW PDSCH, mmW data channel, directional PDSCH, beamformed data channel, spatial data channel, data channel slice, high frequency data channel may be used interchangeably.

In some embodiments, channel resources may be resources (e.g., 3GPP LTE or LTE-A resources) such as time and/or frequency and/or code and/or spatial resources which may, e.g., at least sometimes, carry one or more channels and/or signals. In some embodiments, channel resources may be used interchangeably with channels and/or signals.

The terms mmW beam reference signal, mmW reference resource for beam measurement, mmW measurement reference signal, mmW channel state measurement reference signal, mmW demodulation reference signal, mmW sounding reference signal, reference signal, CSI-RS, CRS, DM-RS, DRS, measurement reference signal, reference resource for measurement, CSI-IM, and measurement RS may be used interchangeably. The terms mmW cell, mmW small cell, SCell, secondary cell, license-assisted cell, unlicensed cell, and LAA cell may be used interchangeably. mmW cell, mmW small cell, PCell, primary cell, LTE cell, and licensed cell may be used interchangeably.

The terms interference and interference plus noise may be used interchangeably.

A UE may determine the UL and/or DL directions of one or more subframes according to one or more received and/or configured time division duplex (TDD) UL/DL configurations. UL/DL and UL-DL may be used interchangeably.

In some embodiments, transmit power, power, antenna array transmit power may be used interchangeably.

In some embodiments, cmW and mmW may be used interchangeably.

A beam paring procedure in accordance with an embodiment will now be described. A SCmB may transmit a sector-wide mmW broad beam to provide coverage and multiple mmW narrow beams, for example, a grid of narrow beams for data transmission. Each narrow transmit beam may carry BSRS, for example, as described herein. BSRS may be used for one or more purposes such as downlink beam initial acquisition, for example, initial acquisition, tracking, measurement, and the like. Each narrow transmit beam may carry AARS which may be used for beam pairing procedures. When a transmission narrow beam is scheduled to an mWTRU for data transmission, the beam may also carry BSRS, dedicated PDDCCH, PDDDCH and associated DMRS at the assigned resource allocation.

The beam pairing procedure may include one or more of beam forming, beam steering, beam switching, and the like. Beam pairing may involve transmission and/or reception antenna pattern control. The control may include manipulation based on angle of arrival (AoA) and/or angle of departure (AoD) in one or both azimuth and elevation planes. AoA may be used herein to represent AoA in the azimuth plane and/or elevation plane. AoA in the azimuth plane is referred to as azimuth/horizontal AoA. AoA in the elevation plane may be referred to as elevation/zenith AoA (EoA/ZoA). AoD may be used herein to cover AoD in the azimuth and/or elevation plane. AoD in the azimuth plane may be referred to as azimuth/horizontal AoD in the elevation plane, referred as elevation/zenith AoD (EoD/ZoD).

As noted above, the term "beam" may be one of the lobes, for example, as the main lobe of the radiation of an antenna array, for example, an antenna pattern. The beam width may be characterized using half power beamwidth (HPBW). The HPBW may be the angle between two directions on either side of a main lobe, in which the radiation intensity is one half of the maximum value of the radiation pattern. The beam width may depend on an antenna array's configuration in terms of number of elements, element spacing, element pattern, and the like. In general, an antenna array with a large number of antenna elements, e.g., a uniform rectangular array (URA) of 16×16 elements, may generate a narrower beamwidth compared to an antenna array with fewer antenna elements, e.g., an URA of 4×4 elements.

When an mWTRU camps on an SCmB, it may subsequently receive a system information broadcast (SIB) specific to the mmW downlink beam configuration parameters that may include but are not limited to the following: mmW sector identity, the number of downlink transmit narrow beams per sector, BSRS frequency allocation, BSRS sequence configuration, BSRS periodicity, common PDDCCH transport format, common PDDCCH frequency allocation, common PDCCCH periodicity, and the like.

The above mentioned configuration parameters may provide an mWTRU with information, for example, some or all necessary information, to detect a reference signal, for example, BSRS, and/or receive a control channel, for example, a common PDDCCH in a mmW beam, for example, a mmW broad beam. Alternatively, the common PDDCCH configuration may be pre-determined.

Figure 13:
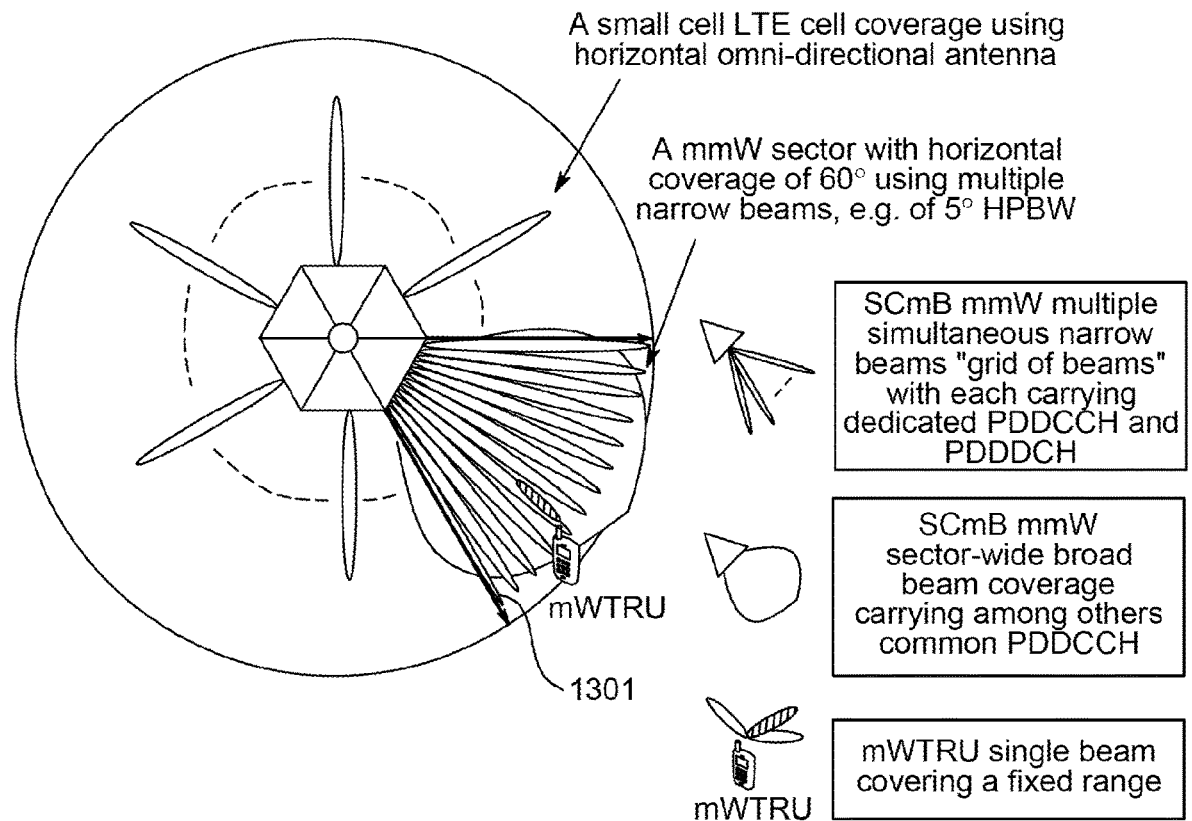
FIG. 13 is a diagram of an example mmW SCmB downlink broad-beam and narrow-beam configuration.

FIG. 13 is a diagram of an example mmW SCmB downlink broad-beam and narrow-beam configuration. In order for an mWTRU to detect, identify, and measure a downlink transmit measurement reference beam, each transmit narrow beam may carry a unique identity that may be implemented using: an MRS sequence index and a small data package. The AARS sequence index may be the identity (ID) of each transmit beam. It may be embedded in the reference sequence design, which may be determined by physical layer operation. For example, the AARS of all narrow transmit beams 1301 of the same sector, as shown in FIG. 13, may apply a sequence of good autocorrelation and cross-correlation properly, e.g., one Zadoff-Chu (ZC) base sequence with different cyclic shift, Walsh code, Golay sequence, and the like. A SCmB may broadcast in LTE SIB the ZC base sequence index of each sector. Based on the reported beam measurement, the SCmB may determine which mmW sector and which mmW transmit beams may be associated with the reporting mWTRU. The small data package may include the identity of each transmit beam. For example, a numeric beam ID and sector ID may be carried in a small payload or data package. The AARS may provide the required timing, frequency synchronization, and channel estimation, which may enable the demodulation and decoding of the payload information.

Figure 14:
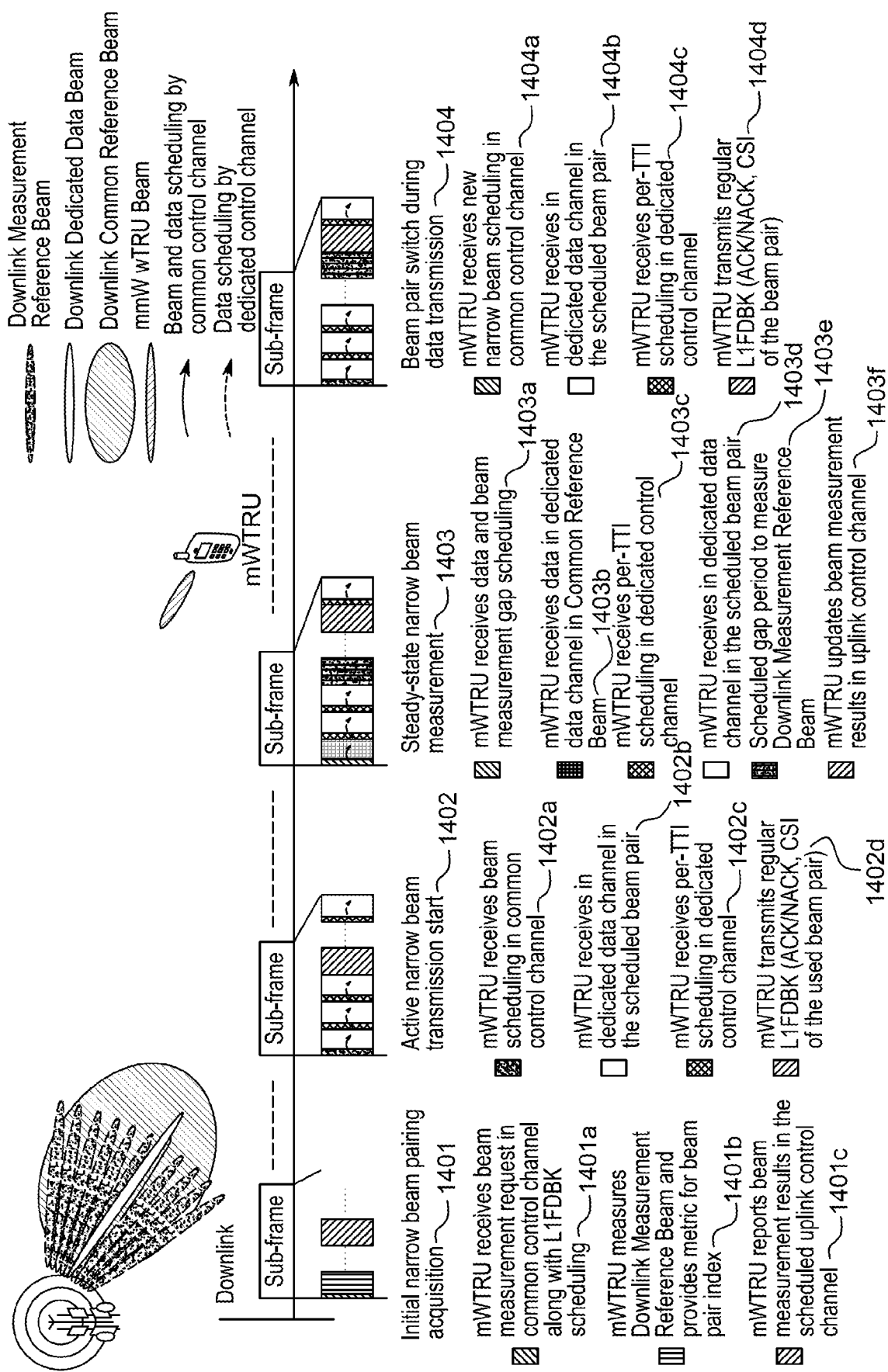
FIG. 14 is a diagram of a narrow beam pairing procedure.

Beam pairing using MRS is disclosed herein. When an mWTRU has performed a random access channel (RACH) procedure and begins receiving the common control channel carried in the cell-wide broad mmW antenna pattern in a CONNECTED mode, it may perform a beam pairing procedure. FIG. 14 is a diagram of an example narrow beam pairing procedures, including initial narrow beam pairing acquisition 1401, active narrow beam transmission start 1402, steady-state narrow beam measurement 1403, and beam-pair switch during data transmission 1404.

During initial narrow beam pairing acquisition 1401, the mWTRU may receive a beam measurement request in a common control channel along with L1FDBK scheduling 1401a, the mWTRU may measure Downlink Measurement Reference Beam and provide metric for beam pair index 1401b, and the WTRU may report beam measurement results in the scheduled uplink control channel 1401c.

During active narrow beam transmission start 1402, the mWTRU may receive narrow beam scheduling in a common control channel 1402a, the mWTRU may receive in a dedicated data channel in the scheduled beam pair 1402b, the mWTRU may receive per-TTI scheduling in the dedicated control channel 1402c, and the mWTRU may transmit regular L1FDBK (ACK/NACK, CSI of the used beam pair) 1402d.

During steady-state narrow beam measurement 1403, the mWTRU may receive data and narrow beam measurement gap scheduling 1403a, the mWTRU may receive data in a dedicated data channel in a Common Reference Beam 1403b, the mWTRU may receive per-TTI scheduling in the dedicated control channel 1403c, and the mWTRU may receive in the dedicated data channel in the scheduled beam pair 1403d, a scheduled gap period to measure Downlink Measurement Reference Beam may be realized 1403e, and mWTRU may update beam measurement results in an uplink control channel 1403f.

During a beam-pair switch during data transmission 1404, the mWTRU may receive new narrow beam scheduling in a common control channel 1404a, the mWTRU may receive in a dedicated data channel in the scheduled beam pair 1404b, the mWTRU may receive per-TTI scheduling in the dedicated control channel 1404c, and the mWTRU may transmit regular L1FDBK (ACK/NACK, CSI of the used beam pair) 1404d.

In an embodiment, the mWTRU may perform an on-demand beam measurement procedure. A measurement request and configuration may be provided by an SCmB. The mWTRU may receive a beam measurement request (BMR) on the common control channel, for example, common PDDCCH from the SCmB. The BMR may include one or more parameters and/or sets of parameters which may include one or more of an adaptive antenna reference signal (AARS) sequence, time and frequency resource allocations, uplink grants for BMR feedback, reporting quality metric thresholds, number of quality metrics to report, a new or updated BMR indicator, a BMR trigger, and the like. The time and/or frequency resource allocation for the MRS may be considered as a time and/or frequency schedule for the MRS. The mWTRU may decode the common PDDCCH and receive a BMR from the SCmB using a WTRU-specific network identity such as a cell radio network temporary identifier (C-RNTI). The mWTRU may receive the resource allocation and transport format of the common PDDCCH in higher layer signaling such as in a SIB (or in SIBs) which may be broadcast by the SCmB. The mWTRU may sweep receive beams and/or perform measurements. The mWTRU may sweep one or more narrow receive antenna patterns per the BMR time and frequency resource schedule. The mWTRU may measure the scheduled MRS sequence, obtain the beam-pair-specific quality metric per the BMR quality metric to report, filter the quality metric per the BMR reporting quality metric threshold and report the processed measurement results to the SCmB using the uplink grant scheduled in the BMR. The mWTRU may decode the beam pair schedule information on the common PDDCCH. The mWTRU may form the scheduled narrow or multi-lobe broad receive antenna pattern. The mWTRU may decode the dedicated PDDCCH within the formed beam pair to acquire the per-TTI PDDDCH scheduling information. The mWTRU may receive the PDDDCH from the SCmB accordingly.

In another embodiment, the SCmB may perform an on-demand beam pairing procedure. A dynamically tailored AARS transmission may reduce the signaling overhead and also save the small cell eNB power consumption by sending a reference signal to mWTRU specifically for a beam pairing procedure. The SCmB may receive and measure AoA of an mWTRU's uplink transmission in broad antenna pattern and. based on the measured results. the SCmB may estimate a coarse mWTRU-specific AoD. The SCmB may dynamically schedule and transmit an mWTRU-specific AARS in a narrow antenna pattern radiated toward the mWTRU. The SCmB may send a BMR on the common control channel (common PDDCCH) to the mWTRU and schedule the mWTRU to receive the transmitted AARS. The SCmB may monitor the BMR uplink grant resource allocation per the BMR and receive an uplink beam measurement reporting from the mWTRU per the BMR uplink grant information. The SCmB may process the beam measurement quality metrics with scheduling statistics, including but to limited to QoS and mWTRU-specific historical throughput and determine a narrow beam pair scheduling information in common PDDCCH. The SCmB may send the narrow or multi-lobe broad downlink antenna pattern to the mWTRU and transmit PDDDCH to the mWTRU.

Figure 15:
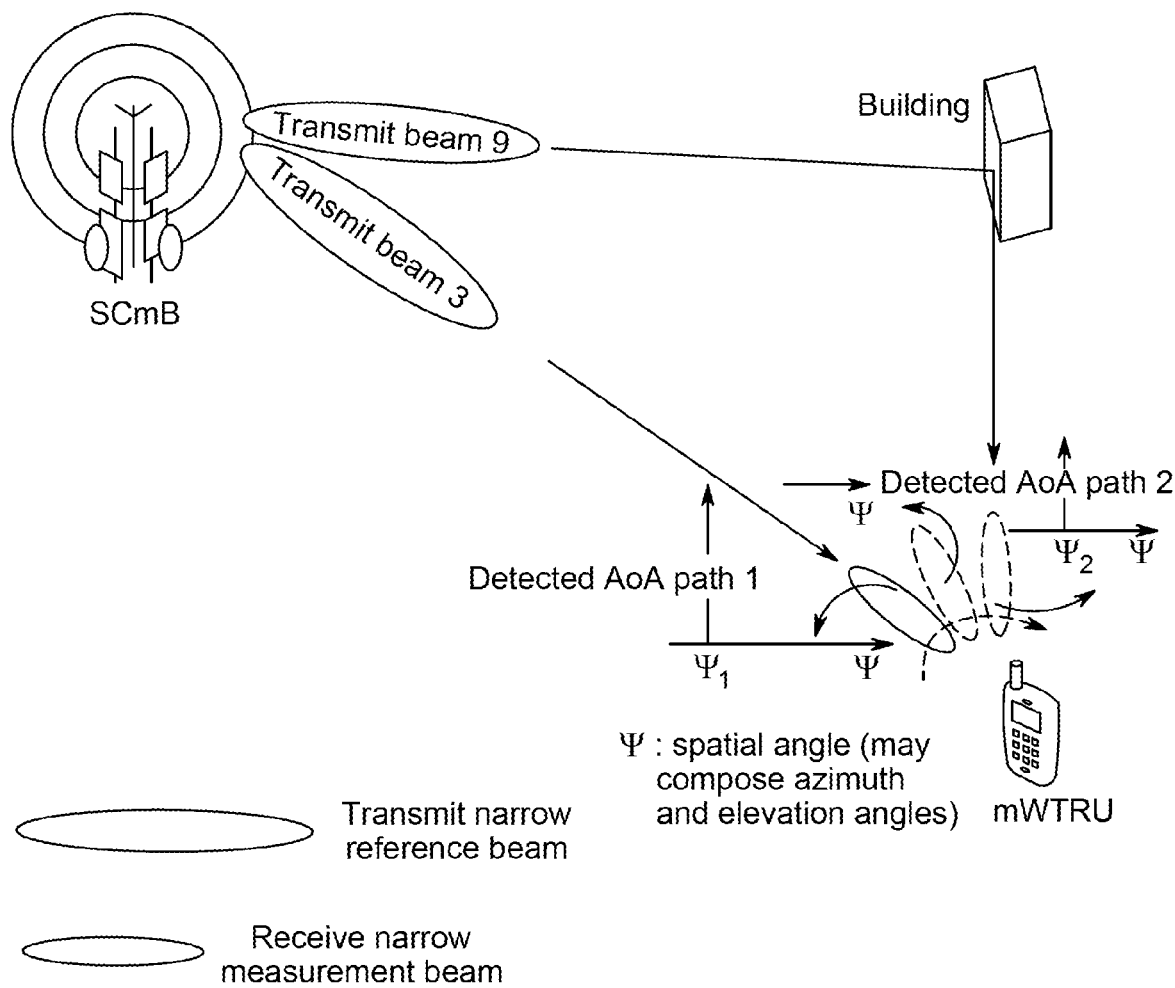
FIG. 15 is a diagram of an mWTRU receive antenna pattern sweep for spatial path detection.

An mWTRU may perform an automated periodical and/or triggered beam measurement procedure. The common PDDCCH may be decoded by the mWTRU and a BMR using a WTRU-specific network identity may be received, such as a cell-radio network temporary identifier (C-RNTI). It should be noted that all information required to receive the common PDDCCH, including resource allocation and a transport format, may be pre-configured in LTE SIB. The BMR may include all information of the transmitted AARSs. An mWTRU may form one or more narrow receive antenna patterns and initiate receive sweeping per the sweeping pattern, periodicity and other configuration parameters according to the mWTRU capability and network configurations. The mWTRU may receive the network configurations on beam sweeping in higher layer signaling such as SIB (or SIBs) which may be broadcast. For example, the mWTRU depicted in FIG. 15 may sweep a receive beam over the entire coverage area. The mWTRU may sweep and cover the range of spatial angles, $\psi$. The range may depend on the beamwidth, the orientation of the antenna array, the number of antenna elements of the PAA, and other additional factors. The spatial angle may be represented by the azimuth angle and elevation angle. FIG. 15 is a diagram of an mWTRU receive antenna pattern sweep for spatial path detection.

The mWTRU may correlate AARSs over a pre-configured observation time at each sweeping position, for example, a receive beam direction. The mWTRU may use a control word to denote the receive beam direction. The mWTRU may convert the control word by a DAC to apply the phase shifters each connected to an antenna element. The beamwidth may be kept very narrow in order to provide higher resolution in detection of AoA paths and each control word may uniquely represent an AoA.

The mWTRU may compare the AARS correlation result with a pre-defined or scheduled threshold to determine a ranking of AARS. The mWTRU may apply another control word to the phase shifter using another receive beam direction and repeat the MRS correlation. The MRS may have a property that may be used for a unique identification. For example, an AARS sequence may use cyclic shift value as a specific transmit beam identity.

The AARS sequence may carry explicit transmit beam identity and other related information in a small data packet. The mWTRU may synchronize in timing and frequency with the detected AARS and may demodulate and decode the payload to obtain the transmit beam identity and other information.

The mWTRU may quantize the measured BSRS antenna reference signal strength and/or signal-to-noise ratio into a transmit beam quality metric according to a pre-defined look-up table. The mWTRU may link quantized measurement quality metric and a corresponding transmit beam identity to the applied beamforming control word.

The mWTRU may create a beam measurement record updated after each sweep, and store the beam measurement record in a memory of the mWTRU. The measurement record is shown in TABLE 2 below. According to the example in Table 2, the mWTRU may have detected two transmit beams, transmit beam 3 and transmit beam 9 at AoA $\psi_1$ and $\psi_2$, which the mWTRU may calculate based on the beamforming control words, respectively. The mWTRU may map each receive beamforming control word uniquely to a receive beam index, which may facilitate receive beam scheduling.

TABLE 2

EXAMPLE mWTRU INTERNAL BEAM MEASUREMENT RECORD

| mWTRU Receive Beamforming Control Word | mWTRU Receive Beam Index | Detected Transmit Beam Identity | Corresponding AoA | Transmit Beam Quantized Quality Metric |
|---|---|---|---|---|
| {10010 . . . 110} | Index$_1$ | 3 | $\Psi_1$ | X$_1$ |
| {11100 . . . 101} | Index$_2$ | 9 | $\Psi_2$ | X$_2$ |

The mWTRU may report the detected transmit beam identity, associated receive beam index, and beam pair quality metric to the network. The report may be as shown in the example in Table 3.

TABLE 3

EXAMPLE BEAM MEASUREMENT REPORT

| mWTRU Receive Beam Index | Detected Transmit Beam Identity | Transmit Beam Quantized Quality Metric |
|---|---|---|
| Index$_1$ | 3 | X$_1$ |
| Index$_2$ | 9 | X$_2$ |

Figure 16:
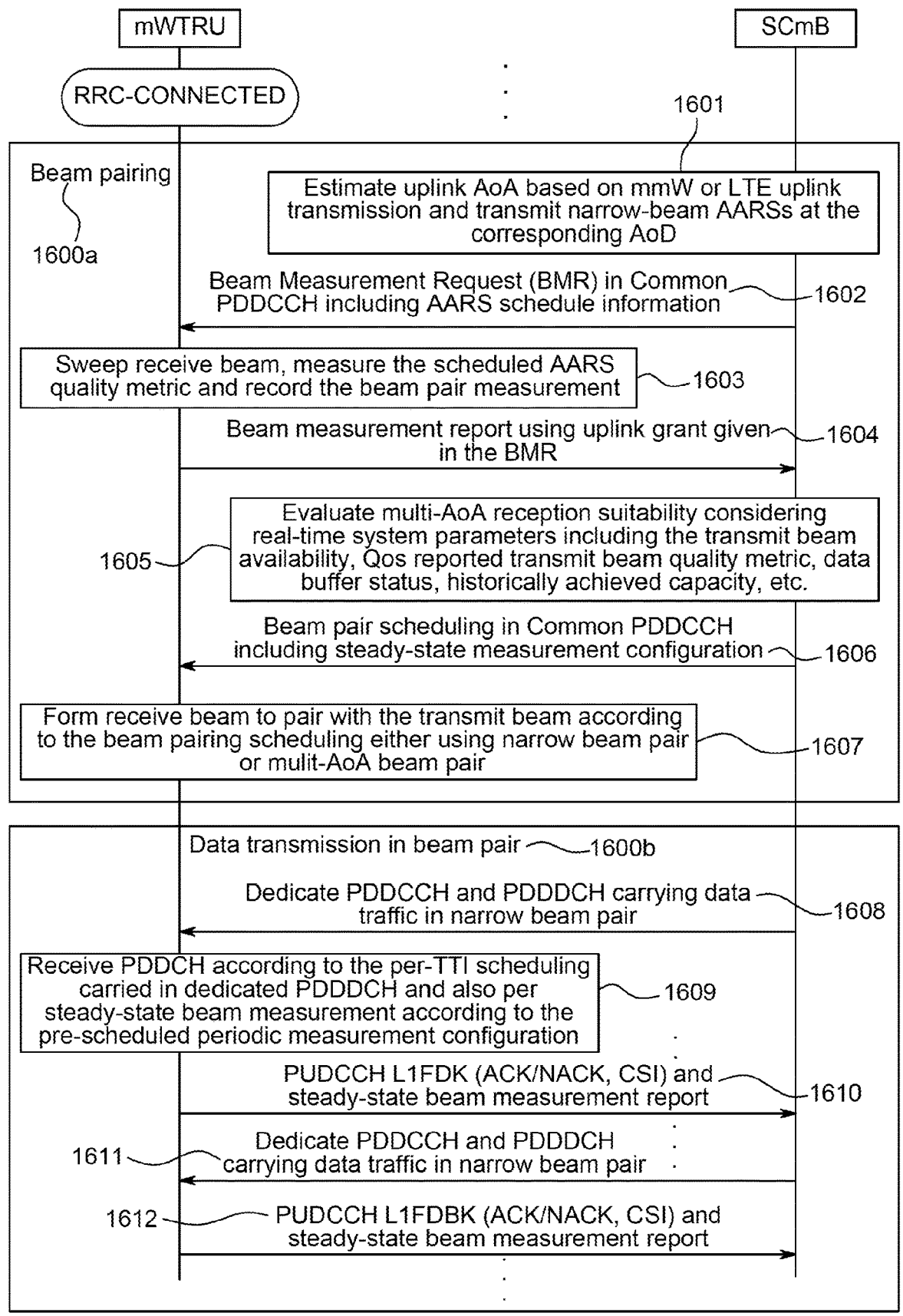
FIG. 16 is a call flow for a mmW beam pairing messaging procedure.

FIG. 16 is a call flow for a mmW beam pairing messaging procedure 1600a and a data transmission using a beam pair 1600b. For example, during beam pairing 1600a, the SCmB may estimate uplink AoA based on mmW or LTE uplink transmission and transmit narrow-beam AARSs at the corresponding AoD 1601, the SCmB may transmit a BMR in Common PDDCCH including AARS schedule information in a downlink mmW broad-beam transmission 1602, the mWTRU may sweep a receive beam, measure the scheduled AARS quality metric and record the beam pair measurement 1603, the mWTRU may transmit a beam measurement report using uplink grant given in the BMR using an uplink mmW/LTE broad-beam transmission 1604, the SCmB may evaluate multi-AoA reception suitability considering real-time system parameters including the transmit beam availability, QoS, reported transmit beam quality metric, data buffer status, historically achieved capacity, etc. 1605, the SCmB may transmit beam pair scheduling in Common PDDCCH including steady-state measurement configuration using a downlink mmW broad-beam transmission 1606, and the mWTRU may form a receive beam to pair with the transmit beam according to the beam pairing scheduling either using narrow beam pair or multi-AoA beam pair 1607.

During data transmission using the beam pair 1600b, the SCmB transmits dedicated PDDCCH and PDDDCH carrying data traffic in narrow beam pair using a downlink mmW narrow beam pair transmission 1608, the mWTRU may receive the PDDDCH according to the per-TTI scheduling carried in dedicated PDDCCH and also perform steady-state beam measurement according to the pre-scheduled periodic measurement configuration 1609, the mWTRU may transmit Physical Uplink Dedicated Control Channel (PUDCCH)

layer 1 feedback (L1FDBK) (e.g., an ACK/NACK, CSI, etc.) and a steady-state beam measurement report using an uplink mmW narrow beam pair transmission 1610, the SCmB may transmit dedicated PDDCCH and PDDDCH carrying data traffic in narrow beam pair using a downlink mmW narrow beam pair transmission 1611, the mWTRU may transmit PUDCCH L1FDBK (e.g., ACK/NACK, CSI) and a steady-state beam measurement report using an uplink mmW narrow beam pair transmission 1612, and so on.

The mWTRU may accelerate the MRS measurement by applying an mmW quasi or broad beam sweep and narrow down the angular search range before beam measurement. An mWTRU may perform the sweep periodically or the sweep may be triggered by network measurement requests from the SCmB in order to provide input to the scheduling procedure. The measurement request may be selective, by configuring a targeted beam measurement for one or a set of transmit beams. An mWTRU may receive from the SCmB a measurement gap configuration in L1 control signaling and/or higher layer signaling. During the measurement gap, the mWTRU may interrupt a data transmission and perform a beam measurement.

Beam pairing using Random Access Channel (RACH) is disclosed herein. Beam pairing may be performed in connection with a RACH procedure, for example, initiated in IDLE mode. The beam pairing and/or RACH procedure may be performed when an mWTRU has not been configured with a network identity yet. For example, a RACH preamble transmission, which may use a narrow beam for the transmission, may be used to pair the beams for the data transmission.

In this embodiment, an mWTRU may perform a preamble transmission procedure which may be a fixed narrow antenna pattern preamble transmission procedure. BSRS may be substituted for Beam Measurement Reference Signal (BMRS) and vice versa and still be consistent with what is disclosure herein. A configuration may be provided and/or used. An mWTRU may receive a downlink BMRS transmission configuration and/or a RACH configuration. The configuration or configurations may be received from an SCmB. The configuration or configurations may be received in higher layer signaling such as in a SIB or SIBs which may be broadcast to the mWTRU. The configuration or configurations which may be received in a SIB or SIBs may be received in common PDDDCH or in a PDDDCH which may be indicated by a common PDDCCH. The configuration or configurations may be received via an mmW cell or an LTE cell for example in the case of carrier aggregation with an LTE cell. The configurations may be provided together or separately. The BMRS transmission configuration may include one or more parameters and/or sets of parameters which may include one or more of a BMRS sequence, BMRS or beam index time and/or frequency resource allocation for the BMRS, reporting quality metric thresholds, number of quality metrics to report, among others. A parameter or set of parameters may be associated with a beam such as a DL beam. The time and/or frequency resource allocation for the BMRS may be considered as a time and/or frequency schedule for the BMRS. The RACH configuration may comprise of a mapping between BMRS sequence or index (e.g., BMRS or beam index) and one or more (e.g., a set of) parameters for a RACH or preamble transmission such as the preamble transmission sequence, transmit time instance, frequency resource allocation, initial power offset, transmit beam pattern or information from which to determine the transmit beam pattern, etc. For one or each RACH or preamble parameter such as the transmission sequence, transmit time, and/or frequency resource allocation, a set of parameters may be provided by the SCmB from which the mWTRU may choose, e.g., one, for its transmission of the RACH or preamble. The RACH configuration may include a mapping for each of a set of BMRS sequences or indices (e.g., BMRS or beam indices). The RACH configuration or RACH parameters may include a RACH acknowledgement configuration which may be associated with a BMRS. The RACH acknowledgement configuration may identify or include information to enable determination of the receive antenna pattern which may be used for reception of the RACH acknowledgement. Beam may be substituted for one or more of BMRS, BMRS sequence, BMRS index, and beam index and still be consistent with this disclosure. In some embodiments, one or more of beam, BMRS, BMRS sequence, BMRS index, and beam index may be used interchangeably.

The mWTRU may sweep receive beams and/or perform measurements. The mWTRU may sweep one or more receive beams or antenna patterns which may be narrow receive beams or antenna patterns. The mWTRU may perform the sweep per the configured BMRS time and/or frequency resource schedule. The mWTRU may measure a BMRS according to a BMRS sequence. The mWTRU may measure one or more BMRS that may (e.g., each) be associated with a beam and may determine a maximum measured BMRS. The mWTRU may determine the relative quality or level of two or more BMRS. For example, the mWTRU may determine the maximum measured BMRS and at least the next lower measured BMRS. The mWTRU may transmit to the SCmB a preamble based on the maximum measured BMRS. The mWTRU may transmit the preamble with a transmit beam or antenna pattern which may be formed at the direction of the maximum measured BMRS sequence. The transmit beam or antenna pattern may be in accordance with or based on the RACH configuration mapping (e.g., between BMRS and transmit beam pattern or beam pattern information).

The mWTRU may transmit the preamble at a time instance, e.g., the slot/sub-frame/symbol corresponding to the maximum measured BMRS sequence. The time instance (or instances from which the mWTRU may choose) for the transmission may be per the RACH configuration mapping (e.g., between BMRS and preamble transmission time or times).

The mWTRU may use a preamble sequence corresponding to the maximum measured BMRS sequence. The preamble sequence (or sequences from which the mWTRU may choose) for transmission may be per the RACH configuration mapping (e.g., between BMRS and preamble transmission sequence or sequences). The mWTRU may transmit a preamble at a frequency allocation corresponding to the maximum measured BMRS sequence. The frequency allocation or frequency allocations from which the mWTRU may chose for transmission may be per RACH configuration mapping (e.g. between BMRS and RACH frequency allocation or allocations). The mWTRU may transmit a preamble with an initial power calculated based on the initial power offset corresponding to the maximum measured BMRS sequence. The initial power offset may be per the RACH configuration mapping (e.g., between BMRS and initial power offset for preamble transmission). A slot/sub-frame/symbol may be used to represent timeslot and/or sub-frame and/or symbol.

The mWTRU may receive a preamble acknowledgement from the SCmB. The mWTRU may receive a preamble acknowledgement within a receive antenna pattern which may be similar or identical to the preamble transmit antenna pattern and/or may be according to the RACH acknowledgement configuration. When an acknowledgement is received, the mWTRU may decode a dedicated PDDCCH which may be within the formed beam pair. The mWTRU may acquire the per-TTI PDDDCH scheduling information from the SCmB and may receive the PDDDCH accordingly. The mWTRU may transmit another preamble to the SCmB if and/or when no preamble acknowledgement is received, for example, within a certain time window or after a certain time window. If and/or when no preamble acknowledgement is received, for example, within a certain time window or after a certain amount of time, the mWTRU may retransmit a (e.g., the same or another) preamble in another direction. Transmission in a direction may be the same as transmission within a transmit antenna pattern formed at a direction. The mWTRU may transmit or re-transmit a next nth subsequent preamble, for example, within a transmit antenna pattern formed at a direction of the (n mod m)$^{th}$ maximum measured BMRS sequence. N may be the number or index of the preamble transmission. If power ramping for a beam direction is used, n may or may only be incremented for the next beam direction. N may not be incremented for transmissions in the same direction at a different power. The mWTRU may transmit the preamble at a time instance, e.g., slot/sub-frame/symbol corresponding to the (n mod m)$^{th}$ maximum measured BMRS sequence. The correspondence of time instance to BMRS sequence may be per a RACH configuration mapping. The mWTRU may use a preamble sequence corresponding to the (n mod m)$^{th}$ maximum measured BMRS sequence. The correspondence of preamble sequence to BMRS may be per a RACH configuration mapping. The mWTRU may transmit the preamble at a frequency allocation corresponding to the (n mod m)$^{th}$ maximum measured BMRS sequence. The correspondence of frequency allocation to BMRS sequence may be per a RACH configuration mapping. The mWTRU may transmit the preamble with an initial power calculated based on the initial power offset corresponding to the (n mod m)$^{th}$ maximum measured BMRS sequence. The correspondence of initial power offset to BMRS sequence may be per a RACH configuration mapping. m may represent the number of measured BMRS whose metric is, e.g., as determined by the mWTRU above a pre-defined or configured quality (e.g. quality threshold). The terms preamble and preamble sequence may be used interchangeably.

The mWTRU may, for example, alternatively transmit or retransmit the next n$^{th}$ subsequent preambles within a transmit antenna pattern formed at the direction of ((n mod 2)−1)*antenna pattern HPBW away from the previous preamble transmission direction. The MWTRU may transmit the preamble at the time instance, e.g., the slot/sub-frame/symbol used for the previous preamble transmission. The mWTRU may use the preamble sequence used for the previous preamble transmission. The mWTRU may transmit the preamble at the frequency allocation used for the previous preamble transmission and/or with a power used for the previous preamble transmission. The mWTRU may transmit the preamble at the frequency allocation used for the previous preamble transmission. The mWTRU may transmit the preamble with a power used for the previous preamble transmission. The mWTRU may continue to transmit or retransmit a next preamble until an acknowledgement is received or until the number of preamble transmissions exceeds a limit which may be provided or specified, for example, in a RACH configuration. The mWTRU may stop transmitting preambles when the number of preamble transmissions, for example, n, exceeds a limit specified or included in a RACH configuration.

The mWTRU may associate a downlink transmit antenna pattern with beam-specific information, for example, a unique beam-specific index. The beam-specific information may be mapped to one or multiple PHY layer preamble configurations including, but not limited to, the time slot/sub-frame/symbols on or during which the preamble transmission may occur, the preamble sequence that may be used, the initial power offset that may be applied, and the like. The RACH procedure may occur when the SCmB receives a preamble transmission in an mmW broad beam, for example, to increase the PRACH detection rate. The narrow beam pairing for data transmission may occur after to RACH procedure.

In yet another embodiment, the mWTRU may perform a preamble transmission procedure with a variable transmit antenna pattern. The mWTRU may receive downlink RACH configuration from the SCmB. The RACH configuration may be received in a SIB on a common PDDDCH. The RACH configuration may include one or more cell-specific preamble transmission sequences, transmit time instances, frequency resource allocations, initial power offsets, and the like. The mWTRU may sweep one or more narrow receive antenna patterns and measure the cell-specific reference signal. The mWTRU may transmit to the SCmB a preamble within a transmit antenna pattern formed at the direction of the maximum measured cell-specific reference signal. The mWTRU may transmit the preamble according to one or more parameters received in the RACH configuration, for example, the RACH configuration for the cell-specific preamble transmission. For example, the mWTRU may transmit the preamble at the time instance, e.g., the slot/sub-frame/symbol, using a preamble sequence, at the frequency allocation, and with an initial power offset selected from or provided in the RACH configuration.

A preamble acknowledgement may be received from the SCmB by the mWTRU within a receive antenna pattern which may be similar or identical to the preamble transmit antenna pattern according to the RACH acknowledgement configuration. When no acknowledgement is received, the mWTRU may transmit or re-transmit the next preamble to the SCmB within an antenna pattern that may be narrower than the previous preamble transmission, for example, by a pre-defined or configured antenna pattern thinning step size but centered at the same direction as the previous preamble transmission.

The mWTRU may stop transmitting preambles when the number of preamble transmissions, for example, n, exceeds a limit specified in a RACH configuration or when an acknowledgement is received. When an acknowledgement is received, the mWTRU may decode the common PDDCCH and may receive the associated PDDDCH accordingly.

Multi-direction data transmission and reception will now be described. In an embodiment, an SCmB may determine spatial AoD/AoA information based on a reported mWTRU beam measurement. The SCmB may evaluate the suitability of applying a different receive antenna pattern or narrow beam pair switch based on a range of criteria. The criteria may include but is not limited to real-time system parameters, for example, the transmit beam availability, QoS, reported transmit beam quality metrics, data buffer status, historically achieved capacity, and the like.

The SCmB may evaluate possible transmission schemes for data transmissions to the reporting mWTRU.

In an example, the SCmB may form a single narrow transmit beam at the AoD corresponding to the strongest resulting AoA path. For example, the AoD associated with the transmit beam 3 in FIG. 15. The SCmB may schedule the mWTRU to use the detecting receive beam, for example, receive beam index$_1$ for the data transmission. The SCmB may transmit the HARQ new and re-transmissions in the same transmit beam to the mWTRU.

The SCmB may apply multi-AoD transmission. The SCmB may form one or more single narrow transmit beams at each AoD corresponding to the AoA path with a reported quality metric above a pre-configured threshold. The SCmB may send data to the mWTRU in multiple transmit beams each radiated toward a different AoD.

In an alternate-AoD retransmission example, the SCmB may form a single narrow transmit beam at the AoD corresponding to the strongest resulting AoA path. Upon receiving a NACK from the mWTRU, the SCmB may form a single narrow transmit beam at another AoD, for example, corresponding to a AoA with a reported quality metric above a pre-configured threshold, the SCmB may transmit the HARQ retransmission to the mWTRU.

Both the multi-AoD transmission and alternate-AoD retransmission modes may be considered as an mWTRU multi-AoA reception. Multi-AoD transmission mode may enable a simultaneous mWTRU reception at multiple AoAs to take advantage of spatial diversity. Alternative-AoD transmission modes may combine the spatial diversity with a time diversity, because the mWTRU may change the receive beam to a different AoA for the HARQ retransmissions than for the one used for the new transmissions.

An mWTRU may transmit the measurement report to the SCmB in existing LTE uplink physical channels including PUCCH and PUSCH. The HARQ ACK/NACK may be carried in a new LTE physical channel operating at same TTI as mmW systems. An mWTRU may report the beam measurement and HARQ ACK/NACK in mmW uplink physical channels to the SCmB.

An mWTRU's beam measurement report may contain more than one detected transmit beam, a SCmB may evaluate the suitability of the proposed transmission schemes by considering certain real-time system parameters including, but not limited to: reported transmit beam quality metrics, transmit beam availability at the SCmB, QoS, data buffer status, historically archived capacity of the mWTRU, and the like.

The multi-AoA reception may lead to improved robustness of the data transmissions due to spatial diversity. The sensitivity to radio link blockage may be significantly reduced when a LOS obstruction occurs in one of the AoA paths during the multi-AoD transmission or alternate-AoD retransmission, the radio link may be maintained.

In another embodiment, the SCmB may schedule in common PDDCCH, one or more of the proposed transmission modes. A SCmB may send the transmission mode scheduling information in common or dedicated PDDCCH which includes but is not limited to: Transmission mode (for example with 2-bit field, transmit beam information (for example transmit beam identity, beam reference signal, etc., receive beam information (for example the reported mWTRU beam identity, beam index, etc.), trigger information for the activation of alternate-AoD HARQ transmission. A SCmB may transmit the mWTRU PDDDCH using scheduled transmit beams.

In another embodiment, an mWTRU may decode the scheduling information in the common or dedicated PDDCCH and obtain the receive antenna pattern control words corresponding to the scheduled transmit and/or receive beams. The mWTRU may translate the multiple control words to one multi-lobe receive antenna pattern control word with the main lobe directed at the scheduled and/or receive beam direction and apply the resulting control word to generate a multi-lobe receive antenna pattern to pair with the scheduled downlink beam transmission.

Figure 17:
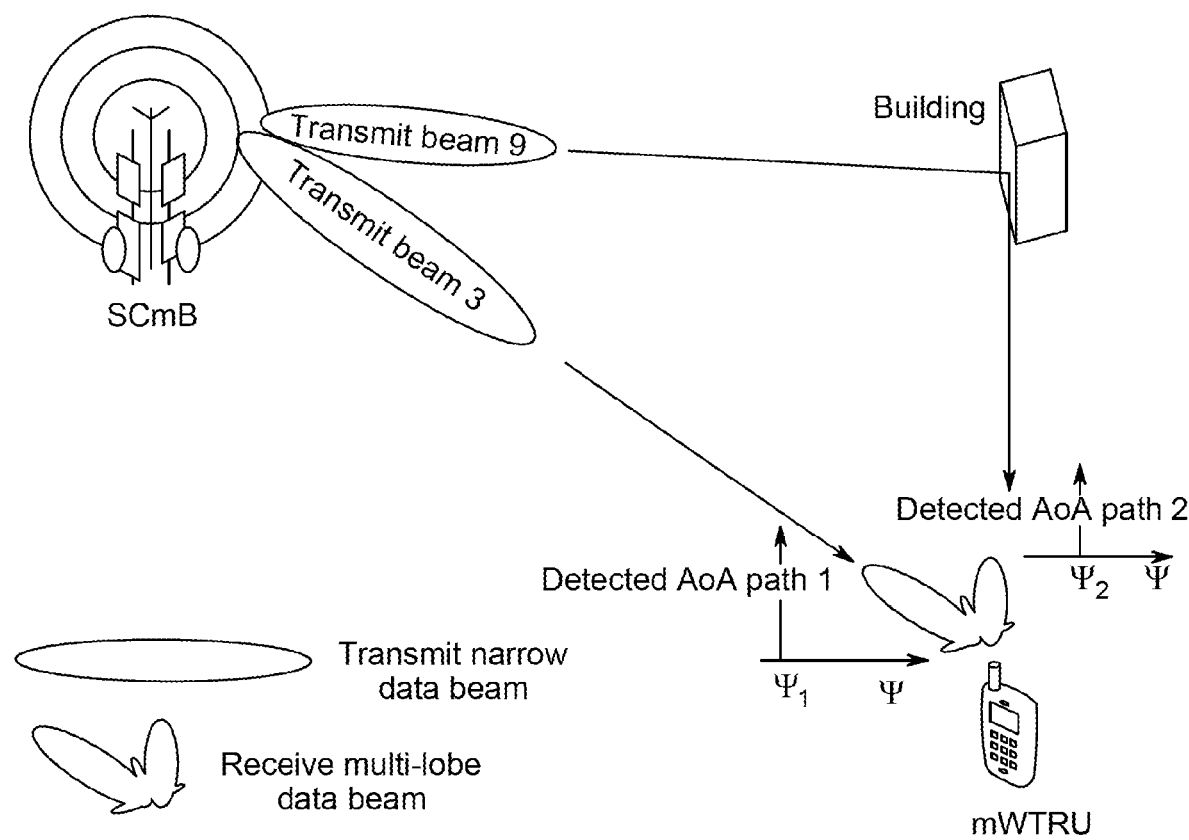
FIG. 17 is a diagram of an mWTRU multi-AoA reception using a single multi-lobe beam.

FIG. 17 is a diagram of an mWTRU multi-AoA reception using a single multi-lobe beam. The SCmB may perform a multi-AoD transmission as shown in FIG. 17. The SCmB may form two narrow transmit beams at the AoDs corresponding to the reported transmit beams and send the data in both transmit beams. The SCmB, may use a multi-lobe transmit beam with each lobe directed at the AoDs corresponding to the reported transmit beams.

An mWTRU may perform a multi-AoA reception procedure as described below. The mWTRU may decode a transmission mode scheduling information carried in the LTE control channels or mmW common/dedicated PDDCCH and receive scheduled transmit and/or receive beam information, trigger configuration, and the like. The mWTRU may obtain one or more receive beam indices based on the beam measurement record, for example, as shown in TABLE 2, and determine the information of mWTRU receive beamforming control word and a corresponding AoA path for each receive beam index. For example, the scheduled receive beam index may be included in the mWTRU beam measurement corresponding to the beamforming control word and AoA as shown in TABLE 4 below.

TABLE 4

| mWTRU MEASUREMENT RECORD LOOK-UP RESULT | | |
| --- | --- | --- |
| mWTRU Receive Beam Index | mWTRU Receive Beamforming Control Word | Corresponding AoA |
| Index$_1$ | {10010 . . . 110} | $\Psi_1$ |
| Index$_2$ | {11100 . . . 101} | $\Psi_2$ |

The mWTRU may calculate the receive beamforming control word based on AoAs of the main lobes and the weight factor of each main lobe according to the transmit and/or receive beam scheduling. The mWTRU may use a larger weight factor to obtain a high antenna gain at the main lobe at the AoA corresponding to the scheduled receive beam, for example, Index$_1$, $\psi_1$, in Table 4, at which the AoA path may have the highest measured quality metric.

Figure 18A:
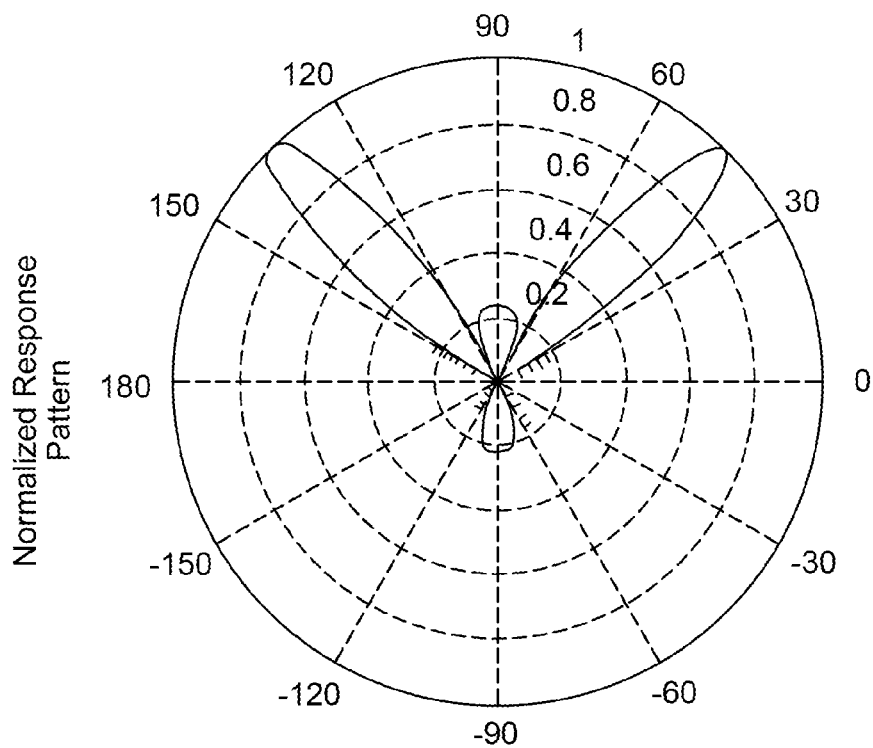
FIG. 18A is a 2D diagram of a single multi-lobe beam pattern.
Figure 18B:
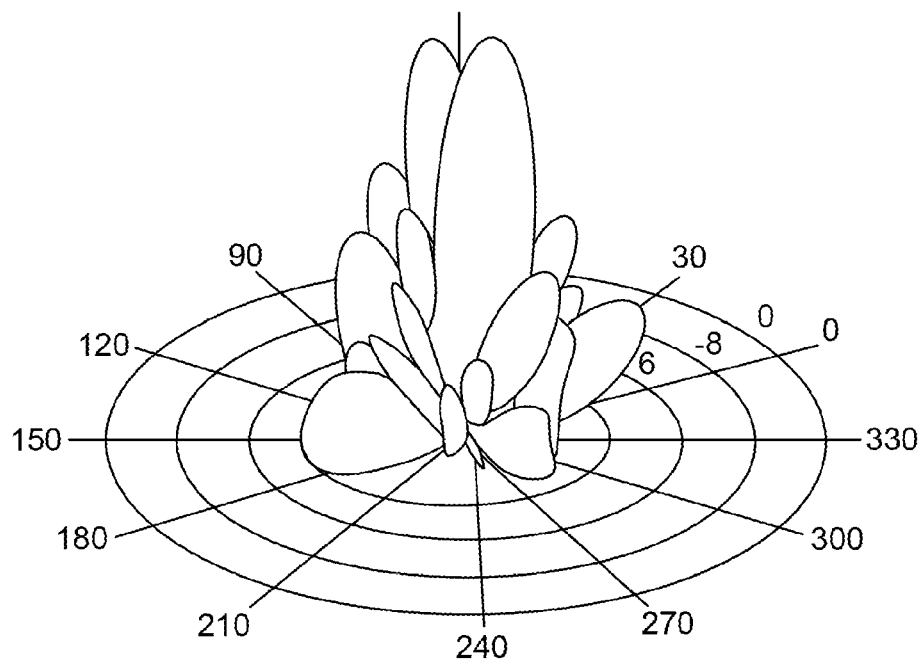
FIG. 18B is a 3D diagram of a single multi-lobe beam pattern.

The mWTRU may apply the generated beamforming control word and form a multi-lobe receive beam with main lobes directed at the AoA paths corresponding to the scheduled transmit and/or receive beams. The mWTRU may decode and demodulate the PDDDCH received in the multi-lobe receive beam. FIG. 18A is a 2D diagram of a single multi-lobe beam pattern. FIG. 18B is a 3D diagram of a single multi-lobe beam pattern.

The mWTRU may adaptively form a beam pattern with multiple distinct strong lobes, as shown in 18A and 18B, to receive at different incoming angular directions. The mWTRU may apply the multi-direction and reception to adapt to the channel condition and improve the radio link robustness.

A beam switching procedure will now be described. In another embodiment, the mWTRU may perform during active data transmission an event-triggered beam switching procedure triggered by one or a sequence of pre-defined events. The trigger events may include, but are not limited to: the mWTRU may transmit a number of NACKs to a new data transmission above a pre-defined threshold, and/or the mWTRU may measure a BSRS/BMRS/DMRS or other reference signal qualities below a pre-defined threshold over a pre-defined number of measurements. The mWTRU may send a beam switch request to a SCmB using L1 uplink control signaling or higher layer signaling, e.g., RRC signaling in uplink data channels. The beam switching request may comprise of, but is not limited to, a beam switch request bit, recommended new beam pair indexes, types of triggered events, and the like.

The mWTRU may monitor the common or dedicated PDDCCH and decode the updated beam pair scheduling information received from the SCmB. The mWTRU may form the switched narrow or multi-lobe broad receive antenna pattern, decode the dedicated PDDCCH within the switched beam pair to acquire per-TTI PDDDCH scheduling information and receive the PDDDCH.

The mWTRU may receive a beam measurement request from the SCmB on the common PDDCCH, which may include AARS scheduling information of beam pair switch candidates, measurement gap, uplink grant, etc. The mWTRU may measure the scheduled candidate AARS during the measurement gap and report the updated beam pair measurement to the SCmB using the uplink grant.

Figure 19A:
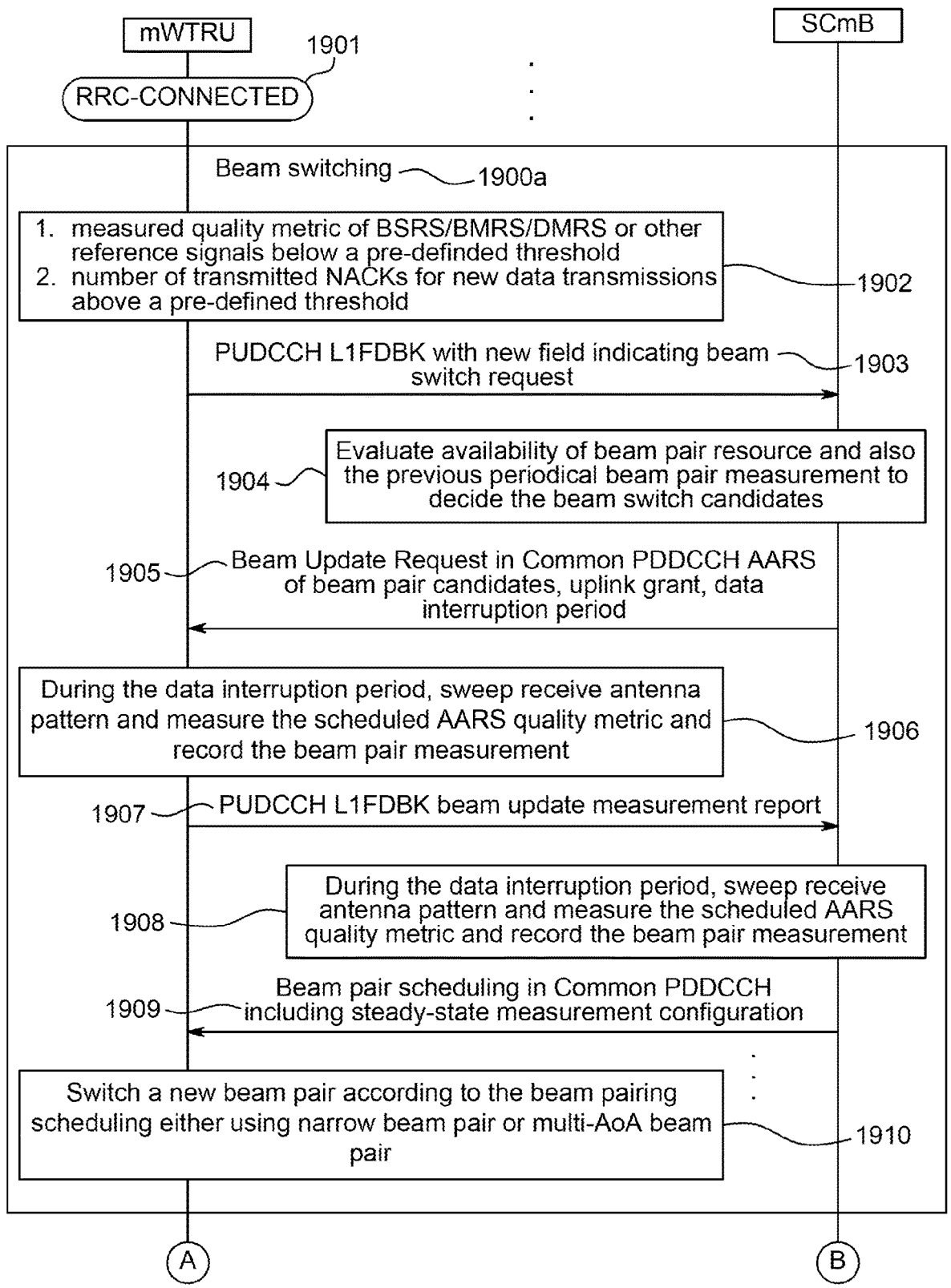
FIGS. 19A-B are diagrams of an example beam switching procedure.
Figure 19B:
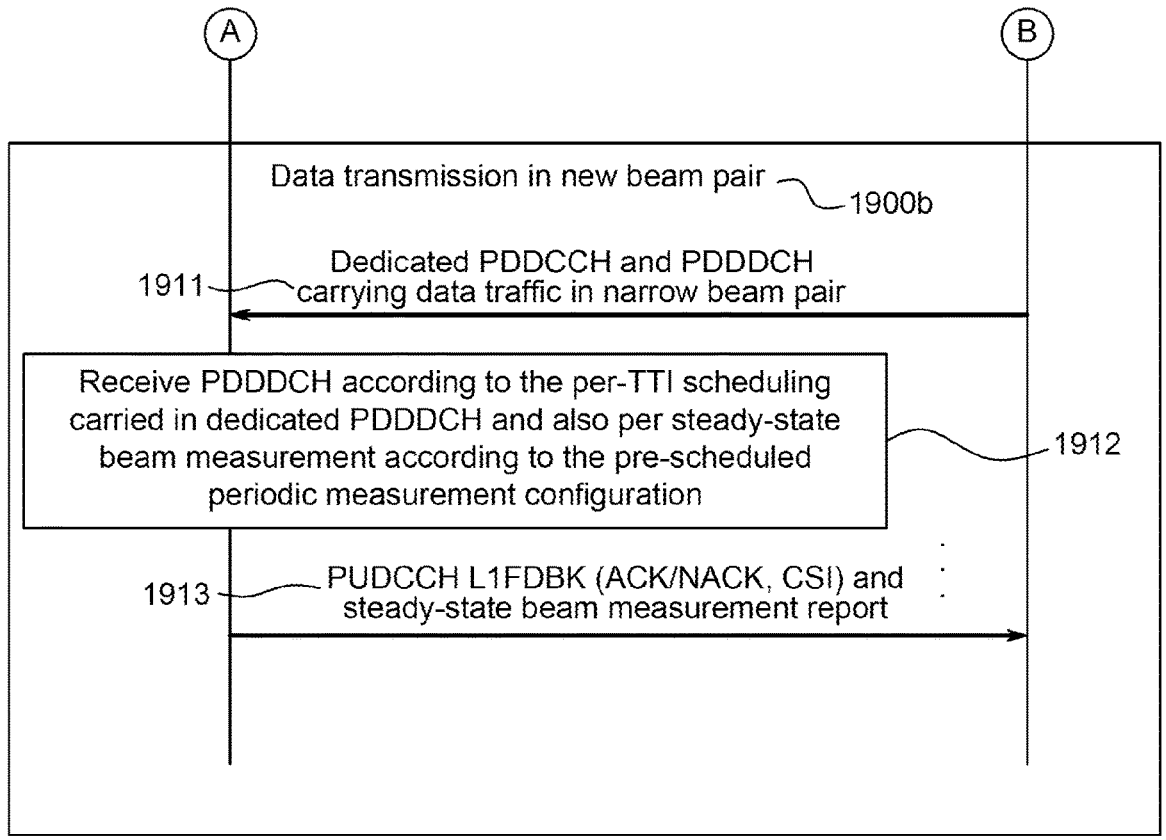

FIGS. 19A-B are diagrams of an example beam switching procedure 1900a in FIG. 19A and a data transmission using the new beam pair 1900b in FIG. 19B. For example, during a beam switching procedure, the mWTRU is in an RRC-connected state 1901. The mWTRU may (1) measure quality metric of BSRS/BMRS/DMRS or other reference signals below a pre-defined threshold, and (2) number of transmitted NACKs for new data transmissions above a pre-defined threshold 1902. The mWTRU may transmit PUDCCH L1FDBK with a new field indicating beam switch request using an uplink mmW/LTE broad-beam transmission 1903. The SCmB may evaluate the availability of beam pair resources and also the previous periodical beam pair measurement to decide the beam switch candidates 1904. The SCmB may transmit a Beam Update Request in Common PDDCCH, AARS of beam pair candidates, uplink grant and data interruption period using a downlink mmW broad-beam transmission 1905. The mWTRU may, during the data interruption period, sweep receive an antenna pattern and measure the scheduled AARS quality metric and record the beam pair measurement 1906. The mWTRU may transmit a PUDCCH L1FDBK beam update measurement report using an uplink mmW/LTE broad-beam transmission 1907. The SCmB may, during the data interruption period, sweep a receive antenna pattern and measure the scheduled AARS quality metric and record the beam pair measurement 1908. The SCmB may transmit beam pair scheduling in a Common PDDCCH including steady-state measurement configuration using a downlink mmW broad-beam transmission 1909. The mWTRU may switch to a new beam pair according to the beam pairing scheduling either using narrow beam pair or multi-AoA beam pair 1910.

During data transmission using the new beam pair 1900b, the SCmB may transmit dedicated PDDCCH and PDDDCH carrying data traffic in narrow beam pair using a downlink mmW narrow beam pair transmission 1911. The mWTRU may receive the PDDDCH according to the per-TTI scheduling carried in the dedicated PDDDCH and also per steady-state beam measurement according to the pre-scheduled periodic measurement configuration 1912. The mWTRU may transmit PUDCCH L1FDBK (e.g., ACK/NACK, CSI, etc.) and a steady-state beam measurement report using an uplink mmW narrow beam pair transmission 1913.

In another embodiment, the SCmB may schedule in common PDDCCH, dedicated PDDCCH or LTE L1 control channels for a directional HARQ transmission. The directional HARQ transmission scheduling information may include but is not limited to transmit and/or receive beam indices of HARQ new transmission and all pre-configured retransmissions. The SCmB may transmit the HARQ new transmission at the AoD corresponding to the scheduled new transmission transmit and/or receive beam index and upon receiving NACKs, transmit the HARQ retransmissions at the AoDs corresponding to scheduled retransmission transmit and/or receive beam indices.

In another embodiment, an mWTRU may decode the transmission mode scheduling information on the common PDDCCH, dedicated PDDCCH or LTE PDCCH. The mWTRU may receive a directional HARQ transmission scheduling and upon decoding an error of the HARQ new data transmission perform beam pair switch for one or all HARQ retransmissions according to the scheduled transmit and/or receive beam indices.

The SCmB may form a narrow transmit beam at the AoD corresponding to the AoA path with the highest reported quality metric and transmit the PDDDCH new transmission. Upon a new transmission failure, the SCmB may change the AoD of the retransmissions by steering the transmit beam to a different AoD corresponding to a different AoA path at the mWTRU, for example with the next highest reported quality metric.

Figure 20:
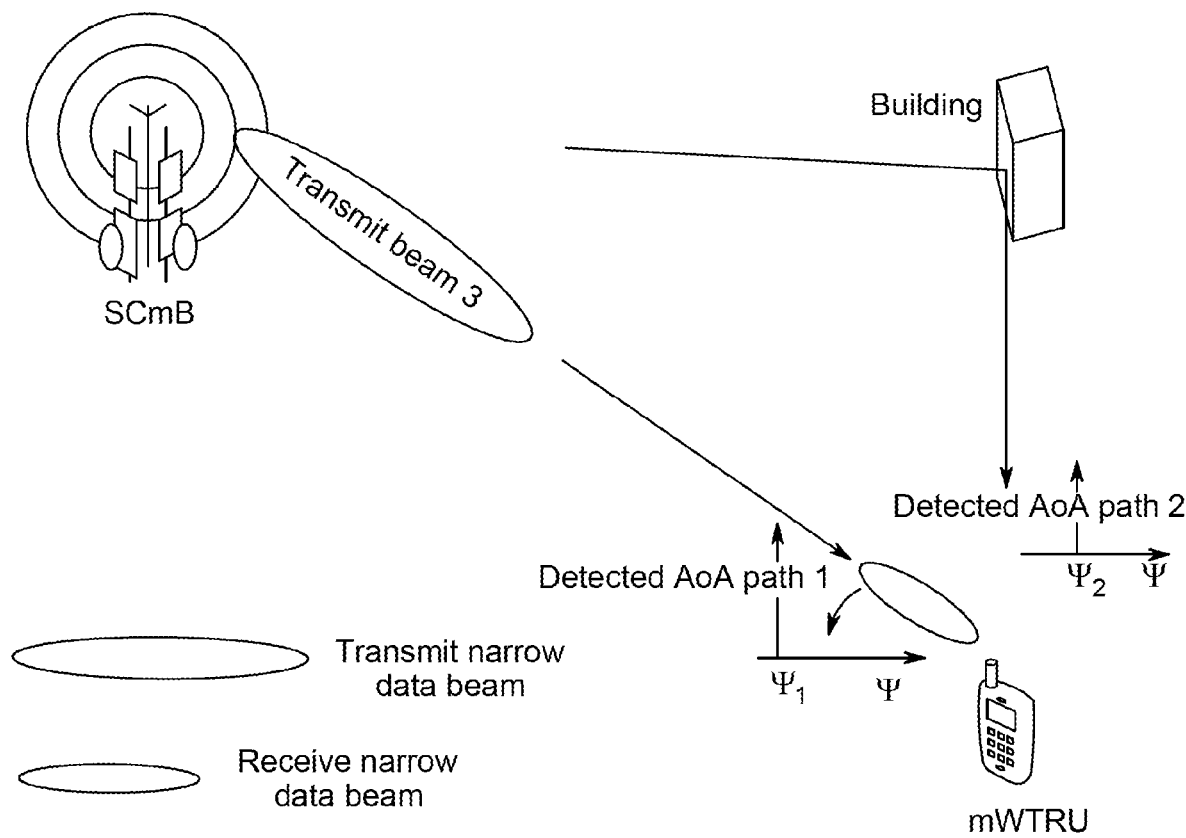
FIG. 20 is a diagram of an mWTRU multi-AOA reception using a single narrow beam for a new transmission in transmitting time interval (TTI) N.
Figure 21:
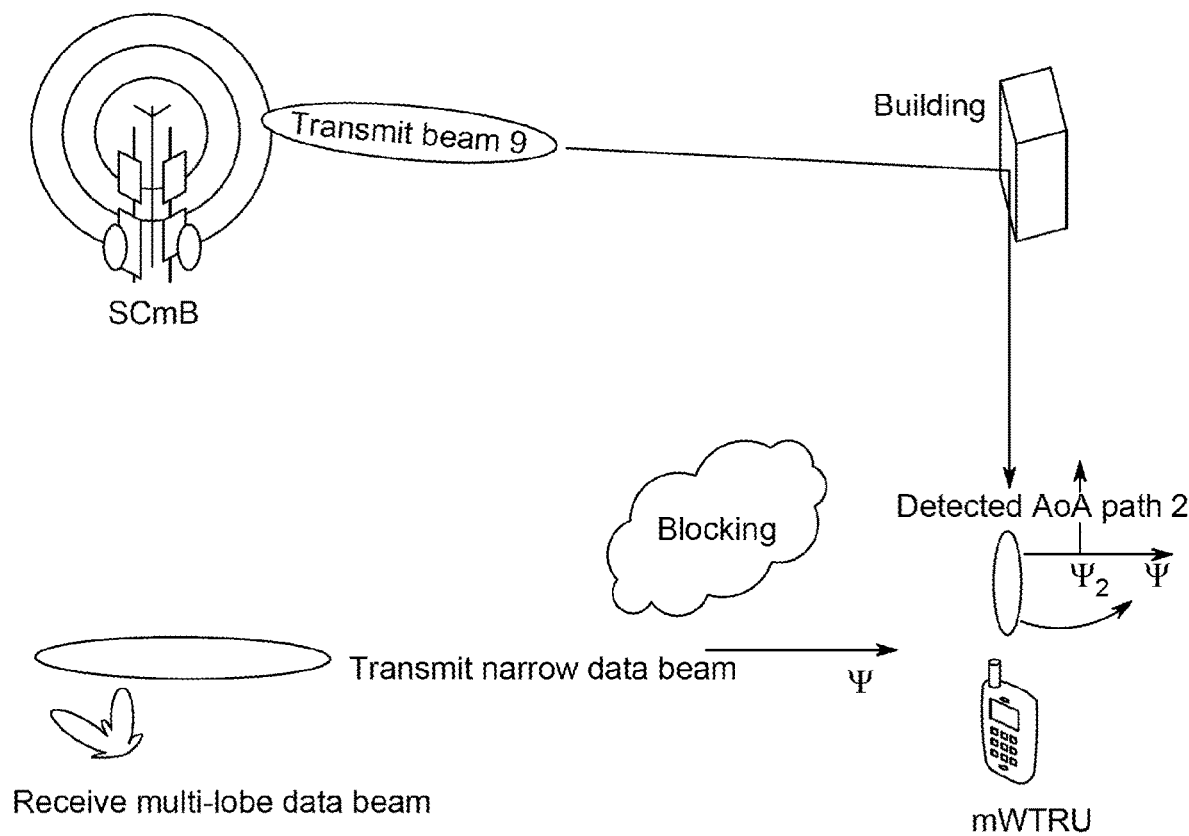
FIG. 21 is a diagram of an mWTRU multi-AoA reception using a single narrow beam for retransmission in TTI N+X.

FIG. 20 is a diagram of an mWTRU multi-AOA reception using a single narrow beam for a new transmission in TTI N. FIG. 21 is a diagram of an mWTRU multi-AoA reception using a single narrow beam for retransmission in TTI N+X. As shown in FIGS. 20 and 21, in TTI N the SCmB may apply a transmit beam at the AoD corresponding to transmit beam 3 for a new transmission. For retransmission in TTI N+X the SCmB may apply a transmit beam at the AoD corresponding to transmit beam 9. The time interval between HARQ new transmission and retransmissions may depend on a range of mmW HARQ parameters including but not limited to the number of HARQ processes, mWTRU processing time of the largest HARQ data block size, the maximum round-trip propagation delay of the dimensioned mmW cell size, and the like.

The mWTRU may obtain the receive beam indices in an internal beam measurement record, for example, as shown in TABLE 2 (above), and retrieve the information of the mWTRU receive beamforming control word and corresponding detected AoA path for each receive beam index. For example, the scheduled receive beam $Index_1$ and $Index_2$, according to the mWTRU beam measurement record may correspond to the beamforming control word and AoA as shown in TABLE 4 (above).

The mWTRU may receive a new data indicator (NDI) in the scheduling information in the common or dedicated PDDCCH, apply the beamforming control word used for the transmit and/or receive beam scheduled for the HARQ new transmission and form a narrow receive beam at the corresponding AoA path. In the example shown in FIG. 20, the mWTRU may receive the HARQ new transmission in mmW TTI N using the scheduled primary receive beam at AoA path $\psi_1$, which is the strongest detected AoA path from the measurement.

The mWTRU may then decode and demodulate the PDDDCH in the paired transmit and receive beams.

Referring to FIG. 21, upon decoding an error of the new transmission in TTI N, the mWTRU may apply TTI N+X in the beamforming control word used for the transmit and/or beam scheduled for the HARQ retransmissions and form a narrow receive beam at the corresponding AoA path. In the example shown in FIG. 21, the new transmission in mmW TTI N may be blocked and in TTI N+X, the mWTRU may form a narrow receive beam at AoA path $\psi_2$, which is the 2nd strongest detected AoA path from the measurement done. The beam steering time may be negligible compared to the mWTRU baseband processing time when designing the retransmission delay value of X.

The mWTRU may demodulate and decode the HARQ retransmissions in the switched transmit and receive beam pairs that are different than the pair used for the new transmission.

The SCmB may not pair the transmit and receive beams for the new transmission at the strongest reported AoA path because the beam scheduling may depend on many factors, e.g., the transmit beam availability.

In another embodiment, a HARQ directional transmission may be triggered by scheduled trigger events. A SCmB, upon receiving a pre-defined number of ACKs for HARQ retransmission, may send scheduling information to remove an alternate-AoD HARQ retransmission scheme and schedule the beam pair used for the new transmission to apply for retransmissions. An mWTRU upon receiving the scheduling information to remove directional HARQ transmission, may stop the receive antenna pattern steering between new data transmission and retransmissions, and use the beam pair for the HARQ new transmission. The AoA path corresponding to the scheduled primary beam may be blocked as shown in FIG. 21 and may not be recovered. During the data transmission, the mWTRU beam measurement may require configuration of a measurement gap and may not produce in-time measurement reports to indicate the blocking condition to the SCmB.

The directional HARQ scheme may result in consecutive NACKs for the new transmissions and ACKs for the retransmissions. In this case, the SCmB may waste energy if continuing with the new transmissions. Instead, it may consider removing the directional HARQ transmission scheme and form a narrow transmit beam for HARQ new transmission and retransmissions. The SCmB may reconfigure the HARQ directional transmission to be a regular HARQ transmission. The SCmB may reconfigure the HARQ directional transmission to a regular HARQ transmission when receiving a pre-defined consecutive number of NACKs for new transmissions and ACKs for retransmissions. The SCmB may set the transmission scheme selection field in common or dedicated PDDCCH to a bit combination corresponding to the regular transmission mode and use the transmit and/or receive beam for HARQ retransmission for HARQ new transmissions.

Upon receiving the transmission mode reconfiguration from the SCmB, the mWTRU may fix the receive beam at the AoA path corresponding to previous retransmission AoA paths and receive the HARQ new transmissions and retransmissions using the same transmit and receive beam pair.

In another embodiment, the SCmB may schedule periodical data interruptions in RRC dedicated signaling, the dedicated PDDCCH, the common PDDCCH or the LTE PDCCH. During these interruptions, the data transmission may be suspended for an mWTRU to measure selective beam pairs, including beam pairs of the previously reported best quality metric or available beam pair candidates for scheduling.

A SCmB may transmit beam specific reference signals in one or more wide beams, multi-lobe (multi-AoD) beams, and/or narrow beams with different periodicity. A SCmB may dynamically schedule and transmit beam specific reference signals using resources (e.g., time, frequency and code) dedicated to at least one mWTRU.

The SCmB may periodically transmit beam specific reference signals corresponding to one or more beams and the SCmB may determine the periodicity of beam specific reference signals according to mWTRUs density under coverage of those beams. The SCmB may choose to transmit more often the beam specific reference signals corresponding to beams that are reported by other mWTRUs in their measurement results.

The SCmB may transmit the beam specific reference signals corresponding to one or more beams, when these beams are reported by mWTRUs in the measurement report. The SCmB may schedule the beam reference signal resources (e.g., time, frequency and code) using common or dedicated PDDCCH. An SCmB may indicate the BSRS sequence index in the reference signal scheduling or implicitly indicate the BSRS sequence index in the subframe number, slot number and/or the number of REs containing the dedicated PDDCCH. The SCmB may use a beam measurement request MAC CE to indicate the presence of narrow beam reference signals The mWTRU may receive the associated reference signal time and frequency resource allocation in SIB or dedicated RRC signaling. In another example, the SCmB may use the BSRS sequence index of broad beam reference signals to implicitly indicate the presence of corresponding narrow beam reference signals. The mWTRU may calculate the time and frequency resources of the narrow beam reference signals based on the resources used for wide beam reference signals. In another example, SCmB may use a new beam presence indicator channel to indicate the presence of one or more beam specific reference signals in the current subframe. A beam presence indicator channel may carry information regarding the identity of the beam. The mWTRU may receive time and frequency resource allocation of the present reference signals in SIB or RRC signaling.

To enable multi-AoD transmissions, the SCmB may dynamically schedule the mWTRUs to measure multi-lobe transmissions. Upon receiving measurement reports from the mWTRU with at least two or more narrow beams, the SCmB may choose to activate measurements for the multi-lobe covering the AoD transmission. The SCmB may choose the same methods described above to schedule dynamic multi-lobe measurements.

In another embodiment, an mWTRU may perform measurements on one set of previously measured beams when one or a set of pre-configured events are met. An mWTRU may be initially configured to measure only the reference signals corresponding to the wide beam or the serving beam. The mWTRU may perform measurements on one or more backup beams when one or more of the following events are triggered: (1) when the number of NACKs received (with an Rx beam corresponding to the serving Rx-Tx beam pair) is above a pre-defined threshold; (2) when the receive signal strength indicator (RSSI)/reference signal receive power (RSRP)/reference signal receive quality (RSRQ)/channel quality indicator (CQI) of the serving beam pair is below a defined threshold and/or the RSSI/RSRP/RSRQ/CQI of the alternate beam pair is above a defined threshold or better than the serving beam pair by at least a configured offset; (3) when the number of OUT OF SYNC indications are above a configured threshold within a configured time window;

and/or (4) when the number of ARQ NACKs received at the RLC layer is above a defined threshold.

An SCmB may signal a measurement configuration to the mWTRU that may include measurement objects, measurement cycles and measurement scope, in addition to measurement identity and quantity configuration. An mWTRU may receive an initial configuration for {Measurement object, Measurement Scope and Measurement cycle} in accordance with TABLE 5, below.

TABLE 5

EXAMPLE MEASUREMENT CONFIGURATIONS

| Measurement Object | Measurement Scope | Measurement cycle (us) |
|---|---|---|
| Serving Narrow beam | Measure, Track, Report | x |
| Narrow beam within the serving wide beam | Measure, Report | y (<=x) |
| Serving Wide beam encompassing the serving narrow beam | Measure, | z (>=y) |
| Other wide beams of serving cell | None | Infinity |

Where a measurement object indicates to the set of beam IDs, the measurement cycle may capture the periodicity/frequency of measurement. The measurement scope may determine the operation to be performed on the measurement object.

In one example, the SCmB may explicitly reconfigure the measurement scope and cycle parameters according to the mWTRU measurement report. For example, depending on the measurement report from the mWTRU, the SCmB may promote from the measurement scope and may provide a lower value for the measurement cycle for the non-serving narrow beam.

Alternatively, the SCmB may configure the mWTRUs to implicitly scale the measurement configuration if one or more triggers for measurement events occur. For example, when the number of NACKs received when using serving narrow beams is above a given threshold, an mWTRU may promote the measurement scope of the serving wide-beam to report autonomously. Additionally the non-serving wide beams of the serving cell may be promoted from {None→Measure→Measure and Report→Measure, Track and Report}. In a similar fashion, the measurement cycle may also be scaled according to the number of NACKs received or the signal threshold of the serving beam.

In another embodiment, a WTRU may implicitly or explicitly perform beam switching from a serving beam pair to an alternate beam pair based on configured criteria. The mWTRU may also report the implicit beam switch to the SCmB. The mWTRU may maintain and update an internal beam measurement result table. Each row or measurement record in the table may contain quantized measurement results for a unique Rx beam and Tx beam pair. The Rx or Tx beams may be identified using a unique ID. Such a beam ID may be used to identify different beam characteristics, patterns or patch antenna configurations. For example, different IDs may be assigned for narrow beam n1, narrow beam n2, wide beam w1 and a multi-lobe beam pattern (for multi-AoA reception or for multi-AoD transmission) covering both narrow beam n1 and narrow beam n2. In some cases, different beam IDs may be used to identify beams generated from one or more patch antennas. Optionally, the measurement results stored in the table may be averaged using a moving average filter whose coefficients are configured by the SCmB. In one solution, the table may be sorted in the decreasing order of the quantized measurement result. An mWTRU may be configured to use the Rx beam corresponding to the topmost entry in the measurement table. Additionally, an mWTRU may be configured to implicitly switch from a serving Rx-Tx beam pair to the alternate Rx-Tx beam pair in the measurement table if the Tx beam ID is the same between the serving and alternate beam pair. Such an implicit transition may be triggered when one or more of the following criteria is satisfied: (1) when the number of NACKs received (with Rx beam corresponding the serving Rx-Tx beam pair) is above a pre-defined threshold; (2) when the RSSI/RSRP/RSRQ/CQI of the serving beam pair is below a defined threshold and/or the RSSI/RSRP/RSRQ/CQI of the alternate beam pair is above a defined threshold or better than the serving beam pair by at least a configured offset; (3) when the number of OUT OF SYNC indications are above a configured threshold within a configured time window; and/or when the number of ARQ NACKs received at the RLC layer is above a defined threshold.

Upon receiving the new data transmission using the serving beam pair, the mWTRU may be configured to receive each successive retransmissions and may attempt using an alternate receive beam as long as following two conditions are satisfied: (1) the Tx beam corresponding to the alternate Rx beam is same as the Tx beam in the serving beam pair; and (2) the quantized measurement results corresponding to the alternate Rx-Tx beam pair is at least above a predefined threshold.

In the case where the number of candidate Rx beams for a given Tx serving beam is less than the maximum number of HARQ retransmission attempts, the mWTRU may cycle through the candidate Rx beam for each retransmission attempt.

Optionally, the mWTRU may be configured to report the implicit beam switch to the SCmB. The mWTRU may use either new MAC CE element or use L1 signaling to report the implicit beam switch. The mWTRU may transmit an explicit beam switch request to the SCmB when one or more of the beam switch criteria as described above is satisfied. Such an explicit report may be mandatory if the serving and alternate beam pair differ by at least the Tx beam ID corresponding to SCmB. The SCmB may then respond with beam switch acknowledgment or reject messages, based on its internal RRM/Scheduler algorithms. The beam switch acknowledgment message may carry an explicit identifier for the new beam pair to use. Such an identifier may indicate one or more of the following: (1) the index of the preferred beam pair in the table of the last transmitted beam measurement report; (2) the transmit beam ID corresponding to the SCmB; and/or (3) the receive beam ID corresponding to the mWTRU.

Random access (RA) resource sets are disclosed herein. One or more RA resource sets may be provided, e.g., by signaling, and/or used. An mWTRU may select or determine an RA resource set based on an SCmB DL measurement or DL transmit beam. An RA resource set may be associated with an SCmB UL receive beam. An mWTRU may perform an RA procedure using the selected or determined RA resource set. An mWTRU may select and/or use multiple RA resource sets where each RA resource set may be associated with a different SCmB UL receive beam. An mWTRU may perform an RA procedure via UL transmissions using one or more, for example, each, of the selected or determined RA resource sets. The mWTRU may use the different resource sets via UL transmissions to attempt to gain successful access to the SCmB. The SCmB may use the RA UL transmissions from the mWTRU to determine, for example, a best receive beam for UL communication with the mWTRU In one embodiment, the mWTRU may try an RA resource set individually, for example, until successful or maximum attempts have been reached. An mWTRU may try another RA resource set if, for example, only if a previous RA resource set was unsuccessful, for example, if maximum attempts was reached without success.

In another embodiment, UL transmission by the mWTRU using different RA resource sets may be performed serially or sequentially, for example, at different times one transmission after the other. An RA attempt may include tries with the multiple resource sets and may be considered successful, if a random access response (RAR) is successfully received from the SCmB for at least one transmission.

An RA or PRACH resource set may be or include a transmission sequence which may be referred to as a preamble, a resource in time and/or frequency, and/or RA response (RAR) window information. The terms RA resource set and PRACH resource set may be used interchangeably.

An RA resource set may include a set of one or more PRACH resources and one or more associated PRACH parameters. Different PRACH resources in the same RA resource set may have the same or different associated parameters.

For example, an RA resource set may include a set of PRACH preambles, resource information related to a set of resources in time and/or frequency and RAR window information. Time for a PRACH resource or RA resource set may be, for example, allocated, configured, or identified in at least one of subframes, frames, system frame numbers (SFNs), TTIs, or symbols. Frequency may be, for example, in, allocated, configured, or identified in at least one of subcarriers, whole carriers, or resource blocks which may represent a set of subcarriers and symbols. The frequency allocation for a PRACH resource may be the full system bandwidth or part of the system bandwidth. An RA resource set may or may also include transmission and/or random access procedure parameters. RAR window information may including timing and location and/or directional information corresponding to receipt of an expected RAR transmission from the SCmB (i.e., corresponding to a time of expected receipt of the RAR and a location and/or direction from which the expected RAR is to be received from). Since the RAR window is received in a downlink beam, the expected direction and/or location for the RAR window of the expected RAR may be explicitly or inherently determined from the corresponding same direction and/or location of the downlink beam associated with the selected RA set and also other information received in the RA resource set, e.g., a frequency and time "location" of the window.

An RA resource set may be associated with one or more DL transmit beams and/or one or more UL receive beams.

An mWTRU may select or determine at least one RA resource set and perform an RA procedure using the at least one RA resource set. For a selected RA resource set, the procedure may include one or more of selecting a preamble from the set preambles in the selected RA resource set, selecting or determining a physical resource (e.g., directional UL transmit beam) in time and/or frequency from the set of physical resources in the selected RA resource set, determining a RAR window from RAR window information provided in the selected RA resource set, transmitting to the SCmB the selected preamble on the determined physical resource, monitoring during the determined RAR window at a determined location (e.g., a specified direction or zone) for a corresponding RAR, and/or receiving an RAR associated with the selected RA resource set and/or the preamble transmission. The mWTRU may use linkage or mapping information to select or determine the physical resource (e.g., a directional UL transmit beam) to use for a particular RA transmission, such that the linkage or mapping information may indicate a linkage or mapping of the selected preamble to the physical resource or may indicate a linkage or mapping of an RA resource set of the selected preamble to the physical resource. Thus, the mWTRU may determine which physical resource to select based on a selected RA resource set or selected preamble and the linkage or mapping information.

The RA procedure may include additional steps such as power ramping, retransmission, contention resolution, and the like. The SCmB and/or the mWTRU may perform beamforming the UL and/or DL.

SCmB downlink transmit and uplink receive beam linkage is disclosed herein. An SCmB may maintain a linkage and/or mapping between one or more downlink transmit beams and one or more uplink receive beams. The linkage and/or mapping may be determined by the spatial coverage. For example, a downlink transmit beam that may cover a specific SCmB downlink AoD range may be linked and/or mapped to one or multiple receive beams that may provide a corresponding spatial coverage for an SCmB uplink AoA.

For a downlink transmit beam, the downlink transmit beam linkage and/or mapping to uplink receive beam may be one to one, one-to-many, or many-to-one. Different downlink transmit beams may have different types of mapping, for example, one beam may have a one-to-one mapping while another may have a one-to-many mapping.

The beamwidth of an uplink receive beam may not be the same as the beamwidth of a downlink transmit beam. For example, given a certain coupling loss and uplink transmit power lower than that of the downlink, the SCmB receive beam may be narrower than the transmit beam to provide more gain to close the uplink link budget. In this example, the downlink transmit beam mapping to uplink receive beam may be one to many.

The mapping may be static, for example, configured when an SCmB is be started. The mapping may be semi-statically or dynamically reconfigured, for example, when the SCmB beamforming algorithm changes depending on certain network status, e.g., load per beam, user density, etc. The SCmB may send this SCmB transmit and receive beam linkage to mWTRUs via system information broadcast or via dedicated signaling.

The SCmB downlink transmit beam of the linked beams may be a control channel beam, a measurement beam or a data channel beam. The SCmB uplink receive beam of the linked beams may be used to receive PRACH, uplink control channel, uplink reference signal or uplink data channel.

Methods and systems for RA resource set linkage to one or more beams and/or times are disclosed herein. One or more RA resource sets may be provided and/or used. A RA resource set may be associated with or correspond to at least one SCmB beam such as at least one SCmB DL transmit beam for a downlink transmission transmitted by the SCmB and/or at least one SCmB UL receive beam for an uplink transmission to be received by the SCmB. A group of one or more RA resource sets may be associated with and/or correspond to at least one SCmB beam such as at least one SCmB DL transmit beam and/or at least one SCmB UL receive beam. A group may have one or more members.

In an example, a group of RA resource sets may be associated with a SCmB DL transmit beam, e.g., by configuration. The SCmB DL transmit beam may correspond to one or more SCmB UL receive beams. A RA resource set, for example, each RA resource set in the group may correspond to an SCmB UL receive beam. Multiple SCmB DL transmit beams may be associated with a same UL receive beam. A RA resource set may be in more than one group of RA resource sets. A RA resource set may be associated with more than one SCmB DL transmit beam.

An SCmB may provide and/or configure the RA resource sets, for example, in signaling such as RRC or broadcast signaling and/or in system information such as in a SIB. An mWTRU may receive and/or use one or more of the RA resource sets or groups of RA resource sets, for example, received in signaling or configuration from an SCmB.

An association between a group of RA resource sets and an SCmB DL transmit beam may be implicit or explicit. For example, an SCmB may transmit broadcast signaling when transmitting using a particular DL beam, for example, when transmitting with particular beamforming which may create a directional beam in azimuth and/or elevation. The broadcast signaling may include a configuration for a group of RA resource sets. The broadcast of the group when using the particular DL transmit beam may implicitly associate the group with the DL transmit beam. In another example, the association between a group of RA resource sets and a DL transmit beam may be explicitly indicated in signaling.

A random access resource set may be associated per SCmB uplink receive beam. Each RA resource set may be associated with a specific SCmB uplink receive beam, for example, the PRACH time allocation of a RA resource set may be determined by the associated SCmB uplink receive beam sweeping schedule, the maximum PRACH transmit power may be based on the gain of the associated SCmB uplink receive beam, etc.

RA resource sets may be provided by the SCmB to all mWTRUs via system broadcast signaling and/or dedicated signaling. The signaling may include a mapping between RA resource set number or index to SCmB downlink transmit beam or/and SCmB uplink receive beam. The SCmB downlink transmit beam and uplink receive beam may be indicated with a beam reference signal index, a beam identity (ID), a scrambling code index, etc.

With this mapping configuration, an mWTRU may for example establish one of or both mappings described in Equation 1 and Equation 2:

$$mB \text{ downlink transmit beam} \rightarrow \text{Random access resource set} \quad \text{Equation 1}$$

$$mB \text{ downlink transmit beam} \rightarrow SCmB \text{ uplink receive beam} \rightarrow \text{Random access resource set} \quad \text{Equation 2}$$

As SCmB downlink transmit beam mapping to SCmB uplink receive beam may be one-to-one, one-to-many or many-to-one, one SCmB downlink transmit beam may be associated with multiple SCmB uplink receive beam and as a result the SCmB downlink transmit beam may be mapped to multiple RA resource sets.

RA resource set selection is disclosed herein. In one embodiment, RA resource set selection may be independent of beam information. An mWTRU may select or determine a RA resource set or a group of RA resource sets from configuration information from the SCmB, for example, provided in a SIB, which may associate the RA resource set or the group of RA resource sets, for example, implicitly or explicitly, with a DL beam, DL measurement or measurement set, or DL transmission. That is, information representative of a DL beam may be used by the processor of the mWTRU, for example, to make the selection of the RA resource set or group of RA resource sets. In addition or alternatively, the RA resource set or the group of RA resource sets may be implicitly or explicitly associated with, for example, an UL beam, an UL measurement or measurement set, or an UL transmission. That is, information representative of a UL beam may be used by the processor of the mWTRU, for example, to make the selection of the RA resource set or group of RA resource sets. An mWTRU may select one or more RA resource sets or one or more groups of RA resource sets based on configuration information received from the SCmB, measurement information received from the SCmB and/or measurement information acquired (i.e., measured) by the mWTRU from a DL beam.

For example, the mWTRU may select or determine an RA resource set or a group of RA resource sets based on at least one of: (i) a DL measurement, for example, a DL beam measurement) which may for example cross a threshold, (ii) the highest DL measurement, for example, a highest DL beam measurement of a set of DL measurements, where each of DL beam measurements may, for example, cross a threshold (iii) RA resource set configuration which may be provided or broadcast by an SCmB, for example, in system information, and (iv) time of the DL measurement or time a DL signal or channel is received by the mWTRU.

For example, the mWTRU may receive a DL control channel and/or a reference signal at a particular time and/or take a measurement thereof at a particular time. A SIB, which may identify (e.g., implicitly or explicitly) and/or include configuration of a RA resource set or a group of RA resource sets, may be associated with the DL control channel or the reference signal. If the mWTRU successfully receives the control channel and/or determines the measurement is above a threshold, the mWTRU may receive the associated SIB and/or the associated configured group of RA resource sets. The mWTRU may select or determine the group of RA resource sets as the group associated with, or provided in, the SIB associated with the DL control channel or the measurement.

In another example, the mWTRU may receive multiple DL control channels and/or measure multiple reference signals each at a particular time. The mWTRU may choose the DL control channel or reference signal with the best quality, for example, highest signal, SNR, or signal-to-interference-plus-noise ratio (SINR), and receive the associated SIB and/or the associated configured group of RA resource sets. The mWTRU may select or determine the group of RA resource sets as the group associated with, or provided in the SIB associated with, the chosen or best quality channel or signal.

RA resource set selection with beam information is disclosed herein. An mWTRU may select or determine a group of RA resource sets based on an SCmB DL beam. An mWTRU may determine or select an SCmB DL beam based, for example, on at least one of successful synchronization, successful reception of a transmission from the beam such as a SIB or control channel, a measurement of the beam, and/or a measurement of the beam exceeding a threshold. The association of beams with signals and channels such as synchronization signals, broadcast channels, control channels, and measurement signals may or may not be known to the mWTRU. For example, an mWTRU may not know the association until after reading one or more SIBs. An mWTRU may synchronize to an SCmB and read SIBs and/or control channels based on time relationships. For simplicity in some embodiments and examples described herein, the mWTRU may determine or select a beam and use that beam for other determinations or associations. The mWTRU may instead, or in addition, determine and/or use an aspect of a beam, for example, the transmission or reception time of a signal or channel which may be beamformed and still be consistent with the examples disclosed herein.

For example, the SCmB may sweep DL beams in time. The mWTRU may find one or more satisfactory DL transmissions, for example, based on successful synchronization, successful reception, or a measurement exceeding a threshold. A DL transmission may correspond to a DL beam. The mWTRU may choose one or more of the satisfactory DL transmissions or the associated DL beams, for example, the best or highest quality N (N>=1) DL transmissions or DL beams. For each of the N chosen transmissions or beams, the mWTRU may determine one or more times during which to acquire one or more associated SIBs, for example, from a fixed or known timing relationship and the mWTRU may acquire the one or more SIBs. An SIB associated with a DL transmission or DL beam may include an identification and/or a configuration of a RA resource set or a group of RA resource sets. The RA resource set, sets or group of sets may be provided to the mWTRU separate to, along with or included in the SIB.

The mWTRU may select or determine a RA resource set or a group of RA resource sets as the set or the group associated with or provided in the SIB associated with each of the chosen N, DL transmissions DL beams.

RA resource set selection, for example, selection of multiple groups is disclosed herein. An mWTRU may determine one or more groups of RA resource sets. For example, an mWTRU may determine a group of RA resource sets for each DL beam for which a measurement exceeds a threshold. An mWTRU may determine a primary group and one or more secondary groups. The primary group may correspond to the best beam (i.e., the beam with the highest quality measurement).

Figure 22:
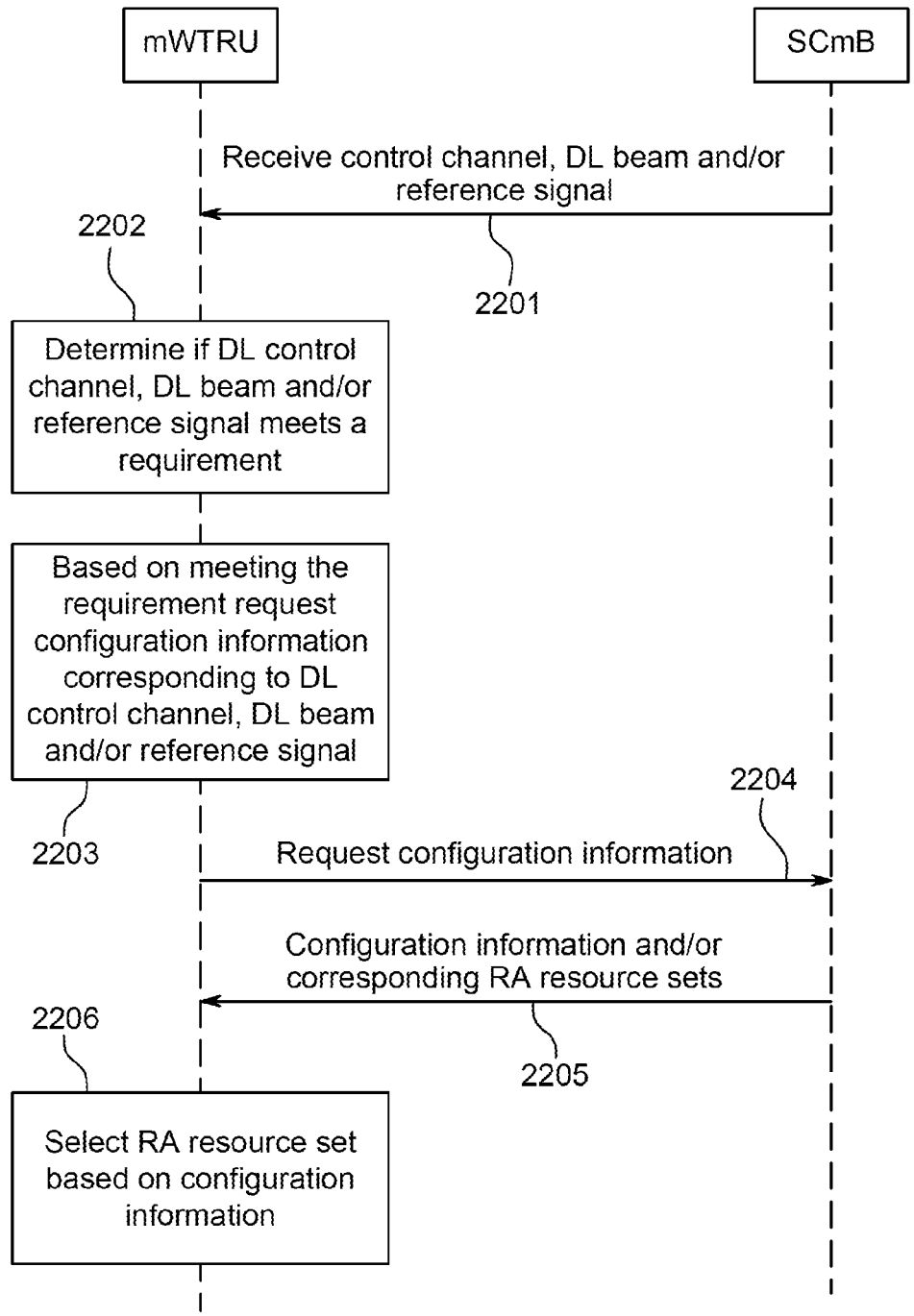
FIG. 22 is a diagram of an example RA acquisition and selection procedure.

FIG. 22 illustrates an example of RA acquisition and selection procedure. A DL control channel, DL beam and/or reference signal may be transmitted by the SCmB and received by the mWTRU (2201). The mWTRU may determine, in accordance with the procedures disclosed herein, whether the DL control channel, DL beam and/or reference signal meets a requirement (e.g., based on a threshold test, best quality, successful synchronization, etc.) (2202). Based on the determination of meeting the requirement, the mWTRU determine to request configuration information (e.g., to be provided in a SIB) corresponding to the DL control channel, DL beam and/or reference signal from the SCmB (2203). The mWTRU may transmit the request for configuration information to the SCmB (2204). Upon receiving the request for configuration information, the SCmB may transmit the corresponding configuration information and RA resource sets which correspond to the configuration information to the mWTRU (2205). Upon receiving the configuration information and RA resource sets, the mWTRU may select a RA resource set based on the configuration information (2206). It will be appreciated that the configuration information and RA resources sets may be transmitted to the mWTRU in separate transmissions at separate times, and, in some cases, the RA resource sets may be provided to the mWTRU prior to or subsequent to the request for configuration information.

Figure 23:
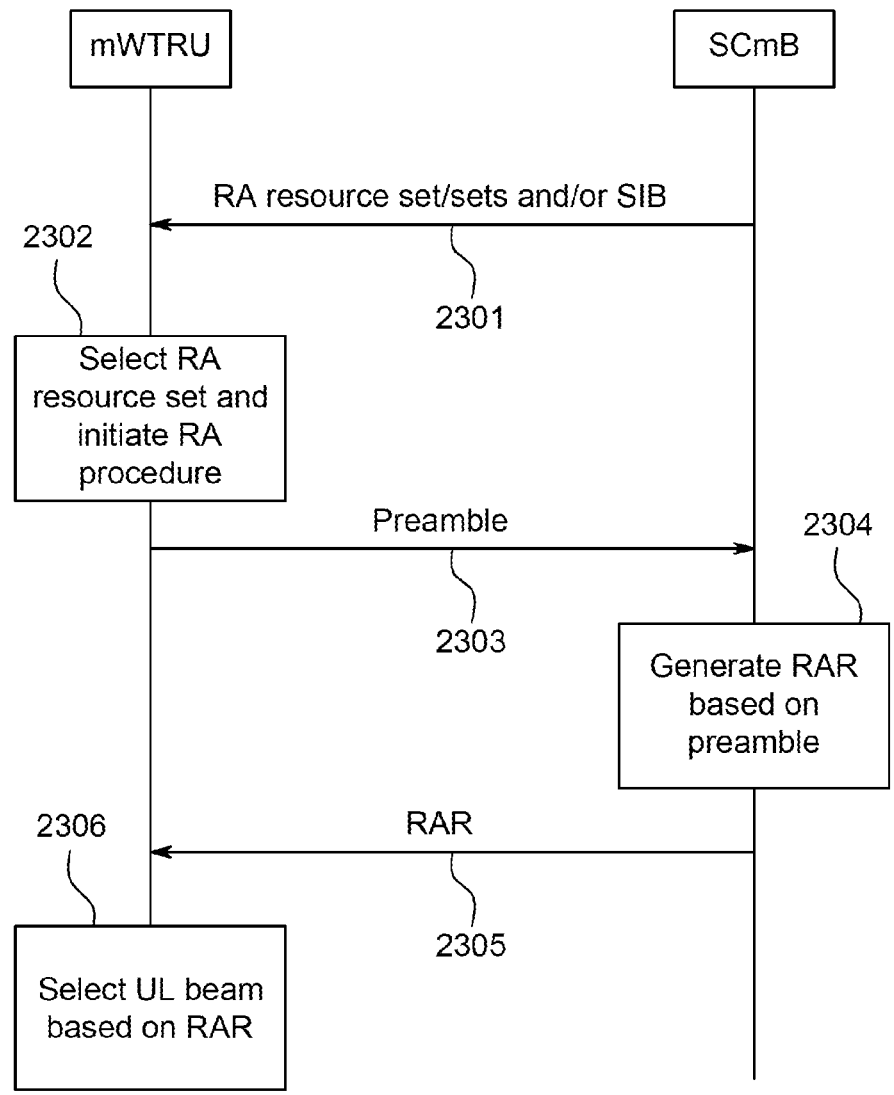
FIG. 23 is a diagram of an example RA acquisition, selection and confirmation procedure.
Figure 26:
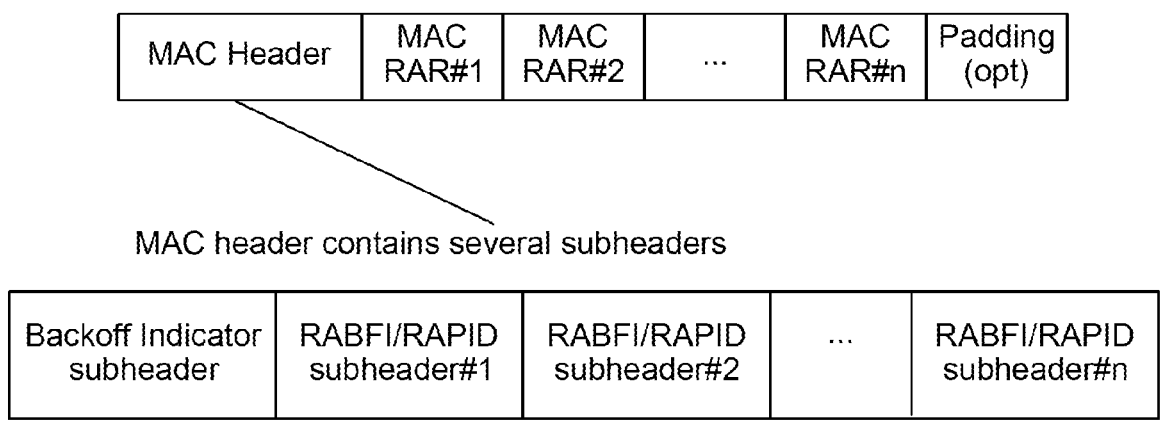
FIG. 26 is an example mmW MAC PDU comprising of an example mmW MAC header and example mmW MAC RARs.

FIG. 23 illustrates an example RA acquisition, selection and confirmation procedure. An RA resource set or sets and/or SIB is transmitted by the SCmB and received by the mWTRU (2301). The mWTRU selects an RA resource set from those RA sets received, and begins to perform an RA procedure based on the selected RA set (e.g., further selecting a preamble provided in the selected RA resource set, further selecting a physical resource such as a directional mWTRU uplink (UL) transmit beam for transmitting the selected preamble based on the selected preamble, further determining a RAR window for monitoring for a specific RAR, etc.) (2302). The mWTRU may then transmit the selected preamble to the SCmB using the selected directional mWTRU UL transmit beam (2303). Upon receiving the preamble, the SCmB may generate or select a Random Access Response (RAR) based on the received preamble (2304), and may transmit the RAR to the mWTRU using a corresponding directional SCmB DL beam (2305). The RAR may be transmitted by the SCmB as the mWTRU monitors for the RAR during a RAR window determined by the mWTRU, where the RAR window corresponds to, for example, a time period and a location (e.g., direction) in which the mWTRU monitors for a specific, expected RAR. The SCmB may use configuration information based on the RA resource used in the received uplink preamble (e.g., the one selected by the mWTRU) to determine a transmission timing of the selected RAR such that the transmission timing coincides with the RAR window. The mWTRU may select an UL beam based on the received RAR (2306).

It will be appreciated that the examples illustrated in FIGS. 22 and 23 may be combined in various ways and the ordering of steps may be rearranged without departing from the general concepts disclosed herein. For example, some or all of steps 2201-2206 may be incorporated into FIG. 23 to occur prior to step 2303.

Random access resource set contents are disclosed herein. An RA resource set may include a set of one or more PRACH resources, for example, preambles and/or resources in time and/or frequency, and one or more associated PRACH parameters, for example, transmission and/or RA procedure parameters.

The PRACH transmission sequences may be or may include preambles included in a RA resource set and may be or may be based on Zadoff-Chu (ZC) sequences. Each preamble sequence may have a unique index number associated with a specific cyclic shift of the ZC sequence. The set of preamble sequences for each RA resource set may be configured or may be determined based on pre-configured criteria. For example, each RA resource set may have a designated ZC base sequence and each preamble in the resource set may use a different cyclic shift based on the designated ZC base sequence.

An RA resource set may include a PRACH format for use with one or more, including all, of the preambles in the RA resource set. The PRACH format may indicate preamble transmission parameters such as the duration of the PRACH transmission in number of symbols, a number of TTIs, or a number of sub-frames, the length of a guard period, the length of a cyclic prefix, etc. The indication of the preamble transmission parameters may be explicit with enumerated parameters or may be represented by one or more indices into a pre-defined configuration that may define a combination of PRACH format parameters. The PRACH format of a RA resource set may be related to certain characteristics of an SCmB uplink receive beam which may be associated with the RA resource set, for example, a beamforming gain.

Transmission and/or RA procedure parameters which may be associated with an RA resource set may include one or more of the following: a PRACH maximum power, a PRACH minimum transmit beamforming gain, a PRACH maximum transmit bandwidth, an SCmB antenna gain offset, an initial PRACH receive target power, or a power offset between the PRACH and an uplink control and/or data channel TDD configuration indication.

PRACH maximum power may be the maximum power for a PRACH transmission for a RA resource set and may be specific to characteristics of an SCmB uplink receive beam associated with the RA resource set. The PRACH maximum power may not be the same as the maximum transmit power specified for uplink control or data channels or the total mWTRU maximum transmit power, for example, since an mWTRU may apply different beamforming for PRACH than that of the uplink control or data channels. The PRACH maximum power may be related to the PRACH beamforming gain (e.g., minimum transmit beamforming gain) associated with each RA resource set. The PRACH maximum power may be referred to as PRACH maximum equivalent isotopically radiated power (EIRP).

A PRACH minimum transmit beamforming gain and/or a PRACH maximum transmit beamwidth may be parameters associated with an RA resource set. A PRACH transmission may target an SCmB uplink receive beam associated with the RA resource set. The uplink receive beam may have a spatial coverage and gain. The minimum transmit beamforming gain or PRACH maximum transmit beamwidth may enable the PRACH transmission to be contained spatially in the direction towards the targeted SCmB uplink receive beam. One or more of a PRACH maximum EIRP, a PRACH minimum transmit beamforming gain, and a PRACH maximum transmit beamwidth may together specify or determine a distribution of PRACH power in the spatial domain, for example, how much power may be focused at which direction. The power may be constrained by the PRACH maximum EIRP.

An SCmB antenna gain offset parameter of an RA resource set may indicate the gain imbalance between the SCmB downlink transmit beam and uplink receive beam pair which may be associated with the RA resource set. It may be used, for example, by an mWTRU to estimate uplink path loss from a measured DL path loss to set or determine PRACH transmit power (e.g., an initial PRACH transmit power), which may be based on DL or UL path loss.

Initial PRACH receive target power may be provided to enable an mWTRU to determine the initial PRACH transmit power. The desired PRACH target power at the SCmB uplink receive beam may be based on at least one of the uplink receive beam gain, an interference and noise level received in the uplink receive beam, an SCmB antenna downlink and uplink gain imbalance, etc.

Power offset between the PRACH and an uplink control and/or a data channel may be a RA resource set parameter. The power offset may be the difference between the power of the preamble and a subsequent uplink control and/or data channel transmission, used for one or more MSG3 transmissions. An mWTRU may adjust the uplink control and/or data channel transmit power according to this power offset and/or the beamforming gain which may be applied to the uplink data channel.

A TDD configuration indication may be used to indicate the TDD configuration. An SCmB downlink transmit beam and uplink receive beam may have a specific TDD configuration that may be semi-static or dynamic. The RA resource set may have a TDD indication using one or more indices into a pre-defined configuration that may define a set of TDD configurations.

Transmission and/or RA procedure parameters which may be associated with an RA resource set may include one or more of a PRACH power ramping factor, an RA response window start, an RA response window size or duration, a maximum number of preamble transmissions, or a maximum retransmission interval.

When increasing the power for a PRACH retransmission for a beamformed PRACH, the mWTRU may apply the ramping factor and/or beamforming gains by decreasing the PRACH transmit beamwidth. The mWTRU may increase the power by a value smaller that the ramping factor and apply beamforming gain such that the combined result is equivalent to applying the ramping factor.

An RA response window start may be a number of time units, for example, in frames, subframes, TTIs, symbols, between the end of the transmitted preamble and the start of the corresponding RA response window. This may be a fixed value for all RA resource sets or may vary between RA resource sets, for example, based on SCmB downlink transmit beam and/or uplink receive beam scheduling or timing. The RA response window start may be a function of the scheduling or timing relationship between an SCmB DL transmit beam and an SCmB UL receive beam pair.

An mWTRU may stop preamble transmissions when the number of transmitted preambles reaches the maximum number of preamble transmissions, for example, for an RA resource set or over all selected RA resource sets. There may be a maximum number of preamble transmissions for a resource set and/or a maximum number of preamble transmissions over all selected RA resource sets for one random access procedure.

A maximum retransmission interval may be a number of time units, for example, in frames, subframes, TTIs, and/or symbols between the end of a RA response window in which no RA response may be received and the start of a PRACH retransmission when a PRACH retransmission may be scheduled.

One or multiple RA resource set elements, for example, the PRACH resources and/or parameters, may be different between RA resource sets. Different RA resource sets may have at least some of the same elements, for example, preamble sequence indices, time and frequency resource allocations, PRACH formats, etc. The SCmB may re-allocate and re-configure RA resource set semi-statically or dynamically.

Individual beam-specific PRACH transmission is described herein. An association between an RA resource set and an mWTRU uplink transmit beam is further described herein. The mapping between an SCmB downlink transmit beam and an uplink receive beam may provide a transmission reciprocity between the SCmB downlink AoD and the uplink SCmB AoA at the SCmB. The mWTRU beamformed random process procedure may use this reciprocity information conveyed in the SCmB downlink transmit and uplink receive beam mapping to select an RA resource set and accordingly an mWTRU uplink transmit beam to optimize the success rate of the RA transmission based on the mWTRU's reception of downlink transmit beam.

An mWTRU may calculate one or multiple mWTRU transmit beamforming weights based on SCmB downlink transmit beam AoA information. The weights may align the broadside direction of the associated mWTRU uplink transmit beam with the SCmB downlink transmit beam angle.

The calculation may be based on the mWTRU's receiver beamforming weights when mWTRU receive beamforming may be applied to receive the SCmB downlink transmit beam, for example, a conversion from mWTRU receive beamforming weights to mWTRU uplink transmit beamforming weights. An mWTRU may not apply receive beamforming in the reception of the SCmB downlink transmit beam, and the calculation of the uplink transmit beamforming weights may be based on AoA estimate algorithms.

The beamforming weights may result in an mWTRU uplink transmit beam or multiple transmit beams that have an mWTRU uplink AoD overlapping or within the downlink AoA of the used SCmB downlink transmit beam. In other words, the mWTRU may transmit an mWTRU uplink transmit beam at the direction where it may receive an SCmB downlink transmit beam.

An mWTRU may, for example, establish one of or both mappings described in Equation 3 and Equation 4:

$$SCmB \text{ downlink transmit beam} \rightarrow RA \text{ resource set} + mWTRU \text{ uplink transmit beam} \quad \text{Equation 3}$$

$$SCmB \text{ downlink transmit beam} \rightarrow SCmB \text{ uplink receive beam} \rightarrow RA \text{ resource set} + mWTRU \text{ uplink transmit beam}. \quad \text{Equation 4}$$

The mapping may be different depending on the SCmB downlink transmit beam. It may be based on SCmB downlink control channel beam, data channel beam and/or measurement beam.

An RA resource set and associated UL transmit beam selection are disclosed herein. An mWTRU may select a RA resource set and an associated mWTRU uplink transmit beam based on an SCmB downlink control beam. For example, an mWTRU may receive an mmW synchronization signal, a broadcast channel (e.g., mmW PSS/SSS/PBCH/SIB) in one specific SCmB downlink transmit beam. This downlink transmit beam may be one of a set of control channel beams provided by the SCmB in the cell that is selected by an mWTRU as a result of the preceding mmW cell search procedure according to certain criteria.

One criterion, for example, may be this SCmB downlink control beam may have the best measured quality metric in terms of digital and/or analog measurements including signal energy, SNR, SINR, RSRQ, RSRP, CQI, etc. Another criterion, for example, may be this SCmB downlink control beam may be the first downlink control beam to have a measured quality metric in in terms of digital and/or analog measurements including signal energy, SNR, SINR, RSRQ, RSRP, CQI, etc. higher than a pre-configured threshold.

As the downlink control beam measurement may be stale at the initiation of random access procedure, an mWTRU may determine a RA resource set based on an SCmB downlink measurement beam which it may measure in a pre-PRACH-measurement configured by the network, for example, in SIB or through dedicated signaling.

The pre-PRACH-measurement configuration may be conveyed in the SCmB downlink data channel beam scheduled by the SCmB downlink control data beam in which the mWTRU may receive a mmW synchronization signal, a broadcast channel and mmW downlink control channels.

The SCmB may provide, and the mWTRU may receive, one or more measurement configurations. Each configuration may correspond to an SCmB downlink measurement beam and associated measurement parameters of a measurement object, which may completely define the mmW beam reference signal, mmW reference resource for beam measurement, mmW measurement reference signal, mmW channel state measurement reference signal, mmW demodulation reference signal, mmW sounding reference signal, reference signal, CSI-RS, CRS, DM-RS, DRS, measurement reference signal, reference resource for measurement, CSI-IM, etc.

The parameters included in the measurement configuration may include: a measurement object, for example, an SCmB downlink measurement beam identity, which may be an sequence number explicitly signaled or an index into a pre-defined configuration; a measurement occasion, for example, SFN, sub-frame, TTI number, symbol number, etc.; a measurement duration or gap, for example, a number of symbols, TTIs, sub-frames, frames, etc.; a measurement frequency allocation, for example, the entire system bandwidth, part of the system bandwidth, the number of system carriers, etc.; a measurement type, for example a quality metric such as energy, SNR, SINR, RSRP, RSRQ, CQI, etc.; a measurement threshold, for example, a quantitative indicator of the configured quality metric that may trigger a pre-defined event such as downlink measurement beam ranking; a measurement transmit power, for example, to use to estimate the path loss associated with the SCmB downlink measurement beam; and other parameters specific to the type of measurement. The frequency allocation parameter may be the same as or close to the frequency allocation of the RA resource set corresponding to this downlink measurement beam.

A mapping between SCmB downlink measurement beam and SCmB uplink UL receive beam may be provided in the same measurement configuration signaling or separately in SIB or dedicated signaling.

An mWTRU may perform a pre-PRACH measurement according to the received measurement configuration and evaluate the measured quality metric. The determination of which measured SCmB downlink measurement beam to be used to select a corresponding RA resource set and an associated mWTRU uplink transmit beam may be based on a set of pre-defined criteria. One criterion may be based on the pre-PRACH-measurement result. For example, one SCmB downlink measurement beam may have the best measured quality metric and the mWTRU may select this SCmB downlink measurement beam for RA resource set determination. In another example, an mWTRU may randomly select an SCmB downlink measurement beam from all the beams that may have a measured quality metric higher than the configured measurement threshold.

Another criterion may be based on a pre-PRACH-measurement result and the RA resource set configuration associated with each downlink measurement beam. For example, one SCmB measurement beam may not have the best measured quality metric and may have a quality metric above the configured measurement threshold. One or more of a plurality of corresponding RA resource sets may have certain parameters that may, in a way, optimize the PRACH transmission success rate or may benefit the random process procedure.

For example, the RA resource set or sets may have the next, nearest or earliest available PRACH transmission time allocation in the upcoming SFN, sub-frame, TTI, symbol, etc. The mWTRU may select this downlink measurement beam or beams and in turn select an associated RA resource set or sets in order to start as early as possible the random access procedure. In another example, the RA resource set or sets may have a frequency allocation where the mWTRU may have measured very low noise level in the pre-PRACH-measurement or any previous measurement in connection with initial access procedure or other system procedures.

An mWTRU may select one of the RA resource sets for use as a primary RA resource set to initiate a random access procedure. In addition, the mWTRU may select one or multiple RA resource sets for use as a secondary RA resource for the same random access procedure. The selection of the secondary RA resource sets may follow pre-configured rules/criteria. For example, the secondary RA resource sets may corresponding to downlink measurement beams which are above the configure measurement threshold and have certain ranking based on the pre-PRACH measurement.

The pre-PRACH-measurement may also be performed in any form of downlink DL beam measurement prior to the initiation of a random process procedure. The disclosed RA resource set selection may be performed in an identical manner based on those downlink DL beam measurements.

RA procedure initialization is disclosed herein. A RA procedure may be initiated by an mWTRU, for example, when the WTRU is initially accessing the mmW network or by an explicit order carried in mmW downlink control channel. The explicit order may provide indications and/or additional RA procedure configurations regarding some or all of the RA resource set parameters, for example, a preamble mask that may be used by an mWTRU to identify certain random access procedure.

An mWTRU may select a primary RA resource set and one or multiple secondary RA resource sets based on an SCmB downlink control or measurement beam. For each RA resource set, an mWTRU may initialize a random access procedure for determining each of the RA resource set parameters listed below.

An mWTRU may flush an uplink data buffer (e.g., a MSG3 buffer) and initiate a preamble counter for a primary RA set and all secondary RA sets for one random access procedure. MSG3 is an uplink data packet the mWTRU may transmit when an expected Random Access Response (RAR) is received.

Random access resource selection is disclosed herein. The mWTRU may determine the value of each of the parameters of the selected RA set to use for the PRACH transmission, for example, the preamble sequence index, the PRACH format, the frequency resource allocation, and the transmission time. For a random access procedure ordered in a downlink control channel, an mWTRU may receive additional random access resource configuration, for example, regarding preamble sequence selection, frequency selection, transmission time allocation, and the like to determine the value of certain RA resource set parameters.

In one example, there may be multiple preambles in the selected RA resource set and the mWTRU may randomly select one of them. Certain rules and/or criteria may apply to the preamble selection within the selected RA resource set. For example, preambles of the selected RA resource set may belong to different pre-defined groups that may be conveyed to all mWTRUs via SIB or dedicated signaling. Preamble grouping may for example be based on estimated path loss, a purpose of the intended random process procedure, mWTRU beamforming capability, mWTRU power class, and the like. An mWTRU may choose a preamble from the selected RA resource set according to the pre-configured rules and/or criteria applicable to the preamble grouping. An mWTRU may receive an explicit preamble index or indices in the downlink control channel when the random access procedure may be ordered.

When there are multiple frequency resource allocations to select in one RA resource set, an mWTRU may choose one at random. An mWTRU may have previous interference and/or noise measurement in some or all of the frequency resource allocation and may select the frequency resource allocation accordingly, for example, select the frequency resource allocation where the measured interference and/or noise measurement may be low.

An mWTRU may determine the initial PRACH transmission opportunity based on the SFN, sub-frame, TTI and symbol configuration of the selected RA set using certain rules. For example, available PRACH transmissions may be in certain upcoming uplink sub-frames and/or TTIs in certain SFNs. The TDD configuration specific to the same selected RA set may be used as a mask to select the transmission opportunity. In addition, a downlink control channel ordered random access procedure may specify information that may be used to determine the PRACH transmission opportunity, for example a time mask, explicit SFN/sub-frame/TTI/symbol number, etc.

A dynamic TDD configuration may be applied to the SCmB downlink transmit and uplink receive beam pair associated with the selected RA set. An mWTRU may use the most recently obtained dynamic TDD configuration to determine an initial PRACH transmission in the period in which the dynamic TDD configuration may be applicable. For example, when the dynamic TDD configuration may be conveyed in the beginning of each sub-frame which contains a number of TTIs or slots, the initial PRACH transmission opportunity determination may be done for each sub-frame.

An mWTRU may determine randomly with equal probability a PRACH transmission opportunity from a period in which multiple PRACH transmission opportunities may be allowed according to the RA set time resource allocation and TDD configuration. An mWTRU may select the first allowed PRACH transmission opportunity.

An mWTRU may identify the uplink transmit beam associated with the selected RA set using a mapping described herein. The uplink transmit beam may be represented by a set of weights that may be applied to the mWTRU antenna array phase shifters.

Random access preamble transmissions are disclosed herein. An mWTRU may transmit the initial PRACH using the selected RA resource parameters. For example, an mWTRU may generate the selected PRACH/preamble sequence. The mWTRU may generate an identity that may be used to identify the mWTRU in the initiated random access procedure, for example, a RA-RNTI. The RA-RNTI may be based on the determined frequency resource allocation for example frequency offset index, the PRACH transmission opportunities for example sub-frame/TTI/symbol number or other parameters.

The mWTRU may derive a path loss specific to the selected RA set using measured downlink transmit control or measure beam quality metric for example, energy, RSRP, RSSI, etc., antenna gain offset, and the downlink transmit control or measurement beam transmit power that may be conveyed in system broadcast signaling and/or dedicated signaling.

The mWTRU may determine the initial PRACH power using the derived path loss, initial PRACH receive power, and the maximum PRACH power. For example, $P_{PRACH}$=min{Maximum PRACH power, Initial PRACH receive power+path loss} dBm. The mWTRU may generate beamforming weights based on the mWTRU uplink transmit beam associated with the selected RA set, the calculated initial PRACH power, and the PRACH minimum transmit beamforming gain (PRACH maximum transmit beamwidth) of the selected RA set.

In an example, the mWTRU uplink transmit beamforming weights associated with the selected RA set may determine the angle of the departure of the initial PRACH transmission, for example, the broadside of the formed mWTRU uplink transmit beam. The calculated PRACH power and the minimum transmit beamforming gain may determine the beamforming gain of the initial PRACH transmission. The mWTRU may calculate the resulting initial PRACH transmit beamforming weights accordingly and the corresponding transmit power applied at each antenna element.

The mWTRU may apply the generated beamforming weights, form an mWTRU uplink transmit beam associated with the selected RA resource set, and transmit the selected PRACH sequence over the determined frequency resource in the determined transmission time allocation, for example one or more SFNs, sub-frames, TTIs, or symbols.

Random access response (RAR) reception is disclosed herein. After the initial PRACH transmission, an mWTRU may receive the RAR in the RA response window specified in the selected RA resource set. The mWTRU may determine the RA response window start using the RA response window start parameter and TDD configuration provided by the selected RA resource set. The mWTRU may determine the resulting actual RA response window start using certain rules. For example, when a PRACH transmission may occur in TTI n and the RA response window start may be three TTIs, the expected RA response window may start in TTI n+3 when the semi-static TDD configuration may indicate TTI n+3 may be a downlink TTI. When TTI n+3 may be an uplink TTI, the resulting RA response window start may be the first downlink TTI after the scheduled RA response window start, for example, in this case the first downlink TTI after TTI n+3.

The mWTRU may monitor a downlink control channel transmitted in the downlink control channel beam used for downlink SIB scheduling. The mWTRU may determine whether the RA response may be transmitted corresponding to the PRACH transmission using the identity information associated with the PRACH transmission or the mWTRU's identity information. For example, the mWTRU may decode the downlink control channel using the RA-RNTI corresponding to the initiated PRACH transmission or the C-RNTI that the mWTRU may be already assigned.

An mWTRU may receive a dynamic TDD configuration on a basis of a frame, sub-frame, or TTI and the mWTRU may determine the RA response window start and monitor the RA response according to the dynamic TDD configuration, RA response window start, and downlink control channel beam scheduling. The SCmB may have all this information and may transmit the RA response at the frame, sub-frame, TTI, or symbol where the mWTRU may expect it according to the RA response window information provided in a selected RA resource set.

An mWTRU may receive an RA response in the SCmB downlink transmit beam which may be selected by the mWTRU from the downlink measurement beams that are measured in a pre-RACH-measurement. The mWTRU may determine the RA response window start using the RA response window start parameter provided by the selected RA resource set, TDD configuration of the selected RA resource set or dynamic TDD configuration. In the determined RA response window start frame, sub-frame, TTI, or symbol, the mWTRU may decode a downlink control channel using RA-RNTI or C-RNTI to receive RA response scheduling information. This downlink transmit beam may not be the one as the downlink control channel beam from which mWTRU may receive system broadcast scheduling information and as a result the mWTRU may decode different downlink control information format in the downlink transmit beams.

The RA response may be carried in a downlink data channel beam that may be different from the downlink control channel beam. An mWTRU may detect a downlink control channel using RA-RNTI or C-RNTI in the determined RA response window and successfully decode the downlink data channel in the scheduled downlink data channel beam. The mWTRU may successfully decode the downlink data channel and may receive uplink control and/or data channel scheduling information, uplink transmission timing information, etc. The uplink transmission timing information may include, for example, a minimum delay between the latest PRACH transmission and the uplink control and/or data channel transmission, timing advance and uplink and downlink timing offset, and the like. The control and/or data channel scheduling information may include transport format, resource allocation in a time, frequency, or code domain, demodulation reference signal configuration, HARQ transmission configuration, and the like. The mWTRU may denote the transmit power of the corresponding PRACH transmission and apply as a reference to set the uplink data transmission power. For example, the uplink control/data channel power may be the reference PRACH transmission power plus the power offset between PRACH and uplink control/data channel of the RA resource set selected for the reference PRACH transmission. The mWTRU may derive the timing of the scheduled uplink control and/or data channel in terms of a frame, sub-frame, TTI, symbol based on TDD configuration of the selected RA resource set or dynamic TDD configuration.

The mWTRU may transmit the scheduled uplink control and/or data channel using the mWTRU uplink transmit beam applied for the corresponding PRACH transmission. The mWTRU may calculate new transmit beamforming weights based on those of the corresponding PRACH transmission with a gain adjustment based on the power offset between the PRACH and control and/or data channel. In another example, the mWTRU may reuse the same transmit beamforming weights and adjust the transmit power at the antenna element to account for the same offset.

A PRACH retransmission procedure using the selected primary RA resource set is disclosed herein. An mWTRU may not detect an RA response in the determined RA response window, for example, the downlink control channel beam may not carry any downlink control channel for the RA-RNIT or C-RNTI of the mWTRU. The mWTRU may select a PRACH resource for a preamble retransmission when the total number of transmitted preambles may not exceed the maximum number of preamble transmission specified for the selected RA set or the on-going random process procedure.

The mWTRU may select an RA resource for the PRACH retransmission within the selected RA resource set for the preceding PRACH transmission, for example, the primary RA resource set determined in the beginning of the RA procedure. The order in which the mWTRU may select RA resources from the primary RA resource set for the PRACH retransmission may be according to one or more of the examples disclosed herein.

The mWTRU may randomly select a different preamble sequence, for example, a ZC sequence with a different index (cyclic shift) when there may be multiple sequences in the primary RA resource set. The mWTRU may select a retransmission preamble sequence according to the same pre-configured rules and/or criteria used for the preceding PRACH transmission sequence selection. The random access procedure may be ordered by a downlink control channel including preamble sequence configuration and the mWTRU may randomly select a retransmission preamble sequence.

The mWTRU may select a frequency resource allocation for the PRACH retransmission according to certain frequency hopping pattern that may be received in SIB or dedicated signaling. The mWTRU may use the same frequency resource allocation as the preceding PRACH transmission.

The mWTRU may determine the PRACH retransmission opportunity based on the based on the frame, sub-frame, TTI and symbol configuration, TDD configuration of the selected primary RA set or the dynamic TDD configuration the mWTRU may receive prior to the PRACH retransmission resource selection. In addition, the retransmission timing may be according to the maximum retransmission interval specified for the primary RA resource set. For example, when an mWTRU does not receive an RA response by the end of the RA response window, which may be frame, sub-frame, TTI, symbol number n, the mWTRU may retransmit a preamble sequence no later than frame, sub-frame, TTI, symbol n+a maximum retransmission interval.

The mWTRU may use the mWTRU uplink transmit beam, for example in terms of the uplink transmit beamforming weights, of the preceding PRACH transmission for the PRACH retransmission.

Methods for PRACH retransmission using a re-selected RA resource set are disclosed herein. The mWTRU may select an RA resource for the PRACH retransmission from one of the secondary RA resource sets determined in the beginning of the RA procedure. The order in which the mWTRU may select another RA resource set from the secondary RA resource sets for the PRACH retransmission may be according to one or more of the following as disclosed herein. The mWTRU may randomly select a secondary RA resource set that may be associated with the same downlink control channel beam or measurement beam as the primary RA resource set. The mWTRU may randomly select a secondary RA resource set from all the identified secondary RA resource sets. The mWTRU may select a secondary RA resource set according to the ranking of the secondary RA resource sets based on the quality metric measured on the downlink control channel and/or measurement beam associated with the secondary RA resource set. The mWTRU may select a secondary RA resource set according to an order configured via SIB or dedicated signaling. The mWTRU may select a secondary RA resource set according to certain property and/or restriction and/or of the secondary RA resource sets. For example, certain secondary RA resource sets may have high minimum transmit beamforming gain (e.g., very narrow beamwidth) and may be used by mWTRUs with advanced beamforming capability. An mWTRU without this capability may not select the secondary RA resource set. The mWTRU may determine the RA resource including sequence, frequency, time resource allocation and the mWTRU uplink transmit beam associated with this newly selected RA resource set for the PRACH retransmission.

Methods for random access PRACH retransmission are disclosed herein. The mWTRU may retransmit PRACH using the same RA resource as the preceding PRACH transmission, for example, the primary RA resource set. The retransmission power may be an initial PRACH power+ (PRACH transmission counter*PRACH power ramping factor size). The mWTRU may maintain a PRACH transmission counter for each of the determined primary and secondary RA resource sets. In addition, the mWTRU may maintain a total PRACH transmission counter including all transmitted preambles using different RA resource sets. When the mWTRU uses a different RA resource set for PRACH retransmission, it may still use the initial PRACH receive target power and the estimated path loss per RA resource set to set the initial PRACH power.

The mWTRU may perform a random access procedure using one or a plurality of RA resource sets and the mWTRU may accordingly transmit PRACH using different mWTRU uplink transmit beams targeted at the associated SCmB uplink receive beams.

Methods for sequential beam-specific PRACH transmission are disclosed herein. Multiple PRACH resource sets may be associated with each SCmB DL beam by a SIB configuration. Each PRACH resource set may correspond to an SCmB UL receive beam, for example, one SCmB DL beam may be associated with multiple SCmB UL beams. Multiple SCmB DL beams may be associated with the same UL receive beam or beams.

An mWTRU may obtain or select multiple PRACH resource sets (i.e., RA resource sets) based on a best DL beam or beams, for example, a DL beam used for Sync, SIB, and the like, or one or more DL beams above a threshold. An mWTRU may select multiple RA resource sets or one or more groups of RA resource sets based on any of the RA resource set selection procedures disclosed herein (e.g., based on configuration received from the SCmB, measurement information received from the SCmB and/or measurement information acquired (i.e., measured) by the mWTRU from a DL beam). The mWTRU may determine a ranking of the DL beams based on, for example, configuration received from the SCmB, measurement information received from the SCmB and/or measurement information acquired (i.e., measured) by the mWTRU from a DL beam). A best RA resource set may be determined from determining a best DL beam from among DL beams, and selecting the RA resource set that is mapped to the best DL beam. A next best RA resource set may be determined from determining a next best DL beam from among DL beams, and selecting the RA resource set that is mapped to the next best DL beam, and so on. Given a choice of multiple PRACH resource sets, mWTRU selects a physical resource (e.g., a directional mWTRU UL transmit beam) from each of the selected RA sets and transmits RA preambles acquired from the RA resource sets sequentially in time using the selected physical resources. The mWTRU may rank and arrange the preambles in a sequential transmit order for the transmissions based on, for example, the ranking of the DL beams such that the rank of the preambles corresponds to the rank of the DL beams. Each RA resource set may be associated with a corresponding PRACH, which is a channel used to carry random access preambles used for initiation of a RA procedure. That is, a RACH or PRACH transport channel is mapped to a specific RA preamble. An mWTRU may select a RACH or PRACH (e.g., a directional UL transmit beam linked to the selected RA resource set) based on a selected preamble or selected RA resource set for transmitting the preamble to the SCmB in an RA transmission. If the SCmB receives a preamble (or preambles) from the mWTRU, the SCmB may analyze the preamble (or preambles) and select a RAR (or RARs) to transmit back to the mWTRU as a confirmation of receiving the preamble (or preambles). In addition, the SCmB may select a directional DL beam (or beams), e.g., a directional SCmB DL beam or beams, associated with the RA resource set (or sets) based on the received preamble (or preambles) to transmit the RAR (or RARs) to the mWTRU, and may transmit the RAR (or RARs) within the directional SCmB DL beam (or beams).

In an example, mWTRU may transmit RA preambles using multiple PRACHs and then wait for one or more RAR from the SCmB. As the mWTRU waits for the one or more RAR, the mWTRU monitors for specific RAR or RARs during a determined RAR window or windows. RAR windows may or may not overlap. Non-overlapping windows enables an mWTRU to use different receive beams without additional DL beam timing information. If using overlapping windows, an mWTRU may be provided with DL beam timing information, for example, a symbol or TTI location. Accordingly, multiple RA preambles may be transmitted sequentially, with a best determined RA preamble (e.g., extracted from the best determined RA resource set) transmitted first, and the next best transmitted subsequently and so on. Based on all received RARs, the mWTRU may determine and select an UL beam based on a best RAR received.

In another example, an mWTRU may transmit one RA preamble using a corresponding PRACH, wait for a predetermined amount of time for a corresponding RAR, and, if a failure is determined (e.g., that the SCmB did not receive the RA preamble, and/or that a RAR is not received by the mWTRU), after a possible retransmission, the mWTRU transmits the next RA preamble using a PRACH associated with the next RA preamble. Accordingly, multiple RA preambles may be transmitted sequentially, with a best determined RA preamble (e.g., extracted from the best determined RA resource set) transmitted first, and the next best transmitted subsequently and so on, until a RAR is received by the mWTRU.

In another example, an mWTRU may transmit one RA preamble using a corresponding PRACH, wait for a corresponding RAR or may determine that a failure has occurred. If the mWTRU determines that a failure has occurred (e.g., that the SCmB did not receive the RA preamble, and/or that a RAR is not received by the mWTRU), the mWTRU may sequentially transmit all of the selected RA preambles or all of the remaining RA preambles using PRACHs associated with the selected RA preambles. Accordingly, multiple RA preambles may be transmitted sequentially, with a best determined RA preamble (e.g., extracted from the best determined RA resource set) transmitted first, and the next best preamble or preambles sequentially transmitted subsequently, and based on all received RARs, the mWTRU may determine and select an UL beam based on a best RAR received.

An mWTRU may have different PRACH parameters for each RA resource set and may maintain for example a separate PREAMBLE_RETRANS_COUNTER for a preamble transmission for each of the SCmB UL receive beams. If the mWTRU changes an UL transmit beam during an RA procedure, the mWTRU may need PREAMBLE_RETRANS_COUNTER per (UL transmit beam, UL receive beam) pair.

Receipt of a RAR may indicate a best uplink beam or beams. From the received RARs, an mWTRU may choose which uplink beam to use based on a rule, an implementation or information included in the received RAR or RARs (e.g., a determined signal quality of a received PRACH). Each RAR may be associated with an uplink beam, and, if multiple RARs are received, the mWTRU may determine which RAR from among the received multiple RARs is best based on a rule, an implementation or information included in the received RARs. Upon selection of a best RAR, the mWTRU may determine and select a best uplink beam for communication based on the corresponding best RAR mapped thereto. The uplink transmit beam (i.e., directional WTRU UL transmit beam or directional UL transmit beam) selected based on the received RAR or RARs corresponds to one of the UL transmit beams of one or more UL transmit beams used to transmit the preambles from the WTRU to the SCmB. An SCmB may have the capability to determine when PRACHs are transmitted from the same mWTRU in sequence. An explicit preamble group to symbol/TTI mapping may be configured and an mWTRU may use a same preamble for PRACH transmission in the sequence.

A hashing function may be used to map to parts of an International Mobile Subscriber Identity (IMSI). The hashing function is according to: IMSI↔PRACH sequence, and may involve multiple PRACH sequences.

Multiple PRACH resource sets may be associated with each SCmB downlink beam and an mWTRU may receive the association configuration in SIB. As each PRACH resource set may correspond to an SCmB uplink receive beam, for example, one SCmB downlink beam is associated with multiple SCmB uplink beam. Multiple SCmB downlink beams may be associated with the same uplink receive beam or beams. An mWTRU may receive multiple PRACH resource set configurations based on best downlink beam, for example, a downlink beam used for synchronization and Physical Broadcast Channel (PBCH) reception and/or SIB reception, etc., or one or more downlink beams may be measured above a threshold. An mWTRU may select multiple PRACH resource sets and select a physical resource (e.g., a PRACH) from each of the sets based on resource information provided in the RA resource sets and transmit preambles corresponding to each resource set sequentially in time. An mWTRU may transmit multiple preambles using PRACHs and monitor for one or more RARs. The RAR windows may or may not overlap. Non-overlapping RAR windows may enable an mWTRU to use different receive beams without additional downlink beam timing information. An mWTRU may transmit one PRACH and monitor for an RAR and, if the PRACH transmission fails after retransmission, the mWTRU may try the next preamble until a RAR is received. An mWTRU may transmit one preamble and monitor for a RAR. If the PRACH transmission fails after a retransmission, the mWTRU may try all selected preambles using sequential PRACH transmissions. The mWTRU may analyze all received RARs and determine a best uplink beam based on all received RARs.

An mWTRU may have different PRACH parameters for each resource set and may maintain for example separate PREAMBLE_RETRANS_COUNTER for preamble transmission for each of the SCmB uplink receive beams. When an mWTRU changes an UL transmit beam during RA procedure, it may have PREAMBLE_RETRANS_COUNTER per (UL transmit beam, UL receive beam) pair. As noted above, a hashing function may be used to map to parts of an International Mobile Subscriber Identity (IMSI). The hashing function is according to: IMSI↔PRACH sequence, and may involve multiple PRACH sequences. Accordingly, an mWTRU may apply a hashing function to map parts of IMSI to determine a PRACH sequence or to determine multiple PRACH sequences.

It will be appreciated that FIG. 22 and FIG. 23 may be modified to employ sequential beam-specific PRACH transmissions by using the processes disclosed above to (1) receive multiple DL control channels, DL beams and/or references signals in, for example, step 2201, (2) select multiple RA resource sets in, for example, steps 2206 or 2302, (3) select multiple preambles and multiple directional mWTRU uplink (UL) transmit beams in, for example, step 2302, (4) sequentially transmit multiple preambles using the multiple directional mWTRU uplink (UL) transmit beams in, for example, step 2303, (5) generate multiple RARs in, for example, step 2304, (6) transmit multiple RARs in, for example, step 2305, and (7) select a UL beam based on one or more RARs received in, for example, step 2306.

Methods for beam-specific PRACH transmission which employ parallel transmission and PRACH spatial diversity are disclosed herein. Features and procedures for employing parallel transmission may be similar to those disclosed above for sequential transmission, including, but not limited to, RA resource selection, preamble selection, UL beam selection, etc., with the exception that selected RA preambles may be transmitted by the mWTRU in parallel (e.g., at substantially the same time). RARs may also be transmitted in parallel by the SCmB and received in parallel by the mWTRU. Selected preambles may be grouped by the SCmB into a primary group and a secondary group, where the preambles of the primary group are transmitted in parallel and, subsequently, the preambles of the secondary group are transmitted in parallel.

It will be appreciated that FIG. 22 and FIG. 23 may be modified to employ beam-specific PRACH transmission which employ parallel transmission and PRACH spatial diversity by using the processes disclosed above to (1) receive multiple DL control channels, DL beams and/or references signals in, for example, step 2201, (2) select multiple RA resource sets in, for example, steps 2206 or 2302, (3) select multiple preambles and multiple directional mWTRU uplink (UL) transmit beams in and group the preambles into primary and secondary groups, for example, step 2302, (4) transmit multiple preambles in parallel using the multiple directional mWTRU uplink (UL) transmit beams in, for example, step 2303, (5) generate multiple RARs in, for example, step 2304, (6) transmit multiple RARs in, for example, step 2305, and (7) select a UL beam based on one or more RARs received in, for example, step 2306.

The beamformed PRACH transmission, especially with a relatively narrower beam, may be sensitive to dynamic blocking or device orientation change that may happen to obstruct the uplink PRACH transmission. An individual beamformed PRACH transmission using different RA resource sets for retransmission or a sequential PRACH transmission may increase the PRACH success rate in those situations. But the mWTRU may use one uplink transmit beam at a time due to single RF chain analog beamforming. An mWTRU may have more than one RF chain and thus may be able to transmit multiple uplink beams simultaneously.

The mWTRU may select two primary RA resource sets with a condition that these two primary RA resource sets may have a simultaneous PRACH transmission time allocation in terms of a frame, sub-frame, TTI, or symbol. The advantage may be to have two simultaneous PRACH transmissions to optimize the PRACH transmission success rate while reducing the latency. The mWTRU may perform a random access procedure with multiple simultaneous PRACH transmissions using different RA resource sets and thus different mWTRU uplink transmit beams.

Power allocation for parallel PRACH transmissions is disclosed herein. The initial PRACH and retransmission power of each of the primary RA resource sets may be calculated per RA resource set as performed for an individual PRACH transmission. When the magnitude of the simultaneous PRACH transmission power exceeds the maximum total power specified for the mWTRU, the mWTRU may adjust the power level according to the pre-defined rules. For example, the mWTRU may scale back the power level of the simultaneous PRACH transmission.

PRACH format selection and preamble grouping for heterogeneous beam types are disclosed herein. PRACH format selection may be for heterogeneous beam types, for example, omni, wide, or narrow beam types.

Based on the beam type selected for Sync/PBCH, an mWTRU may select the PRACH format, for example, a different guard period, a different sequence length, or the like.

Preamble sequences may be grouped based on PRACH transmission antenna gain settings according to mWTRU classes or tiers, in terms of for example a low, medium, or high class or tier.

The preamble sequence grouping may convey channel and/or beam information. For example, a group of preambles may be used by mWTRUs which may receive a PRACH configuration in a downlink wide beam. Also another group of preambles may be used by mWTRUs who may receive PRACH configuration in a downlink narrow beam.

The network may transmit synchronization signals and PBCHs in different types of beams, for example, broad beams covering a cell or narrow beams covering a part of a cell. Each beam may have an associated PRACH format that may include PRACH parameters such as a guard period, preamble sequence length, CP length, and the like. An mWTRU may receive the configuration of a PRACH format of each type of beam in a SIB or a plurality of SIBs.

RAR modifications to support millimeter wave beams are disclosed herein. An RAR window determination method is further described herein. As disclosed with regard to RAR reception, an mWTRU may monitor a RAR window according to a TDD configuration, downlink control channel beam scheduling, an RAR window start, or an RAR window size of the selected RA resource set. In addition, the mWTRU may use the dynamic TDD configuration to determine the RAR window start.

Information for use in an RAR grant is disclosed herein. An mWTRU may decode a RAR successfully in the RAR window and receive a downlink data channel that may contain an uplink channel information including: an uplink control and/or data channel transport format; an uplink control and/or data channel time resource allocation; uplink transmission timing information; uplink control and/or data channel frequency resource allocation; an uplink PRACH quality metric; or a downlink channel state information request.

An uplink control and/or data channel transport format may include the coding and modulation scheme of the uplink control and/or data channel. An uplink control and/or data channel time resource allocation may, for example, be a maximum delay between the RAR and transmission of the scheduled uplink control or data channel. The mWTRU may determine the uplink control and/or data channel time resource allocation based on the maximum delay and the TDD configuration. Uplink transmission timing information may for example use the timing advance carried in the RAR to adjust the uplink control and/or data channel transmission timing. The uplink control and/or data channel frequency resource allocation may indicate the frequency resource may be the same as what may be used for the PRACH transmission which the SCmB may have certain channel information from the PRACH reception. With regard to an uplink PRACH quality metric, the RAR may include signal quality metrics for the received PRACH at the SCmB, sequential for uplink beam selection. Using a downlink channel state information request information element, the mWTRU may upon request, transmit a measured downlink channel state per beam in the scheduled uplink control or data channel.

The mWTRU may transmit the uplink control and/or data channel using an mWTRU uplink transmit beam based on the transmit beam used for the PRACH transmission associated with the received RAR. The uplink transmit beamforming weights for the control and/or data channel may be adjusted for the power difference between the PRACH and control/data channel but with an identical broadside AoD.

Methods for uplink reference signal transmission scheduled by an RAR are disclosed herein. An mWTRU may receive an uplink reference signal transmission scheduling in the decoded RA response prior to the uplink control and/or data channel scheduling and transmission. The SCmB may not have information regarding the mWTRU beamforming capability and may request an uplink beamformed reference signal transmission to evaluate the mWTRU's uplink transmission. For example, the SCmB may schedule an uplink reference signal transmission which may be pre-defined to use the narrowest uplink transmit beam the mWTRU may form. With the knowledge of the highest beamforming gain of an mWTRU, the SCmB may schedule the mWTRU uplink transmission accordingly. The SCmB may not have the knowledge of how many uplink transmit beams an mWTRU may form with the scheduled reference signal transmission period. And the mWTRU may determine which beams to use for the reference signal transmission.

For example, the SCmB may schedule six symbols for reference signal transmission with each beam transmitting over two symbols and an mWTRU may be able to have five non-overlapping transmit beams within the PRACH transmission beamwidth. The mWTRU may randomly select three beams out of the five and transmit them in the reference signal transmission period with different reference signal sequence. Another mWTRU may only transmit one beam within the PRACH transmission beamwidth and it may repeat this beam three times in the reference signal transmission with the same reference signal sequence.

An mWTRU may receive an uplink reference signal transmission from an SCmB for scheduling an RAR. The uplink reference signal transmission may include an uplink reference signal power offset relative to the PRACH transmission associated with the RAR, a reference signal transmission within the PRACH transmission beamwidth, an uplink reference signal configuration, an uplink reference signal transmission start, an uplink reference signal transmission period for uplink transmit beam, a number of uplink reference signal transmission period, uplink timing information, and an uplink reference signal transmission frequency resource allocation.

With regard to uplink reference signal sequence configuration, for example, an SCmB may provide a base ZC sequence and an mWTRU may randomly generate a set of cyclic shifts with each cyclic shift used for one uplink transmit beam. The SCmB may provide an explicit set of sequence indices into a pre-configured sequence configuration and the mWTRU may select a different sequence for each uplink transmit beam according to certain pre-defined rule. For example, the mWTRU may apply the indices in ascending or descending order to the uplink transmit beams.

Using an uplink reference signal transmission start indicator, the SCmB may coordinate the TDD configuration and schedule a reference signal transmission start in an uplink frame/sub-frame/TTI/symbol.

Using an uplink reference signal transmission period for uplink transmit beam indicator, the SCmB may schedule a period of a number of frame/sub-frame/TTI/symbol in which one uplink transmit beam may be used for the scheduled reference signal transmission.

Using a number of uplink reference signal transmission period, the SCmB may schedule how many beams an mWTRU may use in the reference signal transmission. The mWTRU may be able to form more or less than the number of the uplink transmit beams scheduled and may apply certain rules or criteria to select which transmit beam or beams to use for the reference signal transmission.

Uplink timing information may be signaled. The uplink timing relative to the downlink timing information may be used by the mWTRU to set the uplink start timing. Another example may be the timing advance that an mWTRU may use to adjust the uplink start timing.

A reference signal transmission within the PRACH transmission beamwidth may be a flag to inform the mWTRU to select transmit beam within the PRACH transmit beam associated with the RA response. An mWTRU may select other transmit beams when the flag may not be set.

The mWTRU may determine which uplink transmit beam or beams to use for the scheduled uplink reference signal transmission, for example, the ones within the transmit beam used for the PRACH transmission associated with the RA response. For each uplink transmit beam, the mWTRU may determine the transmit power based on the scheduled offset and the PRACH transmit power. The mWTRU may calculate the beamforming weights of each transmit beam based on the angle of departure of the PRACH transmission and the determined reference signal power. The mWTRU may select a different reference signal sequence based on the scheduled sequence set and assign it to each determined uplink transmit beam. The mWTRU may generate the selected reference signal sequence and transmit over the scheduled frequency resource allocation at the scheduled reference signal transmission start. Each uplink transmit beam may be transmitted over the scheduled period in terms of a frame, sub-frame, TTI, or symbol.

The SCmB may measure a quality metric of each transmitted reference sequence and determine a ranking of the uplink transmit beam of the mWTRU based on the quality metric. The sequence index or cyclic shift may be used to identify and schedule the associated uplink transmit beam by the SCmB.

The MAC protocol and procedures for beamforming based random access are disclosed herein. In an example, a MAC PDU for MAC-assisted beamforming based random access is provided. Although mmW is used as an example(s) for illustration purpose, the same example(s) may apply to cmW or any other spectrum or bands, including those above 6 GHz or sub-6 GHz bands.

FIG. 23 is an example random access beamforming index (RABFI)/random access preamble identifier (RAPID) mmW MAC subheader. An example mmW-MAC PDU subheader may comprise several header fields including RABFI and RAPID as shown in FIG. 23.

FIG. 24 is an example mmW MAC RAR. For example, a mmW-MAC RAR may comprise several fields including a timing advance command, UL grant, C-RNTI, or temporary C-RNTI as shown in FIG. 24.

FIG. 25 is an example mmW MAC PDU comprising of an example mmW MAC header and example mmW MAC RARs. An example mmW-MAC PDU may comprise a mmW-MAC header, zero or more mmW-MAC Random Access Responses (mMAC RAR), and optionally padding as shown in FIG. 25.

An example mmW-MAC header disclosed herein is of variable size. Therefore, it is flexible to accommodate variable number of users for initial access.

An example mmW-MAC PDU header is comprised of one or more mmW-MAC PDU subheaders; wherein each subheader corresponds to a mmW-MAC RAR except for the backoff indicator subheader. If included, the backoff indicator subheader may only be included once and may be the first subheader included within the mmW-MAC PDU header.

Padding may occur after the last mmW-MAC RAR. The presence and length of padding may be implicit based on the size of transport block, size of mmW-MAC header and number of RARs.

The RABFI may be used as an identifier for the selected beam. For example, the size of the RABFI field may be a few bits or more.

The RAPID may be used to identify the transmitted random access preamble. In an example, the size of the RAPID field may be a few bits, for example, 6 bits or more.

The UpLink Grant field may indicate the resources to be used on the uplink. For example, the size of the UL Grant field may be a several bits (e.g., 20 bits or more).

The C-RNTI/Temporary C-RNTI field may be used to indicate the identity or temporary identity that is used by the MAC entity during random access. For example, the size of the C-RNTI/Temporary C-RNTI field may be several bits, for example, 16 bits or more.

The Extension field, E, may be a flag indicating if more fields are present in the example MAC header or not. The E field may be set to "1" to indicate at least another set of E/T/RABFI/RAPID fields follows. The E field may be set to "0" to indicate that a MAC RAR or padding starts at the next byte.

The Type field, T, may be a flag indicating whether the example MAC subheader contains a random access ID or a backoff indicator. The T field may be set to "0" to indicate the presence of a backoff indicator field in the subheader (BI). The T field may be set to "1" to indicate the presence of a RABFI and random access preamble ID field in the subheader RAPID.

R may be a reserved bit, set to "0"

The Timing Advance Command field may indicate the index value used to control the amount of timing adjustment that the MAC entity has to apply.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in a wireless transmit/receive unit (WTRU), the method comprising:
   receiving, from a base station (BS), a plurality of beam reference signals (BRSs) associated with a plurality of random access (RA) resource sets, wherein each BRS is associated with a RA resource set of the plurality of RA resource sets;
   determining, based on a measurement of at least one BRS of the received plurality of BRSs, a respective RA resource set, wherein the determined respective RA resource set includes a plurality of RA resources;
   transmitting, using a first resource of the plurality of RA resources in the determined respective RA resource set, to the BS, a first preamble;
   transmitting, using a second resource of the plurality of RA resources in the determined respective RA resource set, to the BS, a second preamble; and
   receiving, from the BS, a random access response (RAR), in response to the first preamble or the second preamble.

2. The method of claim 1, wherein each of the plurality of RA resource sets includes at least one preamble and resource information that corresponds to at least one BRS of the received plurality of BRSs.

3. The method of claim 1, wherein each of the plurality of RA resource sets is associated with a different BRS of the received plurality of BRSs.

4. The method of claim 1, further comprising:
   determining, based on a first reception direction associated with a first BRS of the received plurality of BRSs, a first directional uplink (UL) transmit beam for the first preamble; and
   determining, based on a second reception direction associated with a second BRS of the received plurality of BRSs, a second directional uplink (UL) transmit beam for the second preamble.

5. The method of claim 4, wherein the first preamble is transmitted via the first directional UL transmit beam and the second preamble is transmitted via the second directional UL transmit beam, wherein the transmissions of the first preamble and the second preamble are in a sequential order.

6. The method of claim 1, further comprising:
   determining, based on the RAR, an UL beam.

7. A wireless transmit/receive unit (WTRU) comprising:
   a processor;
   a transmitter; and
   a receiver,
   the processor and the receiver configured to:
      receive, from a base station (BS), a plurality of beam reference signals (BRSs) associated with a plurality of random access (RA) resource sets, wherein each BRS is associated with a RA resource set of the plurality of RA resource sets; and
      determine, based on a measurement of a BRS of the received plurality of BRSs, a respective RA resource set, wherein the determined respective RA resource set includes a plurality of RA resources;
   the processor and the transmitter configured to:
      transmit, using a first resource of the plurality of RA resources in the determined respective RA resource set, to the BS, a first preamble; and
      transmit, using a second resource of the plurality of RA resources in the determined respective RA resource set, to the BS, a second preamble; and the processor and the receiver configured to receive, from the BS, a random access response (RAR) in response to the first preamble or the second preamble.

8. The WTRU of claim 7, wherein each of the plurality of RA resource sets includes at least one preamble and resource information that corresponds to at least one BRS of the received plurality of BRSs.

9. The WTRU of claim 7, wherein each of the plurality of RA resource sets is associated with a different BRS of the received plurality of BRSs.

10. The WTRU of claim 7, wherein the processor and the receiver are further configured to:
determine, based on a first reception direction associated with a first BRS of the received plurality of BRSs, a first directional uplink (UL) transmit beam for the first preamble; and
determine, based on a second reception direction associated with a second BRS of the received plurality of BRSs, a second directional uplink (UL) transmit beam for the second preamble.

11. The WTRU of claim 10, wherein the first preamble is transmitted via the first directional UL transmit beam and the second preamble is transmitted via the second directional UL transmit beam, wherein the transmissions of the first preamble and the second preamble are in a sequential order.

12. The WTRU of claim 7, wherein the processor is further configured to determine, based on the RAR, an UL beam.

13. A method for a wireless transmit receive unit, the method comprising:
receiving configuration information including a plurality of random access (RA) resource sets;
selecting a RA set of the plurality of RA resource sets, and sending a preamble using resources of the selected RA set;
receiving a random access response (RAR) based on the preamble; and
selecting an uplink beam based on the received RAR.

14. The method of claim 13, wherein each RA resource set includes a set of one or more physical random access channel (PRACH) resources including preamble sequences.

15. The method of claim 14, wherein the preamble sequences of each RA resource set is based on Zadoff-Chu sequences.

16. The method of claim 14, wherein each RA resource set includes RA procedure parameters including one or more of PRACH maximum power, PRACH minimum transmit beamforming gain, or a PRACH maximum transmit bandwidth.

* * * * *